United States Patent
Matsunobu et al.

(10) Patent No.: US 10,154,257 B2
(45) Date of Patent: Dec. 11, 2018

(54) IMAGE CODING METHOD IN WHICH OFFSET IS APPLIED WHEN AN IMAGE IS CODED, AND IMAGE DECODING METHOD IN WHICH OFFSET IS APPLIED WHEN AN IMAGE IS DECODED

(71) Applicant: PANASONIC CORPORATION, Osaka (JP)

(72) Inventors: Toru Matsunobu, Osaka (JP); Takahiro Nishi, Nara (JP); Youji Shibahara, Osaka (JP); Hisao Sasai, Osaka (JP); Kyoko Tanikawa, Osaka (JP); Toshiyasu Sugio, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 1018 days.

(21) Appl. No.: 13/852,161

(22) Filed: Mar. 28, 2013

(65) Prior Publication Data

US 2013/0279568 A1    Oct. 24, 2013

Related U.S. Application Data

(60) Provisional application No. 61/623,639, filed on Apr. 13, 2012, provisional application No. 61/623,805, filed on Apr. 13, 2012.

(51) Int. Cl.
*H04N 19/46* (2014.01)
*H04N 19/124* (2014.01)
(Continued)

(52) U.S. Cl.
CPC ......... *H04N 19/0009* (2013.01); *H04N 19/82* (2014.11); *H04N 19/86* (2014.11); *H04N 19/117* (2014.11); *H04N 19/46* (2014.11)

(58) Field of Classification Search
CPC ................................. H04N 19/00096
See application file for complete search history.

(56) References Cited

U.S. PATENT DOCUMENTS

| | | | |
|---|---|---|---|
| 2009/0060034 A1* | 3/2009 | Park | H04N 19/105 375/240.12 |
| 2009/0310680 A1* | 12/2009 | Jeon | H04N 19/105 375/240.16 |

(Continued)

OTHER PUBLICATIONS

International Standard, ISO/IEC 14496-10, Second Edition, Oct. 1, 2004, Information technology—Coding of audio-visual objects—MPEG-4 Part 10: Advanced Video Coding.

*Primary Examiner* — Dave Czekaj
*Assistant Examiner* — Berteau Joisil
(74) *Attorney, Agent, or Firm* — Wenderoth, Lind & Ponack, L.L.P.

(57) ABSTRACT

An image coding method includes: obtaining a pixel signal of a current region to be processed; calculating offset information including at least one of a location from which the offset information for the current region is obtained, a total number of blocks which share the offset information, a pattern of partitioning the current region, a pixel classification method for classifying pixels into categories, a category index number of band offset, or an offset value; applying offset to the current region using the offset information, the offset being applied with adjustment to the offset value when a predetermined condition is satisfied; coding the offset information; outputting an offset-applied signal generated by the applying of offset; and controlling the applying of offset.

16 Claims, 59 Drawing Sheets

(51) Int. Cl.
*H04N 19/82* (2014.01)
*H04N 19/86* (2014.01)
*H04N 19/117* (2014.01)

(56) References Cited

U.S. PATENT DOCUMENTS

| | | | | |
|---|---|---|---|---|
| 2012/0287988 | A1* | 11/2012 | Chong | H04N 19/105 |
| | | | | 375/240.02 |
| 2013/0088294 | A1* | 4/2013 | Heineman | H03F 1/26 |
| | | | | 330/207 A |
| 2013/0114683 | A1* | 5/2013 | Zhao | H04N 19/82 |
| | | | | 375/240.03 |
| 2013/0177079 | A1* | 7/2013 | Kim | H04N 19/96 |
| | | | | 375/240.12 |
| 2013/0223517 | A1* | 8/2013 | Matsunobu | H04N 19/00096 |
| | | | | 375/240.03 |
| 2014/0369420 | A1* | 12/2014 | Alshina | H04N 19/96 |
| | | | | 375/240.25 |

* cited by examiner

| Class | Condition | Edge shape |
|---|---|---|
| 1 | c < c1 && c < c2 | |
| 2 | (c < c1 && c == c2) \|\| (c == c1 && c < c2) | |
| 3 | (c > c1 && c == c2) \|\| (c == c1 && c > c2) | |
| 4 | c > c1 && c > c2 | |
| 0 | None of the above | |

| Category | Condition | Category | Condition |
|---|---|---|---|
| 1 | R0 ≤ c < R1 | 9 | R8 ≤ c < R9 |
| 2 | R1 ≤ c < R2 | 10 | R9 ≤ c < R10 |
| 3 | R2 ≤ c < R3 | 11 | R10 ≤ c < R11 |
| 4 | R3 ≤ c < R4 | 12 | R11 ≤ c < R12 |
| 5 | R4 ≤ c < R5 | 13 | R12 ≤ c < R13 |
| 6 | R5 ≤ c < R6 | 14 | R13 ≤ c < R14 |
| 7 | R6 ≤ c < R7 | 15 | R14 ≤ c < R15 |
| 8 | R7 ≤ c < R8 | 16 | R15 ≤ c < R16 |

FIG. 14

| Bit allocation | Pixel classification method |
|---|---|
| 0 | No offset |
| 10 | Edge offset (0) |
| 110 | Edge offset (1) |
| 1110 | Edge offset (2) |
| 11110 | Edge offset (3) |
| 11111 | Band offset |

(Row indices: 0, 1, 2, 3, 4, 5)

FIG. 16A

| aps_sao_param(){ | Descriptor |
|---|---|
| sao_cb_enable_flag | u(1) |
| sao_cr_enable_flag | u(1) |
| sao_num_lcu_in_width_minus1 | ue(v) |
| sao_num_lcu_in_height_minus1 | ue(v) |
| sao_one_luma_unit_flag | u(1) |
| if(sao_one_luma_unit_flag) | |
| sao_offset_vlc(0, 0, 0) | |
| if(sao_cb_enable_flag){ | |
| sao_one_cb_unit_flag | u(1) |
| if(sao_one_cb_unit_flag) | |
| sao_offset_vlc(0, 0, 1) | |
| } | |
| if(sao_cr_enable_flag){ | |
| sao_one_cr_unit_flag | u(1) |
| if(sao_one_cr_unit_flag) | |
| sao_offset_vlc(0, 0, 2) | |
| } | |
| for(ry = 0; ry <= sao_num_lcu_in_height_minus1; ry++){ | |
| for(rx = 0; rx <= sao_num_lcu_in_width_minus1; rx++){ | |
| if(aps_sample_adaptive_offset_flag &&! sao_one_luma_unit_flag){ | |
| if(ry > 0 && rx == 0) | |
| sao_repeat_row_flag[0] | u(1) |
| sao_unit_vlc(rx, ry, 0) | |
| } | |
| if(sao_cb_enable_flag &&! sao_one_cb_unit_flag){ | |
| if(ry > 0 && rx == 0) | |
| sao_repeat_row_flag[1] | u(1) |
| sao_unit_vlc(rx, ry, 1) | |
| } | |
| if(sao_cr_enable_flag && ! sao_one_cr_unit_flag){ | |
| if(ry > 0 && rx == 0) | |
| sao_repeat_row_flag[2] | u(1) |
| sao_unit_vlc(rx, ry, 2) | |
| } | |
| } | |

FIG. 16B

| sao_unit_vlc(rx, ry, cIdx){ | Descriptor |
|---|---|
| if(!sao_repeat_row_flag[ cIdx ]){ | |
|   if(rx == 0 \|\| run[ cIdx ][ rx ][ ry ] < 0) | |
|     if(ry == 0){ | |
|       sao_run_diff | u(v) |
|       saoRun[ cIdx ][ rx ][ ry ] = sao_run_diff | |
|     } else { | |
|       sao_run_diff | se(v) |
|       saoRun[ cIdx ][ rx ][ ry ] = sao_run_diff + saoRun[ cIdx ][ rx ][ ry - 1 ] | |
|     } | |
|   saoRun[ cIdx ][ rx + 1 ][ ry ] = saoRun[ cIdx ][ rx ][ ry ] - 1 | |
|   if(rx == 0 \|\| saoRun[ cIdx ][ rx ][ ry ] < 0) | |
|     if( ry > 0) | |
|       sao_merge_up_flag | u(1) |
|     if(!sao_merge_up_flag) | |
|       sao_offset_vlc(rx, ry, cIdx) | |
| } else | |
|   saoRun[ cIdx ][ rx ][ ry ] = saoRun[ cIdx ][ rx ][ ry - 1] | |
| } | |

FIG. 16C

| sao_offset_vlc(rx, ry, cIdx){ | Descriptor |
|---|---|
|   sao_type_idx[ cIdx ][ rx ][ ry ] | ue(v) |
|   if(sao_type_idx[ cIdx ][ rx ][ ry ] == 5){ | |
|     sao_band_position[ cIdx ][ rx ][ ry ] | u(5) |
|     for(i = 0; i < 4; i++) | |
|       sao_offset[ cIdx ][ rx ][ ry ][ i ] | se(v) |
|   } else if(sao_type_idx[ cIdx ][ rx ][ ry ] != 0) | |
|     for(i = 0; i < 4; i++) | |
|       sao_offset[ cIdx ][ rx ][ ry ][ i ] | ue(v) |
| } | |

FIG. 17A

| | Descriptor |
|---|---|
| slice_data(){ | |
|   CtbAddrRS = SliceCtbAddrRS | |
|   CtbAddrTs = CtbAddrRstoTS[ CtbAddrRS ] | |
|   moreDataFlag = 1 | |
|   if( adaptive_loop_filter_flag && alf_cu_control_flag ) | |
|     AlfCuFlagIdx = −1 | |
|   do { | |
|     xCtb = InverseRasterScan( CtbAddrRs, CtbSize, CtbSize, pic_width_in_luma_samples, 0 ) | |
|     yCtb = InverseRasterScan( CtbAddrRs, CtbSize, CtbSize, pic_width_in_luma_samples, 1 ) | |
|     NumPCMBlock = 0 | |
|     CtbAddrInSlice = CtbAddrRS − ( slice_address >> SliceGranularity ) | |
|     AddrUp = CtbAddrRS − PicWidthInCtbs | |
|     if( slice_sao_interleaving_flag ){ | |
|       if(slice_sample_adaptive_offset_flag) | |
|         sao_unit_cabac( xCtb, yCtb, 0 ) | |
|       if(sao_cb_enable flag) | |
|         sao_unit_cabac( xCtb, yCtb, 1 ) | |
|       if(sao_cr_enable_flag) | |
|         sao_unit_cabac( xCtb, yCtb, 2 ) | |
|     } | |
|     moreDataFlag = coding_tree( xCtb, yCtb, Log2CtbSize, 0 ) | |
|     CtbAddrTS++ | |
|     if( moreDataFlag && ((tiles_or_entropy_coding_sync_idc == 1 && | |
|       TileId[ CtbAddrTS ] != TileId[ CtbAddrTS − 1 ]) \|\| | |
|       (tiles_or_entropy_coding_sync_idc == 2 && | |
|       num_substream_minus1 > 0 && | |
|       CtbAddrTs/PicWidthInCtbs <= num_substream_minus1 && | |
|       CtbAddrTS % PicWidthInCtbs == 0))){ | |
|       rbsp_trailing_bits() | |
|       if(nextbits(24) == 0x000002){ | |
|         entry_point_marker_two_3bytes | f(24) |
|         tile_idx_minus_1 | u(v) |
|       } | |
|     } | |
|   } while( moreDataFlag ) | |
| } | |

FIG. 17B

| sao_unit_cabac( rx, ry, cIdx ){ | Descriptor |
|---|---|
| if( rx > 0 && CtbAddrInSlice != 0 ) | |
| sao_merge_left_flag | ae(v) |
| if( !sao_merge_left_flag ) | |
| if( ry > 0 && ( AddrUp > 0 \|\| <br> slice_loop_filter_across_slices_enabled_flag )) | |
| sao_merge_up_flag | ae(v) |
| if( !sao_merge_up_flag ) | |
| sao_offset_cabac( rx, ry, cIdx ) | |
| } | |

FIG. 17C

| sao_offset_cabac( rx, ry, cIdx ){ | descriptor |
|---|---|
| sao_type_idx[ cIdx ][ rx ][ ry ] | ae(v) |
| if( sao_type_idx[ cIdx ][ rx ][ ry ] == 5 ) | |
| sao_band_position[ cIdx ][ rx ][ ry ] | ae(v) |
| if( sao_type_idx[ cIdx ][ rx ][ ry ] != 0 ) | |
| for( i = 0; i < 4; i++ ) | |
| sao_offset[ cIdx ][ rx ][ ry ][ i ] | ae(v) |
| } | |

FIG. 21

| R7 | R7 | R7 | R7 | R7 | R7 |
|---|---|---|---|---|---|
| R7 | R7 | R7 | R7 | R7 | R7 |
| R7-1 | R7-1 | R7 | R7 | R7 | R7 |
| R7-1 | R7-1 | R7-1 | R7 | R7 | R7 |
| R7-1 | R7-1 | R7-1 | R7-1 | R7 | R7 |

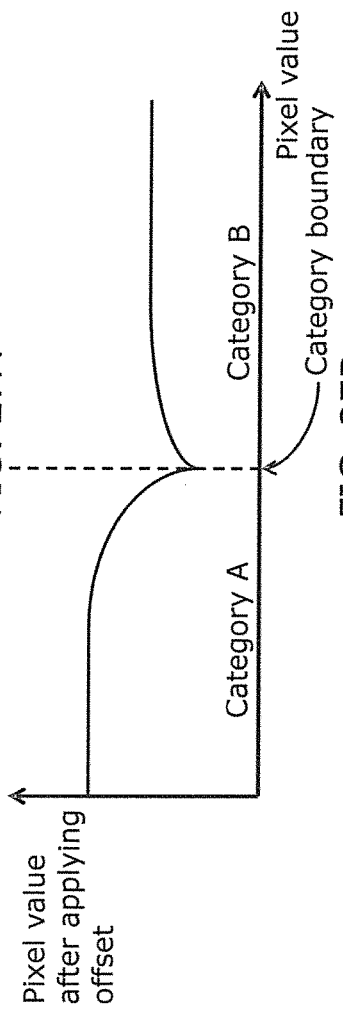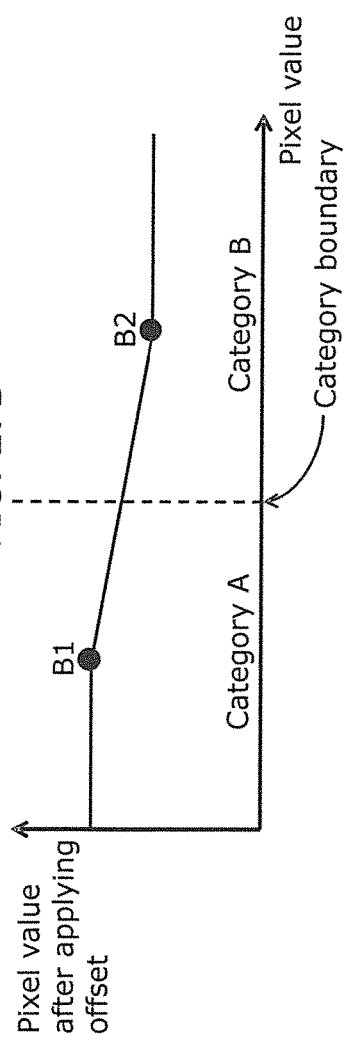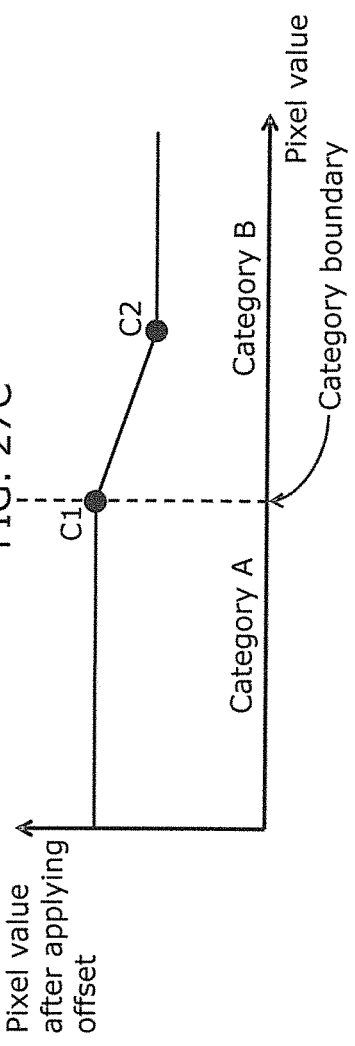

FIG. 28

| PixelValue | 123 | 124 | 125 | 126 | 127 | 128 | 129 | 130 | 131 | 132 | 133 |
|---|---|---|---|---|---|---|---|---|---|---|---|
| Category | 7 | 7 | 7 | 7 | 7 | 8 | 8 | 8 | 8 | 8 | 8 |
| WeightedOffset | - | - | 3/4 | 2/4 | 1/4 | 1/4 | 2/4 | 3/4 | - | - | - |
| OffsetValue | 8 | 8 | 6 | 4 | 2 | -1 | -2 | -3 | -4 | -4 | -4 |

To weight offset according to pixel value

FIG. 29

| slice_data() { | Descriptor |
|---|---|
| CurrTbAddr = first_tb_in_slice | |
| moreDataFlag = 1 | |
| if( adaptive_loop_filter_flag && alf_cu_control_flag ) | |
|    AlfCuFlagIdx = -1 | |
| do { | |
|    xCU = HorLumaLocation( CurrTbAddr ) | |
|    yCU = VerLumaLocation( CurrTbAddr ) | |
|    NumRange | u(v) |
|    WeightedOffset[NumRange] | u(v) |
|    coding_tree( xCU, yCU, Log2TbSize ) | |
|    if( !entropy_coding_mode_flag ) | |
|       moreDataFlag = more_rbsp_data() | |
|    else { | |
|       end_of_slice_flag | ae(v) |
|       moreDataFlag = !end_of_slice_flag | |
|    } | |
|    CurrTbAddr = NextTbAddress( CurrTbAddr ) | |
| } while( moreDataFlag ) | |
| } | |

Range of pixels for which offset values are to be decreased

Weighting factors for decrease of offset values

FIG. 39

| slice_data() { | Descriptor |
|---|---|
|   CurrTbAddr = first_tb_in_slice | |
|   moreDataFlag = 1 | |
|   if( adaptive_loop_filter_flag && alf_cu_control_flag ) | |
|     AlfCuFlagIdx = -1 | |
|   do { | |
|     xCU = HorLumaLocation( CurrTbAddr ) | |
|     yCU = VerLumaLocation( CurrTbAddr ) | |
|     NumLine | u(v) |
|     WeightedOffset[NumLine] | u(v) |
|     coding_tree( xCU, yCU, Log2TbSize ) | |
|     if( !entropy_coding_mode_flag ) | |
|       moreDataFlag = more_rbsp_data() | |
|     else { | |
|       end_of_slice_flag | ae(v) |
|       moreDataFlag = !end_of_slice_flag | |
|     } | |
|     CurrTbAddr = NextTbAddress( CurrTbAddr ) | |
|   } while( moreDataFlag ) | |
| } | |

Number of lines for which offset values are decreased → NumLine

Weighting factors for decrease of offset values → WeightedOffset[NumLine]

FIG. 47

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

Data structure of PMT ex800

FIG. 58

| Corresponding standard | Driving frequency |
|---|---|
| MPEG-4 AVC | 500 MHz |
| MPEG-2 | 350 MHz |
| ⋮ | ⋮ |

IMAGE CODING METHOD IN WHICH OFFSET IS APPLIED WHEN AN IMAGE IS CODED, AND IMAGE DECODING METHOD IN WHICH OFFSET IS APPLIED WHEN AN IMAGE IS DECODED

CROSS REFERENCE TO RELATED APPLICATIONS

The present application claims the benefit of U.S. Provisional Patent Application No. 61/623,805 filed on Apr. 13, 2012 and U.S. Provisional Patent Application No. 61/623,639 filed on Apr. 13, 2012. The entire disclosure of the above-identified applications, including the specifications, drawings and claims are incorporated herein by reference in their entirety.

FIELD

The present disclosure relates to image coding methods, image decoding methods, image coding apparatuses, and image decoding apparatuses, and particularly to an image coding method, an image decoding method, an image coding apparatus, and an image decoding apparatus each of which involves quantization or inverse quantization using a quantization matrix.

BACKGROUND

According to a conventional image coding method represented by ITU-T standards referred to as H.26x or ISO/IEC standards referred to as MPEG-x, a picture is partitioned into predetermined units, and coding is performed on a per-unit basis. For example, according to H.264/MPEG-4 AVC scheme (see Non Patent Literature (NPL) 1), a picture is processed in a unit referred to as a macroblock including horizontal 16 pixels and vertical 16 pixels.

For motion compensation, a macroblock is divided into blocks (the minimum block size is horizontal 4 pixels× vertical 4 pixels). Subsequently, motion compensation is performed using different motion vectors for respective blocks, and frequency transform is performed on a differential signal between a signal resulting from the motion compensation and an original signal to concentrate the differential signal to the low frequency region. Then, information can be compressed by quantizing a resulting signal. According to a method of coding a picture on a per-block basis using orthogonal transform, such as discrete cosine transform (DCT), in which differential signals are concentrated to the low frequency region, it is known that grid pattern distortion referred to as blocking artifacts occur at block boundaries. Such blocking artifacts can be decreased by applying deblocking filter.

CITATION LIST

Non Patent Literature

ISO/IEC 14496-10 "MPEG-4 Part 10 Advanced Video Coding"

SUMMARY

Technical Problem

However, there is a problem that the conventional image coding method and image decoding method do not sufficiently increase subjective image quality.

One non-limiting and exemplary embodiment provides an image coding method and an image decoding method which are capable of decreasing not only blocking artifacts, but also other coding degradation.

Solution to Problem

An image coding method according to an aspect of the present invention is an image coding method in which offset is applied when an image is coded, the offset being of at least two types including edge offset and band offset. The image coding method includes: obtaining a pixel signal of a current region to be processed; calculating offset information including at least one of a location from which the offset information for the current region is obtained, a total number of blocks which share the offset information, a pattern of partitioning the current region, a pixel classification method for classifying pixels into categories, a category index number of band offset, or an offset value; applying offset to the current region using the offset information, the offset being applied with adjustment to the offset value when a predetermined condition is satisfied; coding the offset information; outputting an offset-applied signal generated by the applying of offset; and controlling the applying of offset.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An image coding method and an image decoding method disclosed herein provide increased subjective image quality.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 14 schematically shows an example of bit allocation to index numbers indicating pixel classification methods, according to Embodiment 1 of the present invention.

FIG. 16A schematically shows an example of an APS according to Embodiment 1 of the present invention.

FIG. 16B schematically shows an example of an APS according to Embodiment 1 of the present invention.

FIG. 16C schematically shows an example of an APS according to Embodiment 1 of the present invention.

FIG. 17A schematically shows an example of slice data according to Embodiment 1 of the present invention.

FIG. 17B schematically shows an example of slice data according to Embodiment 1 of the present invention.

FIG. 17C schematically shows an example of slice data according to Embodiment 1 of the present invention.

FIG. 21 schematically shows an example of a problem related to Embodiment 1 of the present invention.

FIG. 27A schematically shows an example of adjustment of offset values according to Embodiment 2 of the present invention.

FIG. 27B schematically shows an example of adjustment of offset values according to Embodiment 2 of the present invention.

FIG. 27C schematically shows an example of adjustment of offset values according to Embodiment 2 of the present invention.

FIG. 28 schematically shows an example of adjustment of offset values according to Embodiment 2 of the present invention.

FIG. 29 schematically shows an example of slice data according to Embodiment 2 of the present invention.

FIG. 39 schematically shows an example of slice data according to Embodiment 2 of the present invention.

FIG. 47 illustrates a structure of the multiplexed data.

FIG. 58 shows an example of a look-up table in which video data standards are associated with driving frequencies.

DESCRIPTION OF EMBODIMENTS

Figure 1:
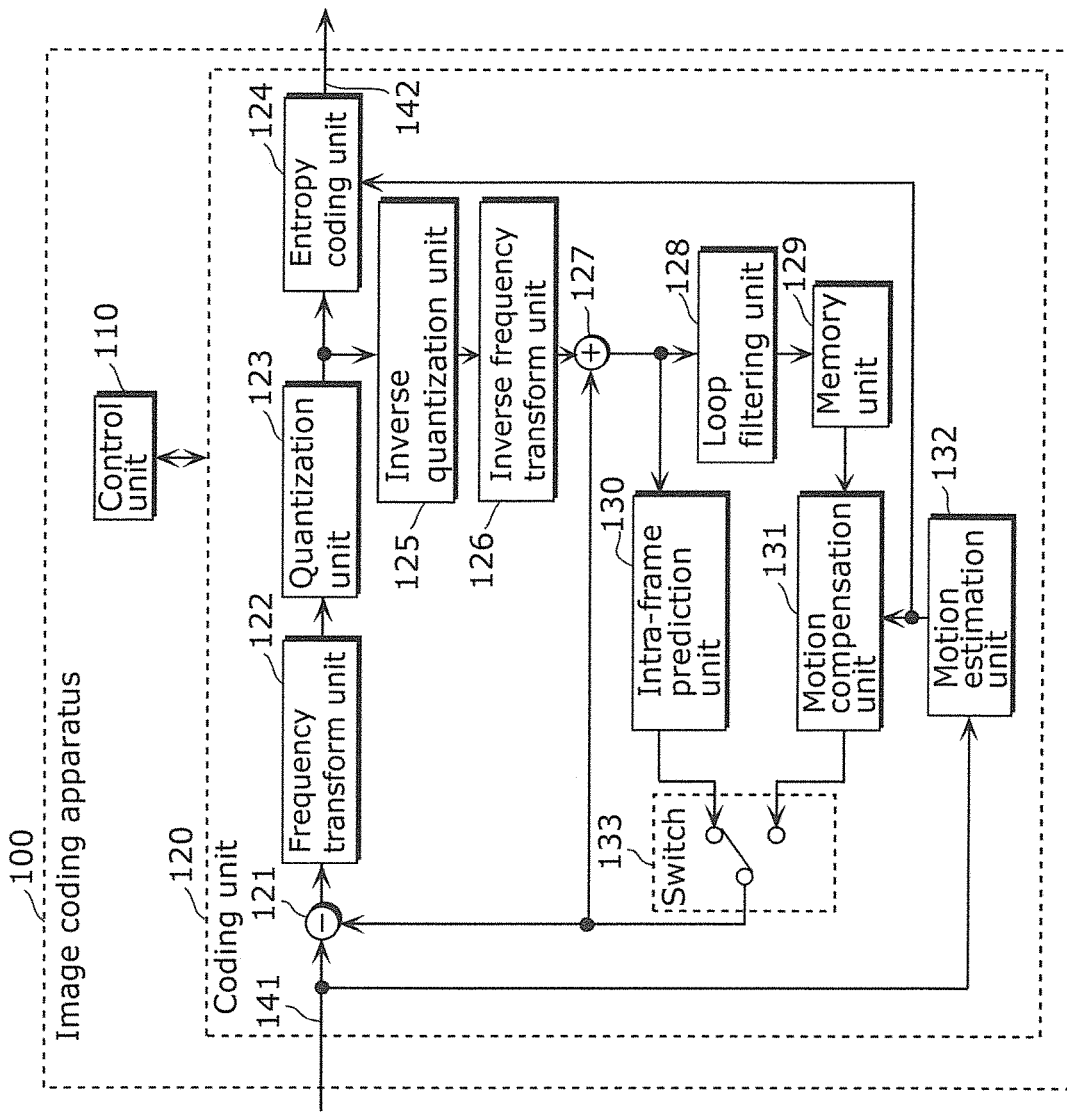
FIG. 1 is a block diagram showing an example of a configuration of an image coding apparatus according to Embodiment 1 of the present invention.

Underlying Knowledge Forming Basis of the Present Disclosure

The inventors have found such a problem in that the conventional image coding method and image decoding method are not capable of decreasing coding degradation other than blocking artifacts, because the conventional methods apply filter only to block boundaries, such as deblocking filter.

In order to solve the aforementioned problems, an image coding method according to an aspect of the present disclosure is an image coding method in which offset is applied when an image is coded, the offset being of at least two types including edge offset and band offset. The image coding method includes: obtaining a pixel signal of a current region to be processed; calculating offset information including at least one of a location from which the offset information for the current region is obtained, a total number of blocks which share the offset information, a pattern of partitioning the current region, a pixel classification method for classifying pixels into categories, a category index number of band offset, or an offset value; applying offset to the current region using the offset information, the offset being applied with adjustment to the offset value when a predetermined condition is satisfied; coding the offset information; outputting an offset-applied signal generated by the applying of offset; and controlling the applying of offset.

With this, when predetermined conditions are satisfied, adjustment of offset values is further performed. Accordingly, coding degradation other than blocking artifacts can also be decreased. As a result, subjective image quality can be increased.

Furthermore, it may be that the predetermined condition is a condition that a pixel value to which the offset is to be applied is within a predetermined range from a boundary between categories which neighbors each other and which are used for classifying pixels in the band offset.

Furthermore, it may be that the predetermined range from the boundary includes, within one of the categories, at least one pixel value closest to the boundary.

Furthermore, it may be that the offset value is adjusted in one or both of the categories neighboring each other across the boundary.

Furthermore, it may be that the offset value is adjusted by decreasing an absolute value of the offset value.

Furthermore, it may be that in the adjustment of the offset value, the offset value for a pixel value to which the offset is to be applied is further decreased as a position of the pixel value in a category is closer to a boundary of the category.

Furthermore, it may be that in the adjustment of the offset value, a differential value is used which is between (i) a pixel value of an offset-applied pixel to which the offset has been applied and (ii) a pixel value of a current pixel to be processed, the offset-applied pixel belonging to a neighboring category of a category of the current pixel and being located in a neighborhood of a boundary between the neighboring category and the category of the current pixel.

Furthermore, it may be that the image coding method further includes determining whether or not the offset information is the same between different regions, using a threshold, and inserting the threshold into a coded stream.

Furthermore, it may be that the predetermined condition is a condition that a flag indicates ON or OFF, the flag indicating whether or not the same offset information as offset information used for a neighboring region of the current region is to be used for the current region.

Furthermore, an image decoding method according to an aspect of the present disclosure is an image decoding method in which offset is applied when an image is decoded, the offset being of at least two types including edge offset and band offset. The image decoding method includes: obtaining a pixel signal of a current region to be processed; obtaining offset information to be used for applying offset, from a coded stream; applying offset to the current region using the offset information, the offset being applied with adjustment to the offset value when a predetermined condition is satisfied; outputting an offset-applied signal generated by the applying of offset; and controlling the applying of offset.

With this, when predetermined conditions are satisfied, adjustment of offset values is further performed. Accordingly, coding degradation other than blocking artifacts can also be decreased. As a result, subjective image quality can be increased.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims.

Therefore, among the structural elements in the following exemplary embodiments, structural elements not recited in any one of the independent claims are described as arbitrary structural elements.

Embodiment 1

FIG. 1 shows a configuration of an image coding apparatus according to Embodiment 1. An image coding apparatus 100 shown in FIG. 1 includes a control unit 110 and a coding unit 120. The coding unit 120 includes a subtractor 121, a frequency transform unit 122, a quantization unit 123, an entropy coding unit 124, an inverse quantization unit 125, an inverse frequency transform unit 126, an adder unit 127, a loop filtering unit 128, a memory unit 129, an intra-frame prediction unit 130, a motion compensation unit 131, a motion estimation unit 132, and a switch 133.

The coding unit 120 codes an image 141 on a per-block basis to generate a coded stream 142. In doing so, the subtractor unit 121 of the coding unit 120 subtracts a pixel block composed of a plurality of pixel values in a prediction image from a pixel block composed of a plurality of pixel values of the image 141. The frequency transform unit 122 transforms a pixel block resulting from the subtraction into a coefficient block composed of a plurality of frequency coefficients. The quantization unit 123 quantizes the coefficient block obtained by the frequency transform unit 122.

Meanwhile, the motion estimation unit 132 estimates a motion vector using the pixel block of the image 141. The motion compensation unit 131 performs inter-frame prediction (inter prediction) using a reference image stored in the memory unit 129 and a motion vector estimated by the motion estimation unit 132. The intra-frame prediction unit 130 performs, according to an intra-frame prediction mode, intra-frame prediction (intra prediction) using a pixel block obtained by the adder unit 127. The switch 133 inputs, to the subtractor unit 121 and the adder unit 127, the pixel block of the prediction image resulting from the intra-frame prediction or the inter-frame prediction.

The entropy coding unit 124 performs entropy coding on block partition information, a type of prediction, a motion vector, a prediction mode (an intra-frame prediction mode), a quantization parameter, a quantized coefficient block, and so on to generate a coded stream 142.

The inverse quantization unit 125 inversely quantizes a quantized coefficient block. Subsequently, the inverse frequency transform unit 126 transforms the inversely quantized coefficient block into a pixel block. The adder unit 127 then adds the pixel block of the prediction image to the pixel block obtained by the inverse frequency transform unit 126. The loop filtering unit 128 reduces artifacts in the pixel block obtained by the adder unit 127 and stores the pixel block as a reference image in the memory unit 129.

Furthermore, the control unit 110 controls the coding unit 120.

The image coding apparatus 100 codes the image 141 by the above-described operation. In addition, the image coding apparatus 100 allows for reduction in the data amount of the coded stream 142 through various processes such as frequency transform, quantization, intra-frame prediction, inter-frame prediction, entropy coding, and loop filtering.

Figure 2:
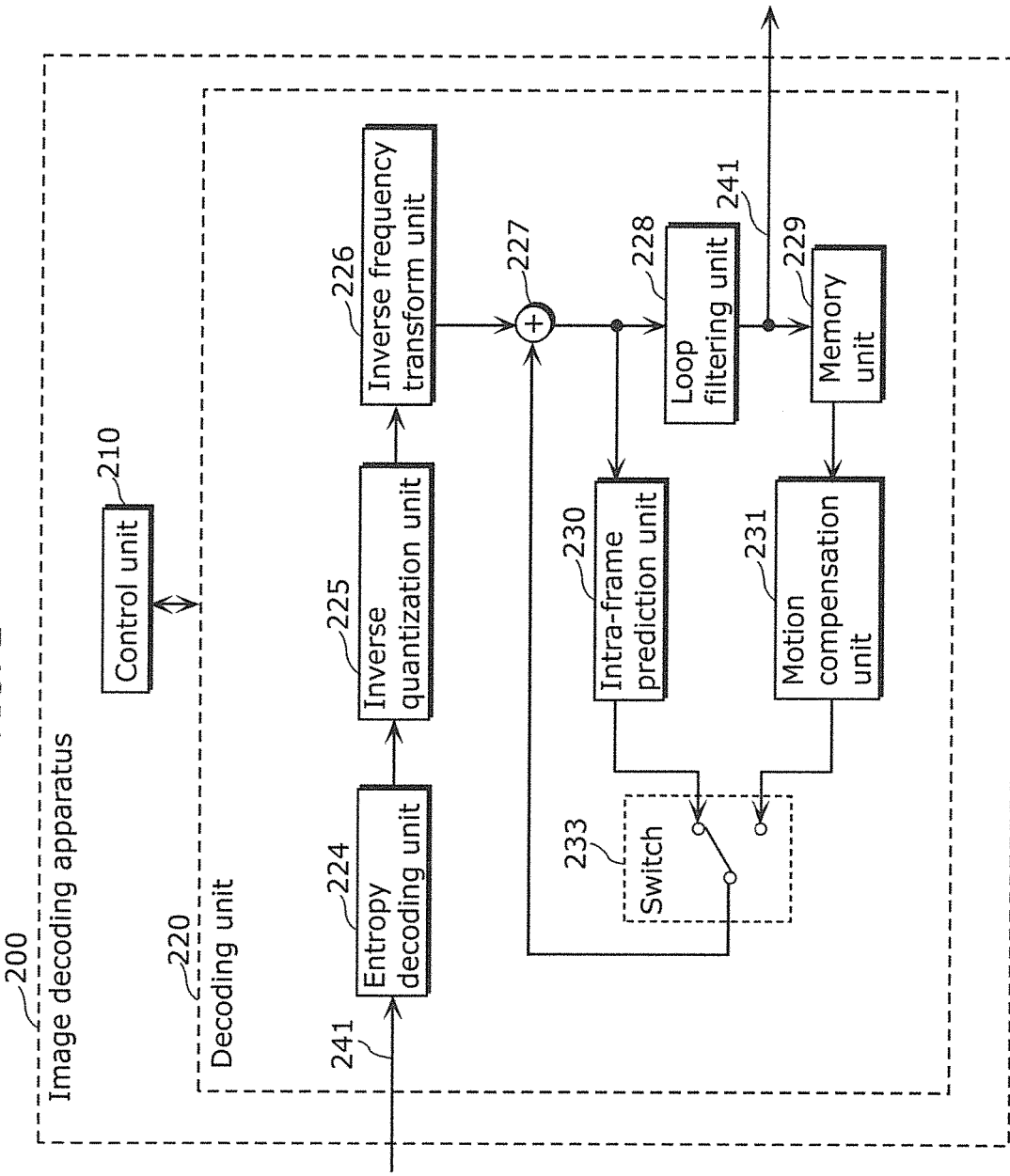
FIG. 2 is a block diagram showing an example of a configuration of an image decoding apparatus according to Embodiment 1 of the present invention.

FIG. 2 shows a configuration of an image decoding apparatus 200 corresponding to the image coding apparatus 100 shown in FIG. 1. An image decoding apparatus 200 shown in FIG. 2 includes a control unit 210 and a decoding unit 220. The decoding unit 220 includes an entropy decoding unit 224, an inverse quantization unit 225, an inverse frequency transform unit 226, an adder unit 227, a loop filtering unit 228, a memory unit 229, an intra-frame prediction unit 230, a motion compensation unit 231, and a switch 233.

The decoding unit 220 decodes, on a per-block basis, an image included in a coded stream 242. In doing so, the entropy decoding unit 224 of the decoding unit 220 performs entropy decoding on the coded stream 242 to obtain block partition information, a type of prediction, a motion vector, an intra-frame prediction mode, a quantization parameter, a quantized coefficient block, and so on.

Furthermore, the control unit 210 controls operation of the decoding unit 220.

The inverse quantization unit 225 of the decoding unit 220 inversely quantizes a quantized coefficient block. The inverse frequency transform unit 226 transforms the inversely quantized coefficient block into a pixel block.

The adder unit 227 then adds the pixel block of the prediction image to the pixel block obtained by the inverse frequency transform unit 226. The loop filtering unit 228 reduces artifacts in the pixel block obtained by the adder unit 227. Subsequently, the loop filtering unit 228 stores a reference image composed of pixel blocks in the memory unit 229. Furthermore, the loop filtering unit 228 outputs an image 241 composed of pixel blocks.

When the type of prediction is intra-frame prediction, the intra-frame prediction unit 230 performs, according to an intra-frame prediction mode, the intra-frame prediction using the pixel block obtained by the adder unit 227. When the type of prediction is inter-frame prediction, the motion compensation unit 231 performs inter-frame prediction using the motion vector and the reference image stored in the memory unit 229. The switch 233 inputs, to the adder unit 227, the pixel block of the prediction image resulting from the intra-frame prediction or the inter-frame prediction.

As above, the image decoding apparatus 200 decodes, on a per-block basis, the image included in the coded stream 242, by the operation corresponding to the image coding apparatus 100.

Here, a detailed description is given of loop filtering. Loop filtering is performed to reduce coding degradation in reconstructed signals (signals output from the adder units 127 and 227). In the conventional H.264/MPEG-4 AVC scheme (see Non Patent Literature 1), deblocking filter is applied to reduce block-shaped artifacts that occur at the macroblock boundaries.

However, coding degradation that occurs within macroblocks cannot be decreased by deblocking filter. Hence, the loop filtering units 128 and 228 according to Embodiment 1 decreases coding degradation by applying offset. In applying offset, artifacts with respect to an original signal are decreased by adding offset values to pixels included in a current block to be processed of a reconstructed signal.

Furthermore, in applying offset, pixels in a block are classified into categories. The same offset value is used to the pixels belonging to a category. Such application of offset is referred to as sample adaptive offset (SAO).

Figures 3, 4:
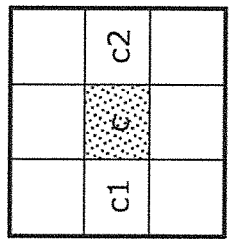
FIG. 3 schematically shows an example of edge offset in the image coding apparatus according to Embodiment 1 of the present invention.
FIG. 4 schematically shows an example of edge offset in the image coding apparatus according to Embodiment 1 of the present invention.
Figure 5:
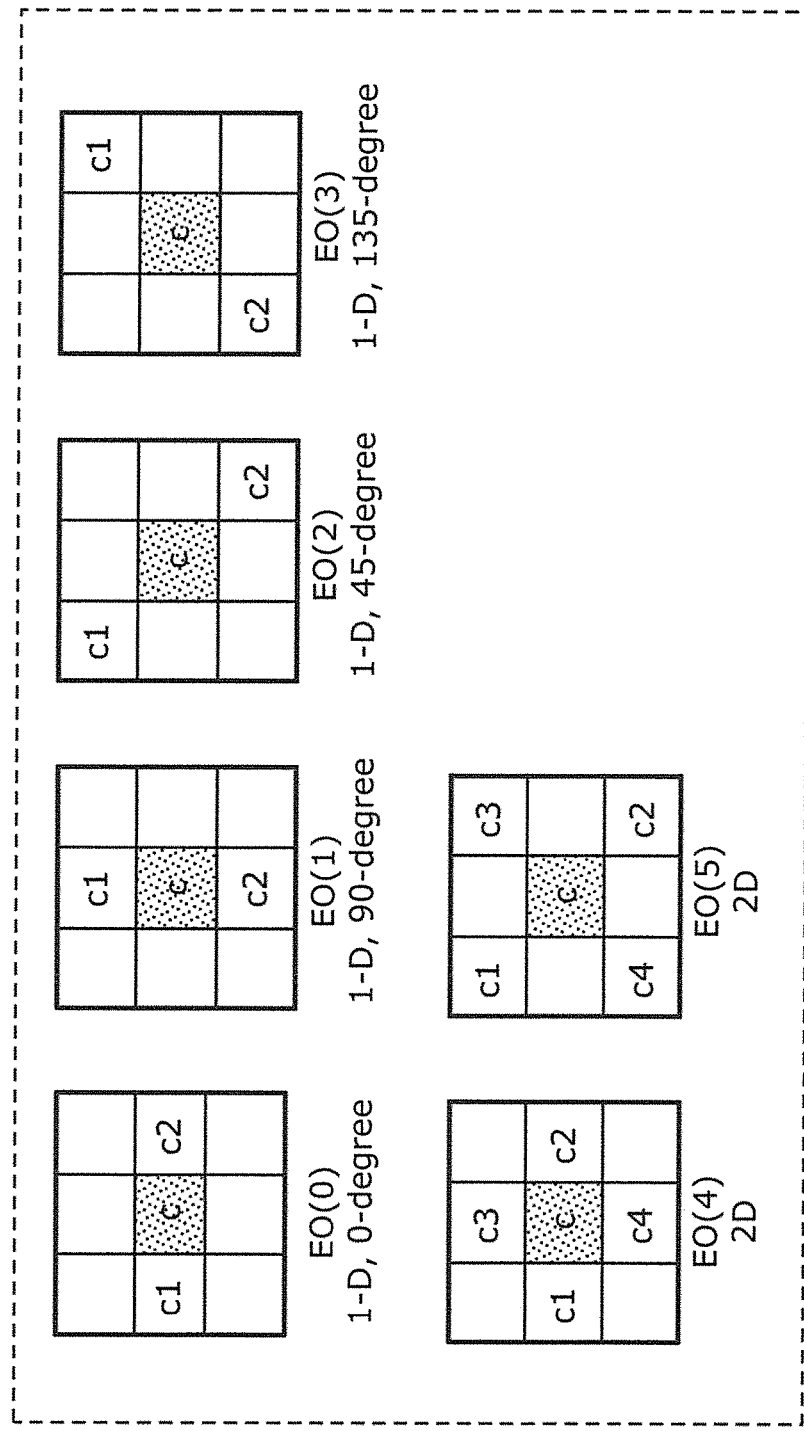
FIG. 5 schematically shows an example of edge offset in the image coding apparatus according to Embodiment 1 of the present invention.

There are two methods of pixel classification: edge offset and band offset. In the edge offset, pixels are classified based on comparison of a pixel to be classified with its neighboring pixels. In the band offset, pixels are classified based on the value of a pixel to be classified. FIG. 3 schematically shows an example of pixel classification using the edge offset. In the edge offset, a pixel c is classified based on the magnitude relationship in value between the pixel c and its neighboring pixels c1 and c2 on both sides of the pixel c. FIG. 4 schematically shows an example in which a block is classified into five categories (classes) using the edge offset. For example, in the case where the value of the pixel c is greater than the value of the pixel c1 and equal to the value of the pixel c2, the pixel c is classified into Category 3, and then an offset value of Offset [3] assigned to Category 3 is added to the value of the pixel c. As shown in FIG. 5, in the edge offset, a pixel to be classified is compared with neighboring pixels along a horizontal direction (EO (0)), neighboring pixels along a vertical direction (EO (1)), neighboring pixels along a diagonal direction (EO (2) or EO (3)), combinations thereof (EO (4) or EO (5)), or the like.

Figures 6, 7:
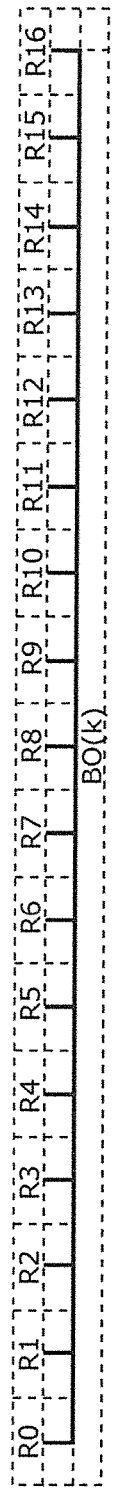
FIG. 6 schematically shows an example of band offset in the image coding apparatus according to Embodiment 1 of the present invention.
FIG. 7 schematically shows an example of band offset in the image coding apparatus according to Embodiment 1 of the present invention.
Figure 8:
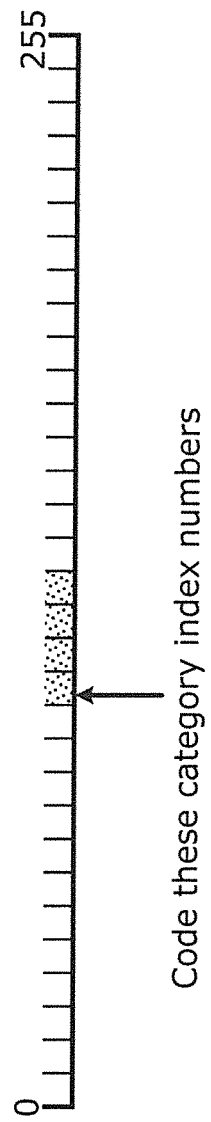
FIG. 8 schematically shows an example of band offset in the image coding apparatus according to Embodiment 1 of the present invention.

FIG. 6 schematically shows an example of a pixel classification method BO(0) using the band offset. As shown in FIG. 6, the full range of gradient values of pixels to be classified is uniformly split into M segments. M is 32, for example. Each of the segments is a category. A pixel is classified into a category to which the gradient value of the pixel belongs. FIG. 7 schematically shows an example in which blocks are classified into 16 classes (categories) using the band offset. For example, in the case where the value of the pixel c is not less than R9 and is smaller than R10, the pixel c is classified as Category 9, and then an offset value of Offset [9], which is predetermined for Category 9, is added to the pixel c. Furthermore, as shown in FIG. 8, it is not necessary to assign an offset value to each of categories. Only an offset value for a category having a higher offset effect can be coded. In coding, a category index number indicating the category of the coded offset value is also coded.

Figure 9A:
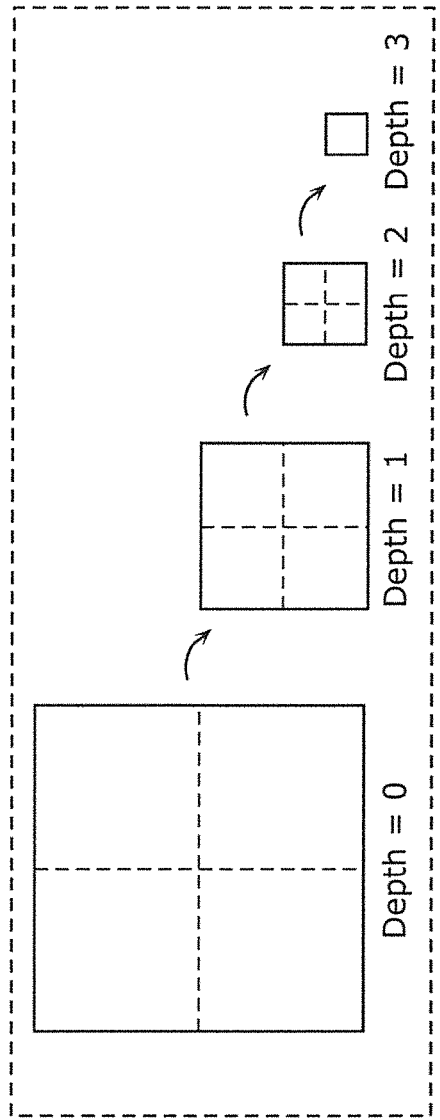
FIG. 9A schematically shows an example of partitioning into subregions in application of offset in the image coding apparatus according to Embodiment 1 of the present invention.
Figure 9B:
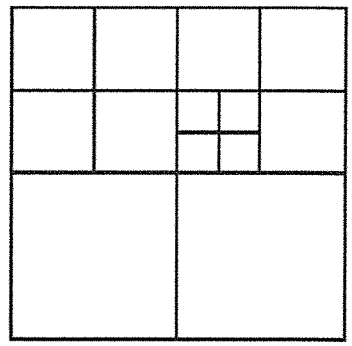
FIG. 9B schematically shows an example of partitioning into subregions in application of offset in the image coding apparatus according to Embodiment 1 of the present invention.

Moreover, the loop filtering units 128 and 228 determine an appropriate pixel classification method and an appropriate offset value for each unit region. Each unit region is obtained by hierarchically partitioning blocks as shown in FIG. 9A. FIG. 9B shows an example of a pattern of partitioning.

Figure 10:
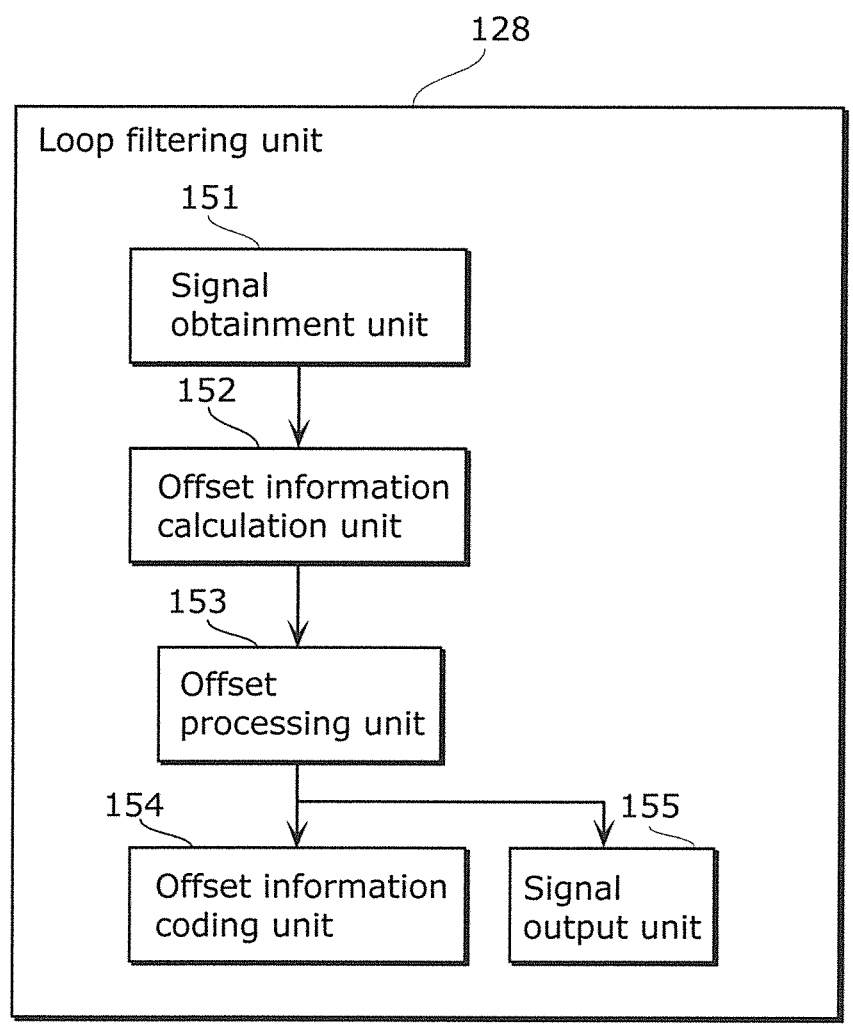
FIG. 10 is a block diagram showing an example of a configuration of a loop filtering unit in the image coding apparatus according to Embodiment 1 of the present invention.

FIG. 10 is a block diagram showing an example of a configuration of the loop filtering unit 128 in the image coding apparatus 100 according to Embodiment 1.

The loop filtering unit 128 includes a signal obtainment unit 151, an offset information calculation unit 152, an offset processing unit 153, an offset information coding unit 154, and a signal output unit 155.

The signal obtainment unit 151 obtains a coded pixel signal of a current region.

The offset information calculation unit 152 calculates a pattern of partitioning, a pixel classification method, an offset value, and others which are to be used in applying offset.

The offset processing unit 153 classifies pixels in a current region into categories using offset information and applies offset on a per-category basis.

The offset information coding unit 154 outputs offset information to the entropy coding unit 124 shown in FIG. 1.

The signal output unit 155 outputs a current region to which offset has been applied.

Figure 11:
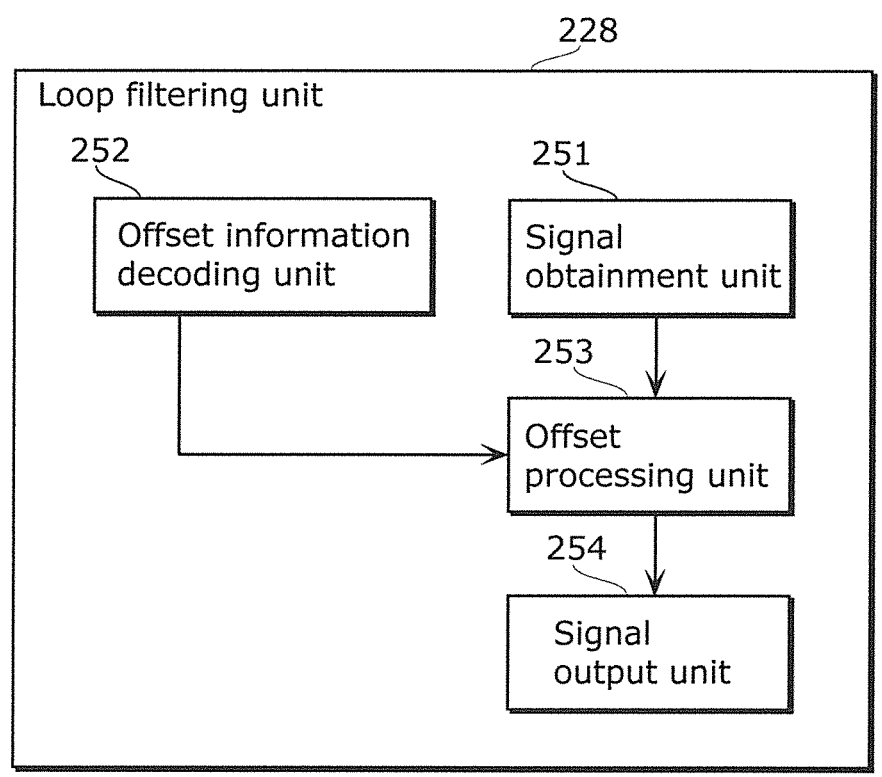
FIG. 11 is a block diagram showing an example of a configuration of a loop filtering unit in the image decoding apparatus according to Embodiment 1 of the present invention.

FIG. 11 is a block diagram showing an example of a configuration of the loop filtering unit 228 in an image decoding apparatus 200 which corresponds to the image coding apparatus 100 according to Embodiment 1 shown in FIG. 10.

The loop filtering unit 228 includes a signal obtainment unit 251, an offset information decoding unit 252, an offset processing unit 253, and a signal output unit 254.

The signal obtainment unit 251 obtains a coded pixel signal of a current region.

The offset information decoding unit 252 obtains a pattern of partitioning, a pixel classification method, an offset value, and others which are to be used in applying offset.

The offset processing unit 253 classifies pixels in a current region into categories using offset information and applies offset on a per-category basis.

The signal output unit 254 outputs a current region to which offset has been applied.

Figure 12:
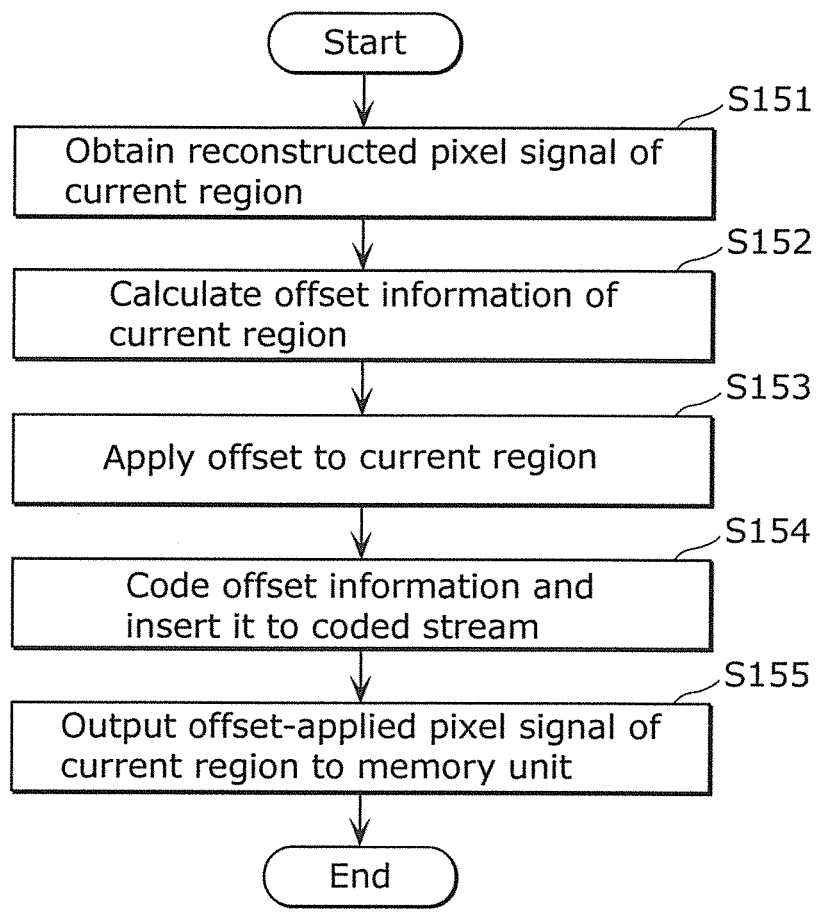
FIG. 12 is a flowchart showing an example of an operation of the loop filtering unit in the image coding apparatus according to Embodiment 1 of the present invention.

FIG. 12 is a flowchart showing an operation of the loop filtering unit 128 in the image coding apparatus 100 shown in FIG. 1.

First, the signal obtainment unit 151 obtains a reconstructed pixel signal of a current region from the adder unit 127 (S151).

Next, the offset information calculation unit 152 calculates a pattern of partitioning, a pixel classification method, an offset value, and others which are to be used in applying offset (S152).

Next, the offset processing unit 153 partitions the current region into subregions based on the offset information, classifies pixels in the subregions into categories, and adds an offset value to each of the pixels on a per-category basis (S153).

Next, the offset information coding unit 154 outputs offset information such as a pattern of partitioning, a pixel classification method, a category index number, and an offset value, to the entropy coding unit 124 (S154).

Then, the signal output unit 155 outputs the pixel signal of the current region to which offset has been applied to the memory unit 129 (S155).

Figure 13:
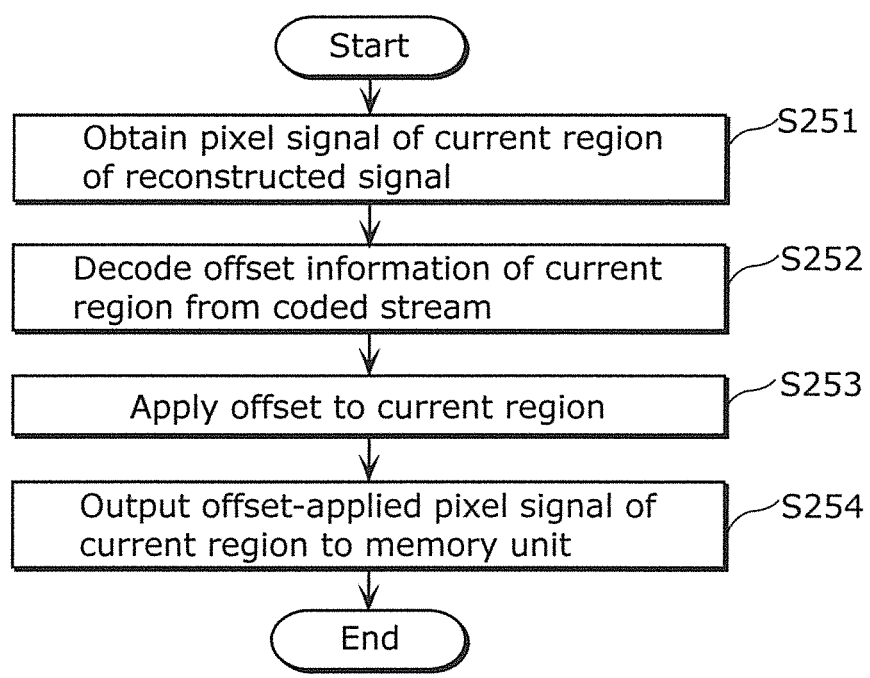
FIG. 13 is a flowchart showing an example of an operation of the loop filtering unit in the image decoding apparatus according to Embodiment 1 of the present invention.

FIG. 13 is a flowchart showing an operation of the loop filtering unit 228 in the image decoding apparatus 200 shown in FIG. 2.

First, the signal obtainment unit 251 obtains a coded pixel signal of a current region from the adder unit 227 (S251).

Next, the offset information decoding unit 252 obtains offset information such as a pattern of partitioning, a pixel classification method, a category index number, and an offset value decoded by the entropy decoding unit 224 (S252).

Next, the offset processing unit 253 partitions the current region into subregions based on the offset information, classifies pixels in the subregions into categories, and adds an offset value to each of the pixels on a per-category basis (S253).

Then, the signal output unit 254 outputs the pixel signal of the current region to which offset has been applied to the memory unit 229 (S254).

Here, a detailed description is further given of coding and decoding of offset information in the offset information coding unit 154 and the offset information decoding unit 252. As an example, in the pixel classification method in applying offset, EO(0), EO(1), EO(2), or EO(3) is used in the edge offset, and BO(0) is used in the band offset. FIG. 14 shows an example of allocation of index numbers indicating respective pixel classification methods. As shown in FIG. 14, the offset information coding unit 154 allocates an index number 0 to information indicating that no offset is applied to the current block. The image coding apparatus 100 according to Embodiment 1 of the present invention codes a moving picture to generate a coded stream.

Figure 15:
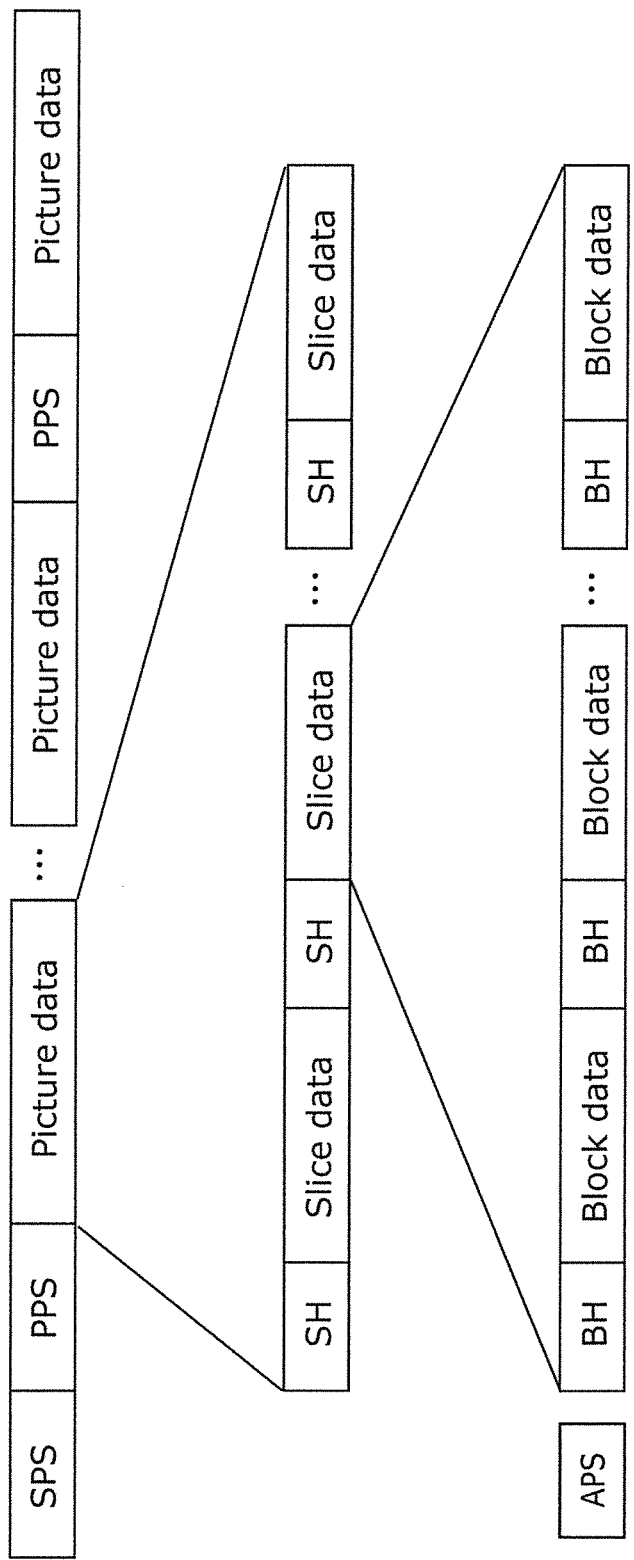
FIG. 15 schematically shows an example of a coded stream according to Embodiment 1 of the present invention.

The coded stream includes a header and picture data as shown in FIG. 15. The header includes a sequence parameter set (SPS) and a picture parameter set (PPS). The picture data is coded image data. The picture data further includes a slice header (SH) and slice data. The slice data includes coded image data included in a slice. The slice data further includes a block header (BH) and block data. The block data includes coded image data included in a block. In addition to the above, the coded stream includes an adaptation parameter set (APS) which stores parameters used for one or more slices. Index number aps_idx is assigned to the APS. The index number aps_idx for calling the APS to be used may be inserted to a slice header.

Offset information is coded by the offset information coding unit 154, and is inserted to one of SPS, PPS, SH, slice data, BH, block data, and APS. Furthermore, the offset information is obtained from one of the SPS, PPS, SH, slice data, BH, block data, and APS, and decoded by the offset information decoding unit 252.

FIG. 16A, FIG. 16B, and FIG. 16C show syntax examples for inserting offset information to APS. Offset information of all blocks within a slice is collectively inserted to an APS, and the offset information is obtainable from the APS. FIG. 17A, FIG. 17B, and FIG. 17C show syntax examples for inserting offset information to slice data. Here, offset information is inserted on a per-block basis, and the inserted offset information is obtainable.

Figure 18:
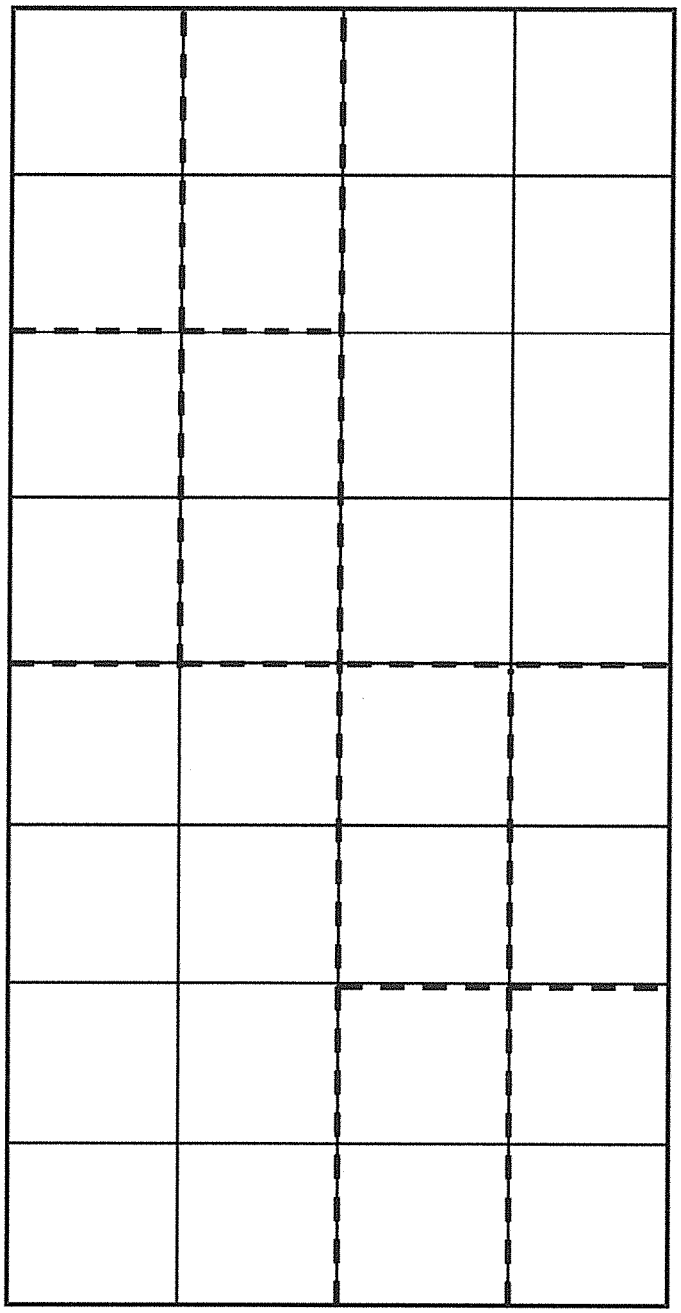
FIG. 18 schematically shows an example of regions which share offset information according to Embodiment 1 of the present invention.

In Embodiment 1, the same offset information can be used in a plurality of regions as shown in FIG. 18. In FIG. 18, solid lines indicate partitions of regions to which offset is applied, and dashed lines indicate partitions of regions where the same offset information is used. Here, it is possible to suppress an increase in bit quantity caused by applying offset, by coding information indicating use of the same offset information instead of coding offset information itself when inserting offset information into a coded stream. For example, as shown in FIG. 16A, a flag, such as sao_one_luma_unit_flag, sao_one_cr_unit_flag, or sao_one_cb_unit_flag, may be coded which indicates that the same offset information is used for all blocks within a slice. Furthermore, as shown in FIG. 16A, it may also be that a flag, such as sao_repeat_row_flag, is coded which indicates that offset information for one line is copied from the line immediately above. Furthermore, as shown in FIG. 16B, it may be that a parameter, such as saoRun or sao_run_diff, is coded which indicates the number of regions which share offset information. Furthermore, as shown in FIG. 16B and FIG. 17B, it may be that a flag, such as sao_merge_left_flag or sao_merge_up_flag, is coded which indicates that the offset information is copied from the region to the left or on top of the current region.

Figure 19:
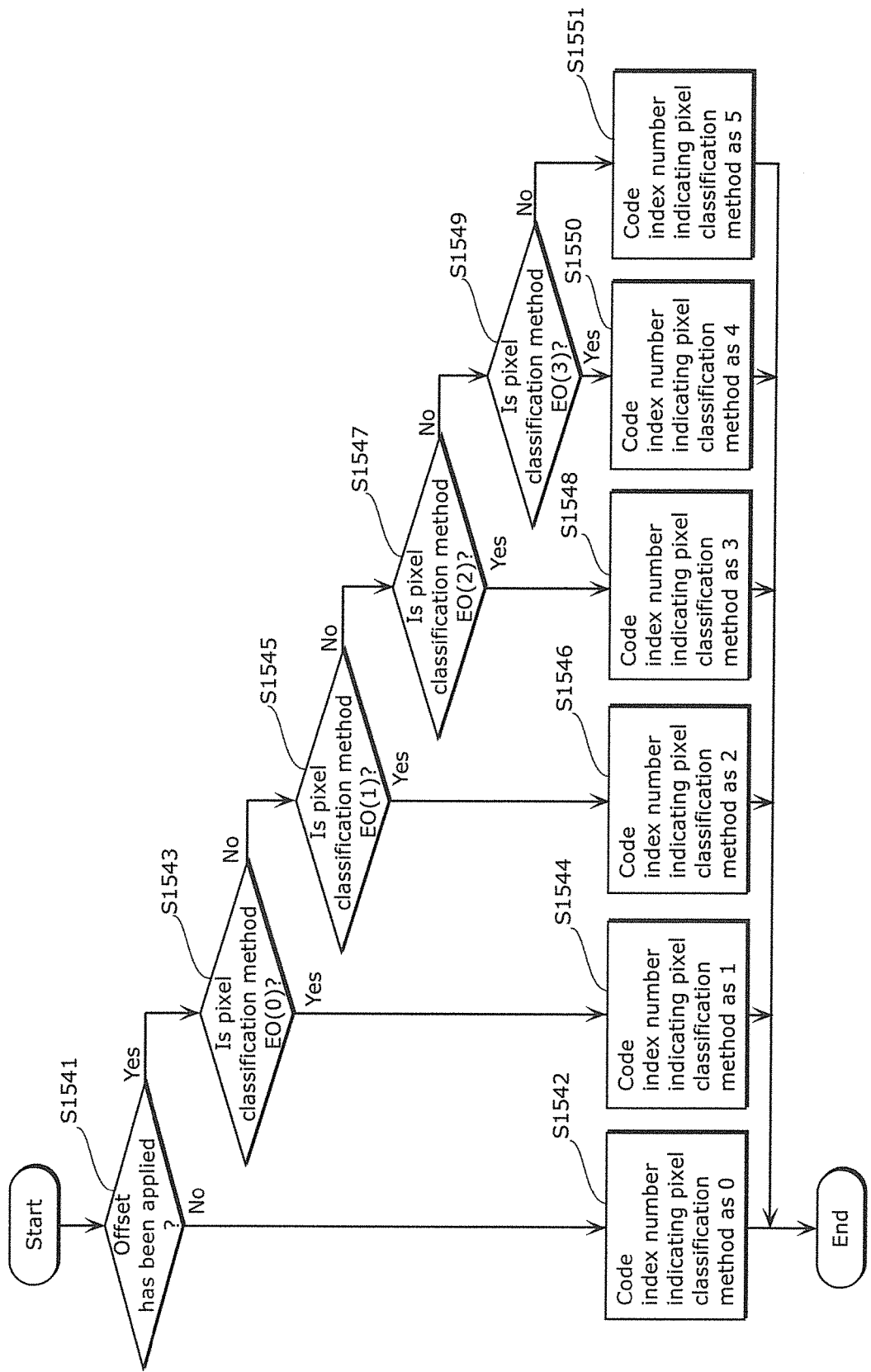
FIG. 19 is a flowchart of an example of coding index numbers indicating pixel classification methods, according to Embodiment 1 of the present invention.

FIG. 19 shows a flowchart of coding, performed by the offset information coding unit 154, of an index number which indicates a pixel classification method in offset information.

First, the offset information coding unit 154 determines whether or not offset has been applied (S1541). The offset information calculation unit 152 calculates offset information such as a pattern of partitioning, a pixel classification method, a category index number, and an offset value. The offset information calculation unit 152 determines that offset is not to be applied when bit quantity required for offset information is larger relative to the amount of correction of coding degradation. Accordingly, the offset processing unit 153 does not apply offset. Here, the offset information coding unit 154 obtains information as to whether or not offset has been applied, from the offset information calculation unit 152 or the offset processing unit 153.

Next, when S1541 is No, the offset information coding unit 154 codes an index number which indicates a pixel classification method as 0 (S1542). On the other hand, when S1541 is Yes, the offset information coding unit 154 determines whether or not the pixel classification method is edge offset EO(0) (S1543).

When S1543 is Yes, the offset information coding unit 154 codes an index number which indicates a pixel classification method as 1 (S1544). On the other hand, when S1543 is No, the offset information coding unit 154 determines whether or not the pixel classification method is edge offset EO(1) (S1545).

When S1545 is Yes, the offset information coding unit 154 codes an index number which indicates a pixel classification method as 2 (S1546). On the other hand, when S1545 is No, the offset information coding unit 154 determines whether or not the pixel classification method is edge offset EO(2) (S1547).

When S1547 is Yes, the offset information coding unit 154 codes an index number which indicates a pixel classification method as 3 (S1548). On the other hand, when S1547 is No, the offset information coding unit 154 determines whether or not the pixel classification method is edge offset EO(3) (S1549).

When S1549 is Yes, the offset information coding unit 154 codes an index number which indicates a pixel classification method as 4 (S1550). On the other hand, when S1549 is No, the offset information coding unit 154 codes an index number which indicates a pixel classification method as 5 (S1551).

Figure 20:
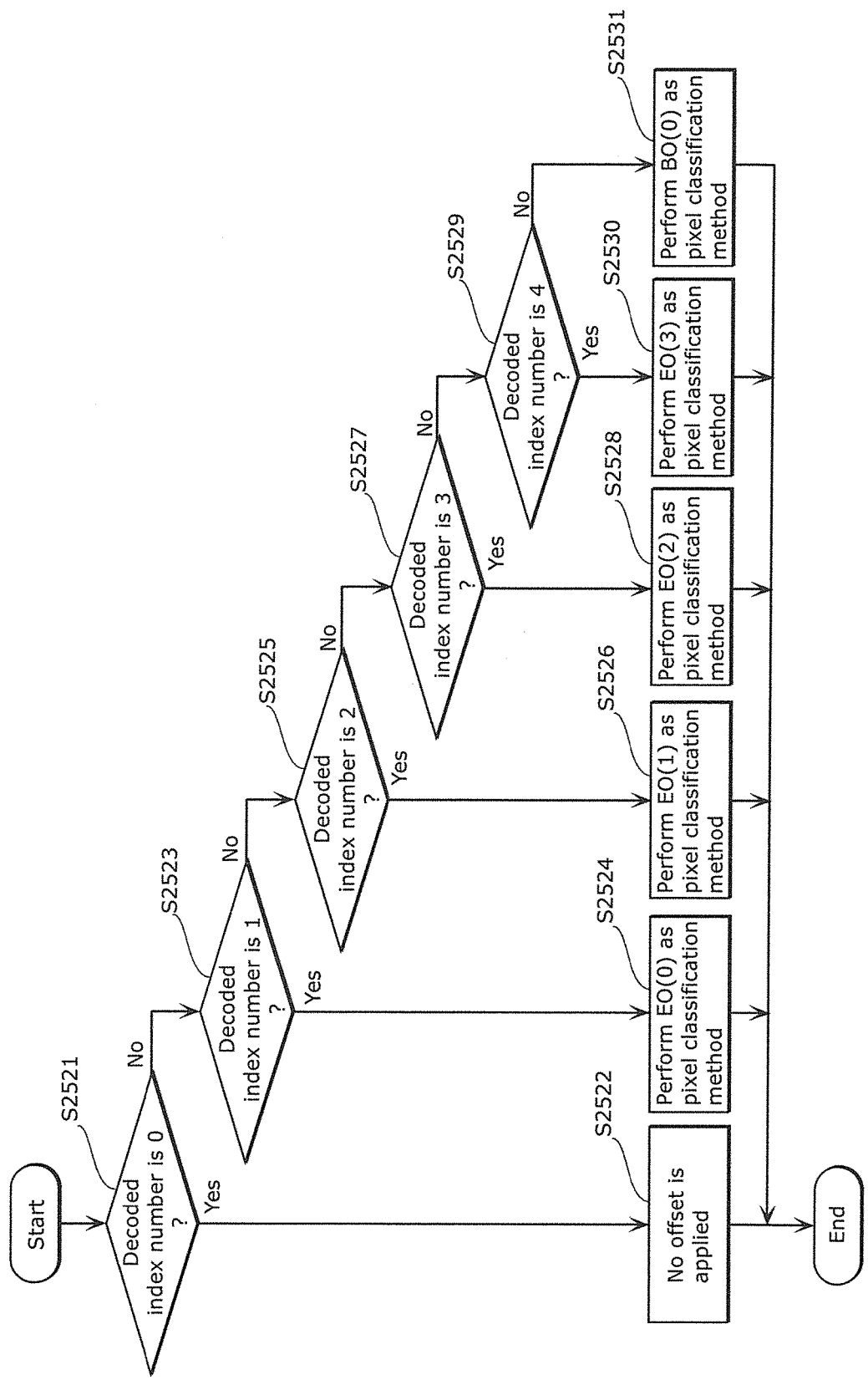
FIG. 20 is a flowchart of an example of decoding index numbers indicating pixel classification methods, according to Embodiment 1 of the present invention.

FIG. 20 shows a flowchart of (i) decoding, performed by the offset information decoding unit 252, of an index number which indicates a pixel classification method in offset information, and (ii) applying offset performed by the offset processing unit 253.

First, the offset processing unit 253 determines whether or not the index number decoded by the offset information decoding unit 252 is 0 (S2521).

When S2521 is Yes, the offset processing unit 253 does not apply offset (S2522). On the other hand, when S2521 is No, the offset processing unit 253 determines whether or not the index number decoded by the offset information decoding unit 252 is 1 (S2523).

When S2523 is Yes, the offset processing unit 253 applies edge offset EO(0) as a pixel classification method (S2524). On the other hand, when S2523 is No, the offset processing unit 253 determines whether or not the index number decoded by the offset information decoding unit 252 is 2 (S2525).

When S2525 is Yes, the offset processing unit 253 applies edge offset EO(1) as a pixel classification method (S2526). On the other hand, when S2525 is No, the offset processing unit 253 determines whether or not the index number decoded by the offset information decoding unit 252 is 3 (S2527).

When S2527 is Yes, the offset processing unit 253 applies edge offset EO(2) as a pixel classification method (S2528). On the other hand, when S2527 is No, the offset processing unit 253 determines whether or not the index number decoded by the offset information decoding unit 252 is 4 (S2529).

When S2529 is Yes, the offset processing unit 253 applies edge offset EO(3) as a pixel classification method (S2530). On the other hand, when S2529 is No, the offset processing unit 253 applies band offset BO(0) as a pixel classification method (S2531).

Accordingly, it is possible to generate a reconstructed signal approximate to an original signal, by adding, to a reconstructed image signal, an offset value corresponding to the original signal.

Although the image coding apparatus and the image decoding apparatus according to the present invention have been described above, the present invention is not limited to the above embodiment. The present invention further includes various variations of the embodiments which will occur to those skilled in the art, and other embodiments in which constituent elements of different embodiments are combined.

For example, processing which is executed by a particular processing unit may be executed by another processing unit. Furthermore, the order of steps in a process may be changed, and a plurality of processes may be executed in parallel. Furthermore, an additional dedicated or shared memory unit for storing various information items may be included in the configurations.

Embodiment 2

In Embodiment 1, it is possible that the same offset information is used for a plurality of regions. However, in Embodiment 1, in regions where band offset is selected, pixels having very close pixel values may be classified into different categories (classes). For example, in FIG. 7, different offset values are added to a pixel having a pixel value of R7-1 and a pixel having a pixel value of R7 which are at the boundary between category 7 and category 8. In the case where the difference in offset value between the category 7 and the category 8 is large, although the difference in pixel value between the two pixels is only one before applying offset, the difference in value at the boundary increases after applying offset. In particular, the gap in a flat portion between class boundaries of band offset as indicated by bold line in FIG. 21 is easily viewed in subjective image quality evaluation.

In Embodiment 2, offset values are adjusted in the neighborhood of category boundaries to reduce occurrence of artifacts at region boundaries, without decreasing offset effects.

A description is given of an image coding apparatus and an image decoding apparatus corresponding to the image coding apparatus according to Embodiment 2. The image coding apparatus according to Embodiment 2 includes a loop filtering unit 300 instead of the loop filtering unit 128 of the image coding apparatus 100 according to Embodiment 1. The image decoding apparatus according to Embodiment 2 corresponds to the image coding apparatus according to Embodiment 2. The image decoding apparatus includes a loop filtering unit 400 instead of the loop filtering unit 228 of the image decoding apparatus 200 according to Embodiment 1.

Figure 22:
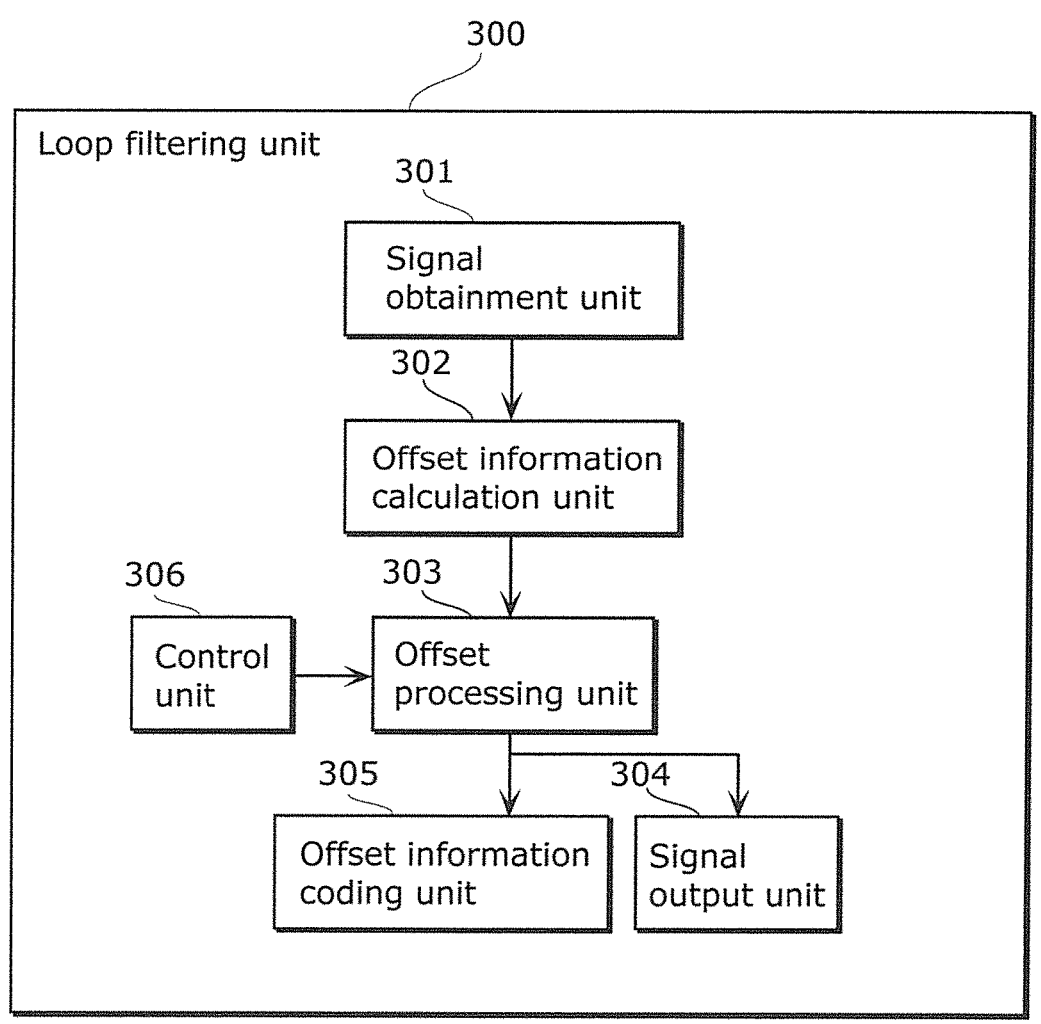
FIG. 22 is a block diagram showing an example of a configuration of a loop filtering unit in the image coding apparatus according to Embodiment 2 of the present invention.
Figure 23:
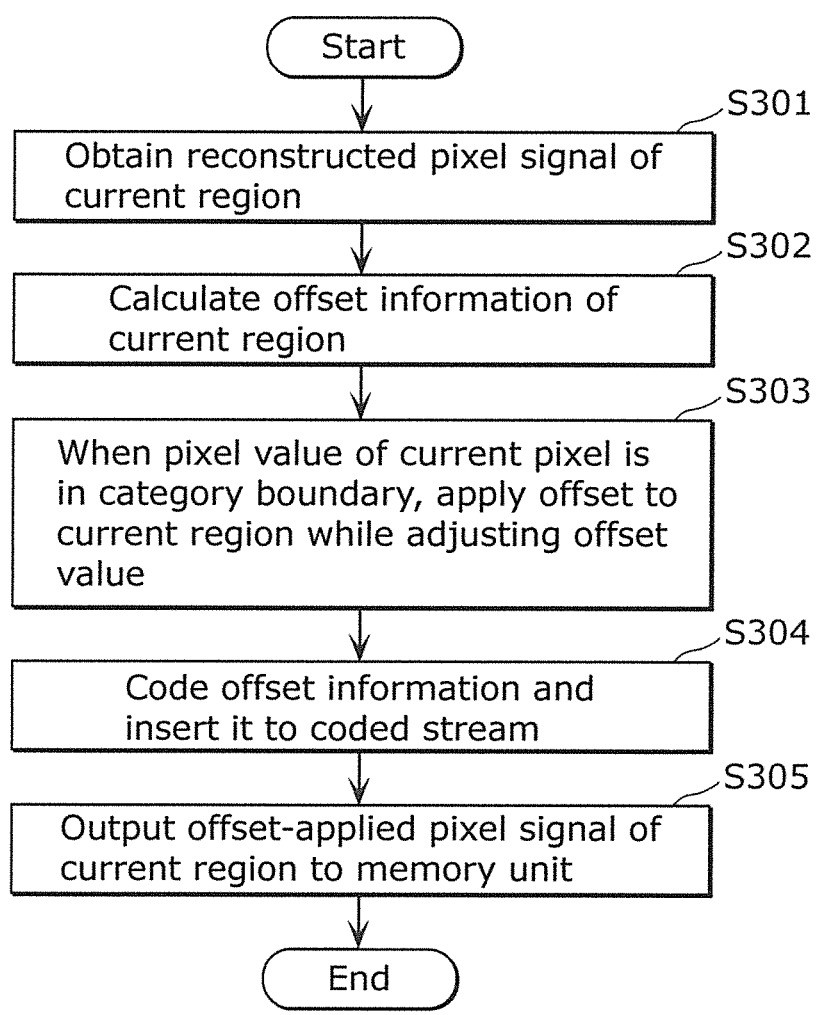
FIG. 23 is a flowchart showing an example of an operation of the loop filtering unit in the image coding apparatus according to Embodiment 2 of the present invention.

FIG. 22 shows a configuration of the loop filtering unit 300 according to Embodiment 2. FIG. 23 is a flowchart showing an operation of the loop filtering unit 300.

Descriptions of constituent elements same as those in Embodiment 1 are not given. Descriptions are given below of the differences from Embodiment 1, which are the control unit 306 and the offset processing unit 303 in FIG. 22 and Step S303 in the flowchart in FIG. 23. The signal obtainment unit 301, the offset information calculation unit 302, the offset information coding unit 305, and the signal output unit 304 perform similar processing to those performed by the signal obtainment unit 151, the offset information calculation unit 152, the offset information coding unit 154, and the signal output unit 155 according to Embodiment 1.

The control unit 306 controls the offset processing unit 303. More specifically, the control unit 306 adjusts offset values at a boundary between a current region and a neighboring region having different offset information (S303).

Figure 24:
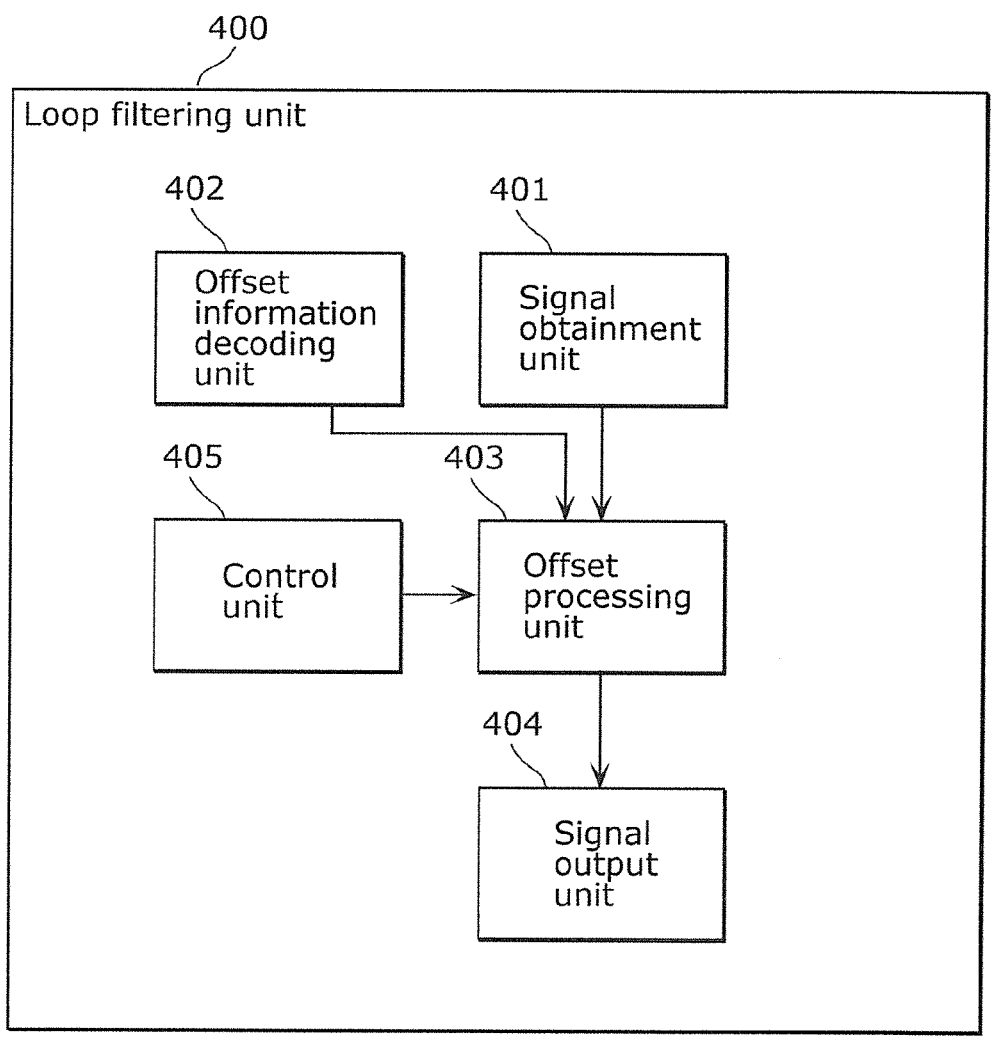
FIG. 24 is a block diagram showing an example of a configuration of a loop filtering unit in the image decoding apparatus according to Embodiment 2 of the present invention.

FIG. 24 shows a configuration of the loop filtering unit 400 of the image decoding apparatus corresponding to the loop filtering unit 300 shown in FIG. 22. FIG. 24 is a flowchart showing an operation of the loop filtering unit 400.

Figure 25:
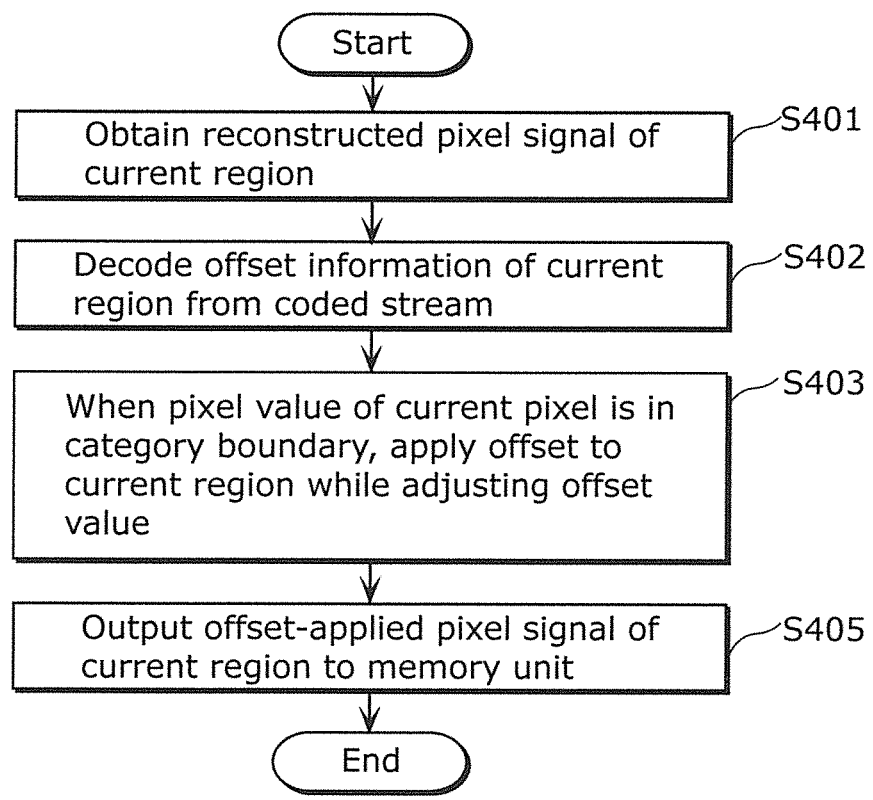
FIG. 25 is a flowchart showing an example of an operation of the loop filtering unit in the image decoding apparatus according to Embodiment 2 of the present invention.

Descriptions of constituent elements same as those in Embodiment 1 are not given. Descriptions are given below of the differences from Embodiment 1, which are the control unit 405 and the offset processing unit 403 in FIG. 24 and Step S403 in the flowchart in FIG. 25. The offset information decoding unit 402, the signal obtainment unit 401, and the signal output unit 404 perform similar processing to those performed by the offset information decoding unit 252, the signal obtainment unit 251, and the signal output unit 254 according to Embodiment 1.

The control unit 405 controls the offset processing unit 403. More specifically, the control unit 405 adjusts offset values at a boundary between a current region and a neighboring region having different offset information (S403).

The differences between the loop filtering unit 300 and the loop filtering unit 128 according to Embodiment 1 are the same as the differences between the loop filtering unit 400 and the loop filtering unit 228 according to Embodiment 1. Hence, the loop filtering units 300 and 400 are described in the following description.

First, a description is given of a method of determining a pixel value of a pixel for which an offset value is to be adjusted.

Figure 26:
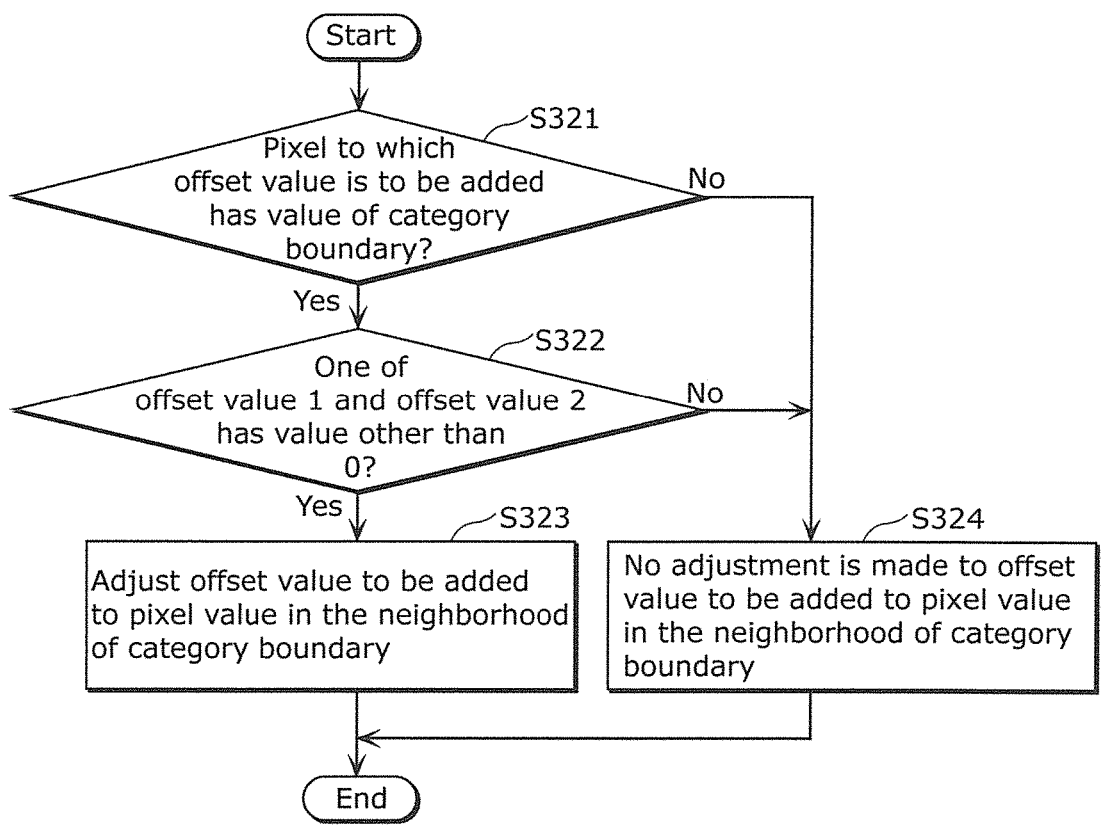
FIG. 26 is a flowchart of a determination process according to Embodiment 2 of the present invention.

FIG. 26 is a flowchart of a process of the determination.

First, the control unit of the loop filtering unit determines whether or not a pixel to which an offset value is to be added has a value of a category boundary (S321). Here, the category boundary refers to, for example, a boundary between a pixel having a value of R7-1 of category 7 and a pixel having a value of R7 of category 8 described with reference to FIG. 7. The range of the pixel value to be considered as a category boundary is not limited to one pixel value from a boundary as described above, but may also be two or more pixel values from the boundary.

When S321 is Yes, the control unit determines whether or not one of offset value 1 and offset value 2 is a value other than 0 (S322). Here, offset value 1 is an offset value in a category which includes a smaller pixel value at the category boundary. Offset 2 is an offset value in a category which includes a larger pixel value at the category boundary.

When S322 is Yes, the control unit adjusts offset values to be added to pixel values in the neighborhood of the category boundary (S323).

When S321 is No, or S322 is No, the control unit does not adjust offset values to be added to pixel values in the neighborhood of the category boundary (S324). Specifically, the offset processing unit applies offset in a manner similar to that in Embodiment 1.

FIG. 27A to FIG. 27C show examples of adjustment of offset values at a category boundary.

Here, a detailed description is given of a method of decreasing offset values in the neighborhood of the category boundary as shown in FIG. 27A. In the decreasing of offset values, it is necessary to determine (i) a range of pixel values for which offset values are to be decreased and (ii) weighting factors for the offset values.

First, the control unit determines a range of pixel values for which offset values are to be decreased. The range of the pixels is represented by NumRange. FIG. 28 shows an example when the NumRange=3. NumRange may be determined using operational precision of the loop filtering unit (sample adaptive offset unit) 300 and the loop filtering unit (sample adaptive offset unit) 400, or may be arbitrarily designated.

Next, weighting factors WeightedOffset for the offset values are determined. An example of the above is described with reference to FIG. 28. FIG. 28 shows an example of relationship between pixel values, classes (categories), and offset values in the neighborhood of a boundary between Class 7 and Class 8 when the operational precision of SAO is 8 bits. Here, it is assumed that the offset value for Class 7 is 8, and the offset value for Class 8 is −4. When NumRange=3, the pixel values for which offset values are to be decreased are 125, 126, 127 in Class 7, and 128, 129, and 130 in Class 8. Here, 127 is the upper limit of Class 7, and 128 is the lower limit of Class 8. The weighting factors WeightedOffset for the offset values to be applied to pixel values in the neighborhood of the upper limit may be obtained by, for example, Equation 1 below.

$$WeightedOffset(PixelValue) = \frac{UValue - PixelValue + 1}{NumRange + 1} \quad (1)$$

Here, UValue indicates the upper limit, and PixelValue indicates a pixel value. According to Equation (1), the amount of decrease of the offset value to be added increases toward the upper limit 127 of Class 7. More specifically, an offset value of 6 is added to a pixel value of 125, an offset value of 4 is added to a pixel value of 126, and an offset value of 2 is added to a pixel value of 127.

In the similar manner, the weighting factors Weighted-Offset for the offset values to be applied to pixel values in the neighborhood of the lower limit may be obtained by, for example, Equation 2 below.

$$WeightedOffset(PixelValue) = \frac{PixelValue - LValue + 1}{NumRange + 1} \quad (2)$$

Here, LValue indicates the lower limit. According to Equation (2), the amount of decrease of the offset value to be added increases toward the lower limit 128 of Class 8. More specifically, an offset value of −3 is added to a pixel value of 130, an offset value of −2 is added to a pixel value of 129, and an offset value of −1 is added to a pixel value of 128.

Alternatively, each of the weighting factors WeightedOffset may be determined according to an absolute value of an offset value of each class as shown by Equation (3) below.

$$WeightedOffset(Offset) = \frac{a}{|Offset|} \quad (3)$$

In Equation (3), Offset indicates an offset value, and a denotes a coefficient. With this, an offset value having a larger absolute value to be added to a pixel having a pixel value in the neighborhood of a class boundary is further decreased, and thereby preventing an increase in differences between DC components at the boundary between a current region and a neighboring region with pixels belonging to a different class. Optionally, weighting factors WeightedOffset may be set so that the amount of decrease non-linearly increases toward a class boundary or may be adjusted manually.

The range NumRange of pixel values for which offset values are to be decreased, and weighting factors WeightedOffset for the offset values may be coded and inserted to one of SPS, PPS, APS, SH, and slice data. FIG. 29 schematically shows an example of syntax of a coded stream according to Embodiment 2.

A description is given below of a specific method of adjusting offset values, with FIG. 27B as an example. Here, the control unit calculates offset values so that the offset values to be added to pixel values in the neighborhood of a category boundary smoothly change.

Figure 30:
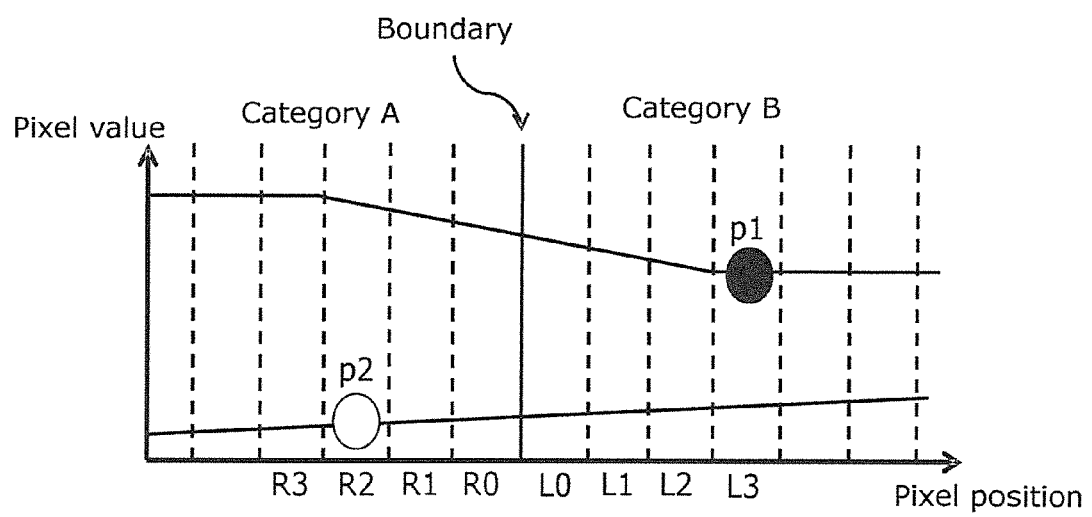
FIG. 30 schematically shows an example of adjustment of offset values according to Embodiment 2 of the present invention.

Here, a description is given of a calculation method, with reference to FIG. 30.

First, positions of pixels for which offset values are to be adjusted are determined. The position of each pixel is indicated using the pixel value range NumLine from a boundary. FIG. 30 shows an example where the NumLine=3. R2, R1, R0, L0, L1, and L2 are pixel values for which offset values are to be adjusted. R3 is a target pixel value for L0, L1, and L2, and L3 is a target pixel value for R2, R1, and R0. NumLine may be increased according to the bit precision of an image to which offset is to be applied, or may be uniform.

Next, weighting factors Weight used for calculating the offset values are determined. For example, to adjust offset values for the pixel values R2, R1, and R0 in FIG. 30, weighting factors Weight are determined as an array such as Weight[3]={1/8, 2/8, 3/8}. When the Weight is used, a pixel value closer to the boundary has a value closer to L3 that is the target pixel value in the neighboring category. In the similar manner, Weight[3]={3/8, 2/8, 1/8} is used for the pixel values L0, L1, and L2. When NumLine=1, for example, processing similar to that described below may be performed using Weight[3/4]; however, weighting factors Weight for NumLine may be arbitrarily set.

Hereinafter, a description is given of an example where an offset value for the pixel value R2 in category A is adjusted.

In FIG. 30, a black circle p1 indicates a pixel value of the target pixel value L3 in category B obtained after applying offset, and the pixel value is denoted as p1. In FIG. 30, a white circle p2 indicates a pixel value of a current pixel R2 obtained before applying offset, and the pixel value is denoted as p2. R2 has an offset value α as a result of category classification performed according to a pixel classification method. Furthermore, it is assumed here that an offset value to be added to match the pixel value of R2 and the pixel value of L3 is β. β is obtained by Equation (3).

$$\beta = p1 - p2 \quad (3)$$

In the case where an edge exists between R2 and L3, β becomes excessively large, which leads to an error. Hence, as shown in Equation (4), clipping may be performed.

$$\beta = Th1 \text{ (where } p1-p2 \geq Th1)$$

$$\beta = Th2 \text{ (where } p1-p2 \leq Th2)$$

$$\beta = p1-p2 \text{ (other than above)} \quad (4)$$

Th1 indicates the upper limit of clipping, and Th2 indicates the lower limit of clipping. Th1 and Th2 may be determined in such a manner that the range of the offset values to be added and the range of possible values of β are the same.

With the calculated offset values α and β, an offset value γ to be added to L0 is calculated by weighting as shown in Equation (5).

$$\gamma = \alpha \times (1 - Weight[0]) + \beta \times Weight[0] \quad (5)$$

Clipping may be performed so that the possible range of the offset value γ be the same as the range of the offset value to be added.

The above processing is performed also on R1, R0, L0, L1, and L2. Basically, the offset values are adjusted in the order from R2 (a smaller pixel value) to L2 (a larger pixel value); however, the order may be different.

In the similar manner to the example in FIG. 27A, it may be that the total number of lines from a boundary NumLine, and weighting factors for the offset values Weight are coded and inserted to one of SPS, PPS, APS, SH, and slice data.

It may also be that a flag is coded which specifies whether or not the offset value is to be adjusted, and the coded flag is inserted to one of SPS, PPS, APS, SH, and slice data.

By adjusting offset values only at the boundary between a current region and a neighboring region having different offset information in such a manner, subjective image quality is increased while decreasing coding efficiency degradation.

Although the image coding apparatus and the image decoding apparatus according to the present invention have been described above, the present invention is not limited to the above embodiments. The present invention further includes various variations of the embodiments which will occur to those skilled in the art, and other embodiments in which constituent elements of different embodiments are combined.

For example, processing which is executed by a particular processing unit may be executed by another processing unit. Furthermore, the order of steps in a process may be changed, and a plurality of processes may be executed in parallel. Furthermore, an additional dedicated or shared memory unit for storing various information items may be included in the configurations.

Embodiment 3

In Embodiment 1, it is possible that the same offset information is used for a plurality of regions. However, when the offset information is updated, and the updated offset value and the offset value before the update are different significantly, boundary artifacts occur at the region boundaries.

In Embodiment 3, offset values are adjusted in the neighborhood of region boundaries to reduce occurrence of artifacts at region boundaries, without decreasing offset effects.

A description is given of an image coding apparatus and an image decoding apparatus corresponding to the image coding apparatus according to Embodiment 3. The image coding apparatus according to Embodiment 3 includes a loop filtering unit 500 instead of the loop filtering unit 128 of the image coding apparatus 100 according to Embodiment 1. The image decoding apparatus according to Embodiment 3 corresponds to the image coding apparatus according to Embodiment 3. The image decoding apparatus includes a loop filtering unit 600 instead of the loop filtering unit 228 of the image decoding apparatus 200 according to Embodiment 1.

Figure 31:
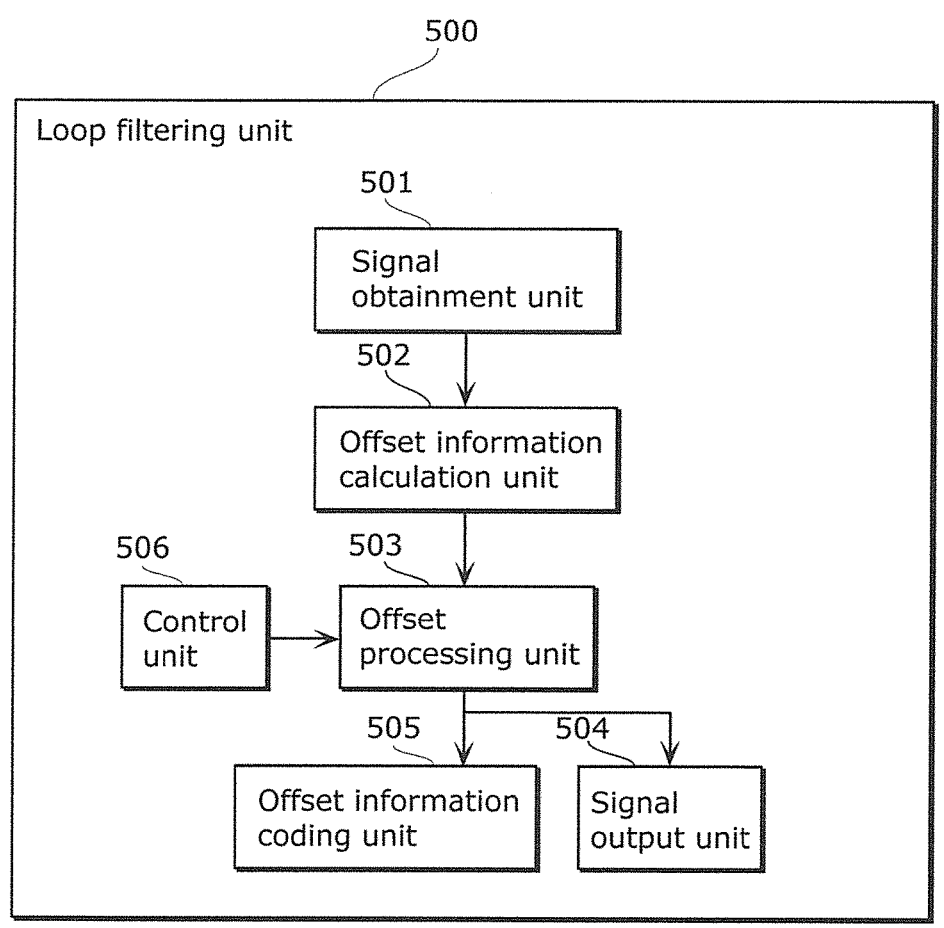
FIG. 31 is a block diagram showing an example of a configuration of a loop filtering unit in the image coding apparatus according to Embodiment 2 of the present invention.
Figure 32:
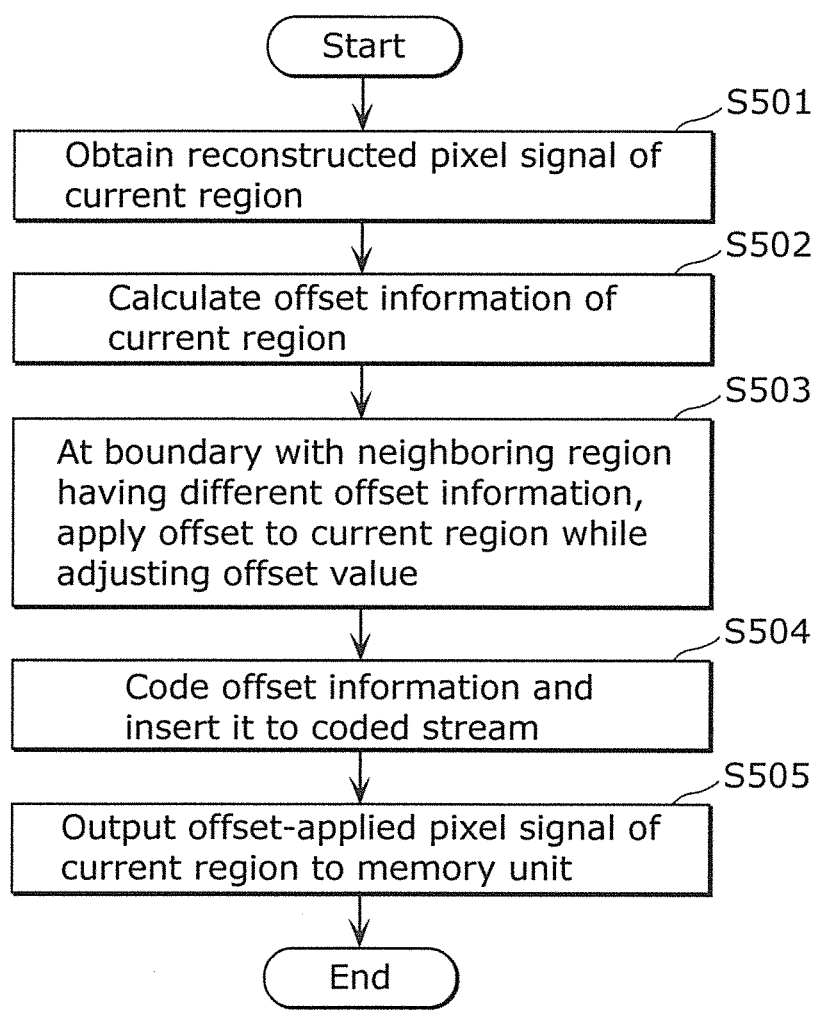
FIG. 32 is a flowchart showing an example of an operation of the loop filtering unit in the image coding apparatus according to Embodiment 2 of the present invention.

FIG. 31 shows a configuration of the loop filtering unit 500 according to Embodiment 3. FIG. 32 is a flowchart showing an operation of the loop filtering unit 500.

Descriptions of constituent elements same as those in Embodiment 1 are not given. Descriptions are given below of the differences from Embodiment 1, which are the control unit 506 and the offset processing unit 503 in FIG. 31 and Step S503 in the flowchart in FIG. 32. The signal obtainment unit 501, the offset information calculation unit 502, the offset information coding unit 505, and the signal output unit 504 perform similar processing to those performed by the signal obtainment unit 151, the offset information calculation unit 152, the offset information coding unit 154, and the signal output unit 155 according to Embodiment 1.

The control unit 506 controls the offset processing unit 503. More specifically, the control unit 506 adjusts offset values in the neighborhood of a boundary between a current region and a neighboring region having different offset information (S503).

Figure 33:
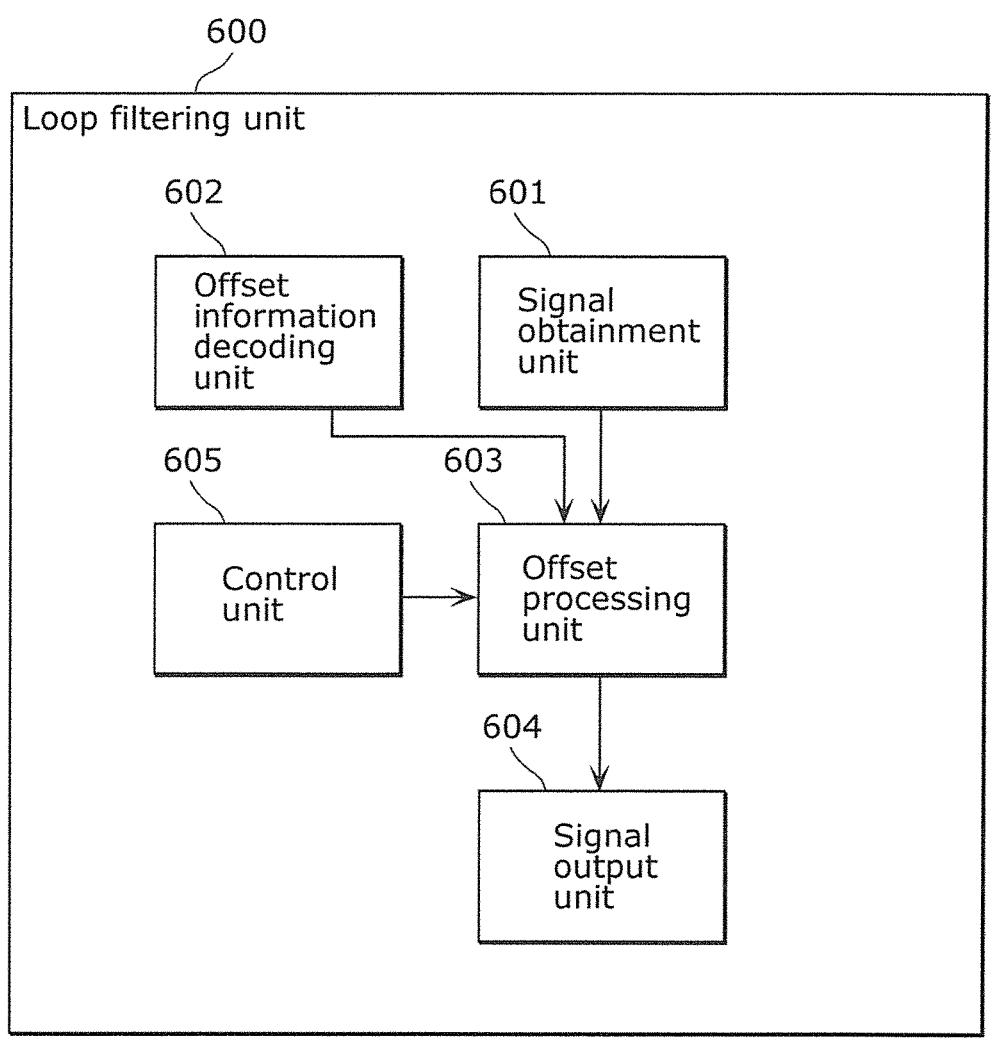
FIG. 33 is a block diagram showing an example of a configuration of a loop filtering unit in the image decoding apparatus according to Embodiment 2 of the present invention.
Figure 34:
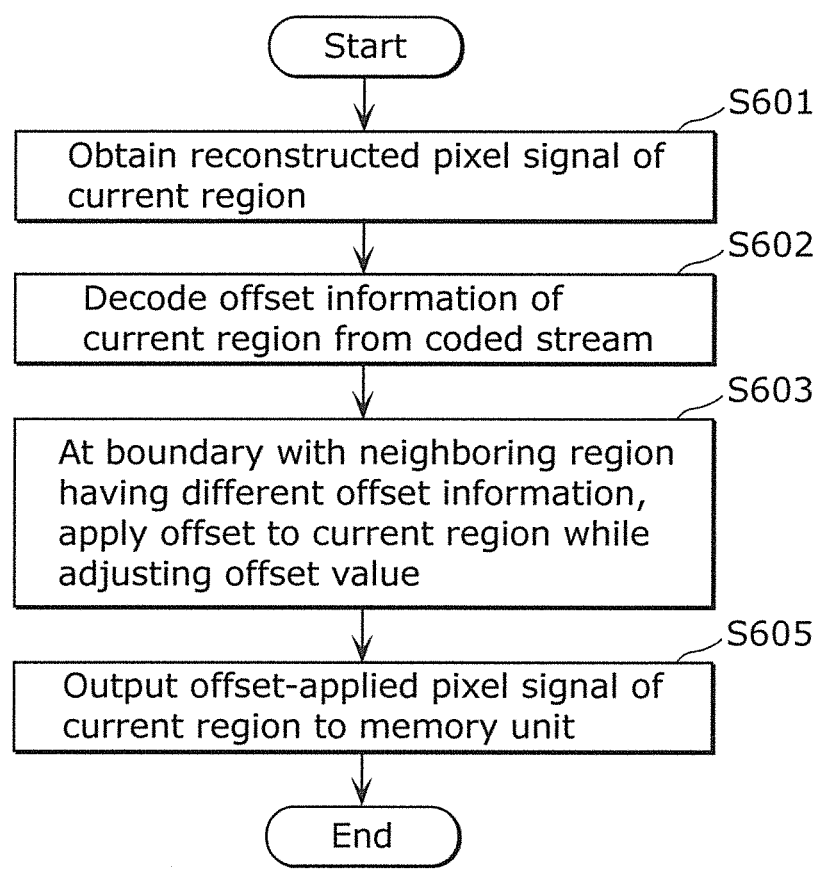
FIG. 34 is a flowchart showing an example of an operation of the loop filtering unit in the image decoding apparatus according to Embodiment 2 of the present invention.

FIG. 33 shows a configuration of the loop filtering unit 600 of the image decoding apparatus corresponding to the loop filtering unit 500 shown in FIG. 31. FIG. 34 is a flowchart showing an operation of the loop filtering unit 600.

Descriptions of constituent elements same as those in Embodiment 1 are not given. Descriptions are given below of the differences from Embodiment 1, which are the control unit 605 and the offset processing unit 603 in FIG. 33 and Step S603 in the flowchart in FIG. 34. The offset information decoding unit 602, the signal obtainment unit 601, and the signal output unit 604 perform similar processing to those performed by the offset information decoding unit 252, the signal obtainment unit 251, and the signal output unit 254 according to Embodiment 1.

The control unit 605 controls the offset processing unit 603. More specifically, the control unit 605 adjusts offset values in the neighborhood of a boundary between a current region and a neighboring region having different offset information (S603).

The differences between the loop filtering unit 500 and the loop filtering unit 128 according to Embodiment 1 are the same as the differences between the loop filtering unit 600 and the loop filtering unit 228 according to Embodiment 1. Hence, the loop filtering units 500 and 600 are described in the following description.

First, a description is given of a method of determining whether or not offset information is the same between a current region and a neighboring region.

Figure 35:
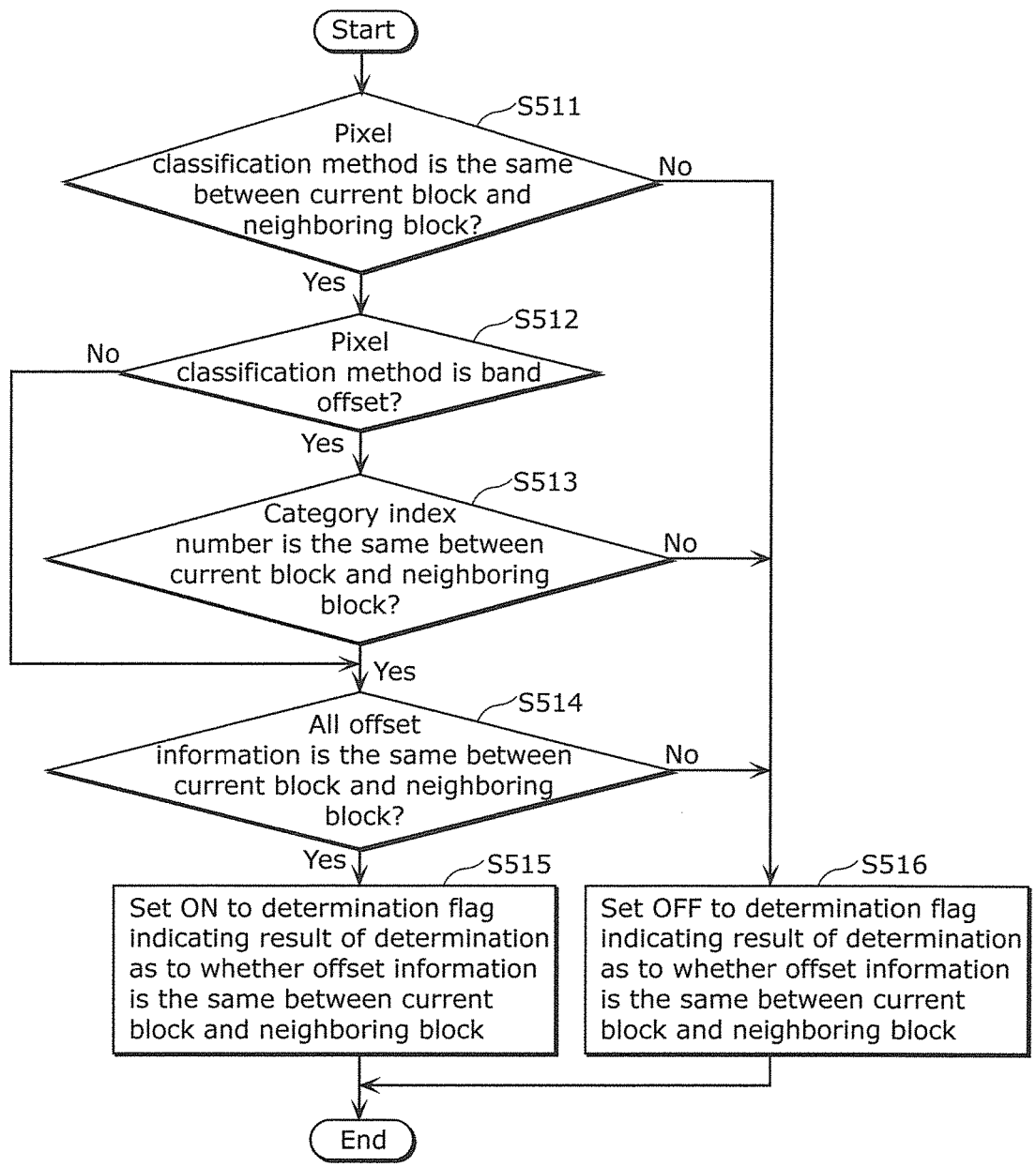
FIG. 35 is a flowchart of a determination process according to Embodiment 2 of the present invention.

FIG. 35 is a flowchart of a process of the determination. The offset information here includes a pixel classification method, a category index number of band offset, and an offset value; however, the present invention is not limited to this example.

First, the control unit of the loop filtering unit determines whether or not the pixel classification method is the same between a current block and a neighboring block (S511).

When S511 is Yes, the control unit determines whether or not the pixel classification method of the current block is band offset (S512).

When S512 is Yes, the control unit determines whether or not the category index number is the same between the current block and the neighboring block (S513).

When S513 is Yes, or when S512 is No, the control unit determines whether or not all of the offset values are the same between the current block and the neighboring block (S514).

When S514 is Yes, the control unit sets ON to the result of the determination (determination flag) as to whether or not the offset information is the same between the current block and the neighboring block (S515).

On the other hand, when S511, S513, or S514 is No, the control unit sets OFF to the result of the determination (determination flag) as to whether or not the offset information is the same between the current block and the neighboring block (S516).

Determination may be made by the processing up to S513, to reduce the amount of determination process. Furthermore, a flag may be coded which indicates whether the process of determination is to be performed up to S513 or S514. Here, the flag is inserted to one of SPS, PPS, APS, SH and slice data.

The numbers and the values used for the determination need not be completely the same. For example, when there is a difference of ±1 between the offset values, it may be determined that the offset values are the same. Furthermore, the allowable difference may be coded as a threshold. Here, a threshold value is inserted to one of SPS, PPS, APS, SH, and slice data.

For determining whether or not the offset information is the same between a current region and a neighboring region, a flag may be used which stores information indicating whether or not the offset information is the same between the current region and the neighboring region.

For the determination, a flag may be used to which ON or OFF is set in S515 and S516 above. Such flags may be coded instead of offset information to reduce an increase in bit quantity of a coded stream. Here, a description is given of an example where the following two kinds of flags are used. The flags are: a left flag which indicates that the offset information is the same as that of the neighboring region to the left of the current region (left neighboring region); and a top flag which indicates that the offset information is the same as that of the neighboring region on top of the current region (top neighboring region). In FIG. 17B, sao_merge_left_flag corresponds to a left flag, and sao_merge_up_flag corresponds to a top flag. Flags other than the above two kinds may be used. For example, other flags may be added, which are: a right flag which indicates that the offset information is the same as that of the neighboring region to the right of the current region; and a bottom flag which indicates that the offset information is the same as that of the neighboring region on the bottom of the current region.

Figure 36:
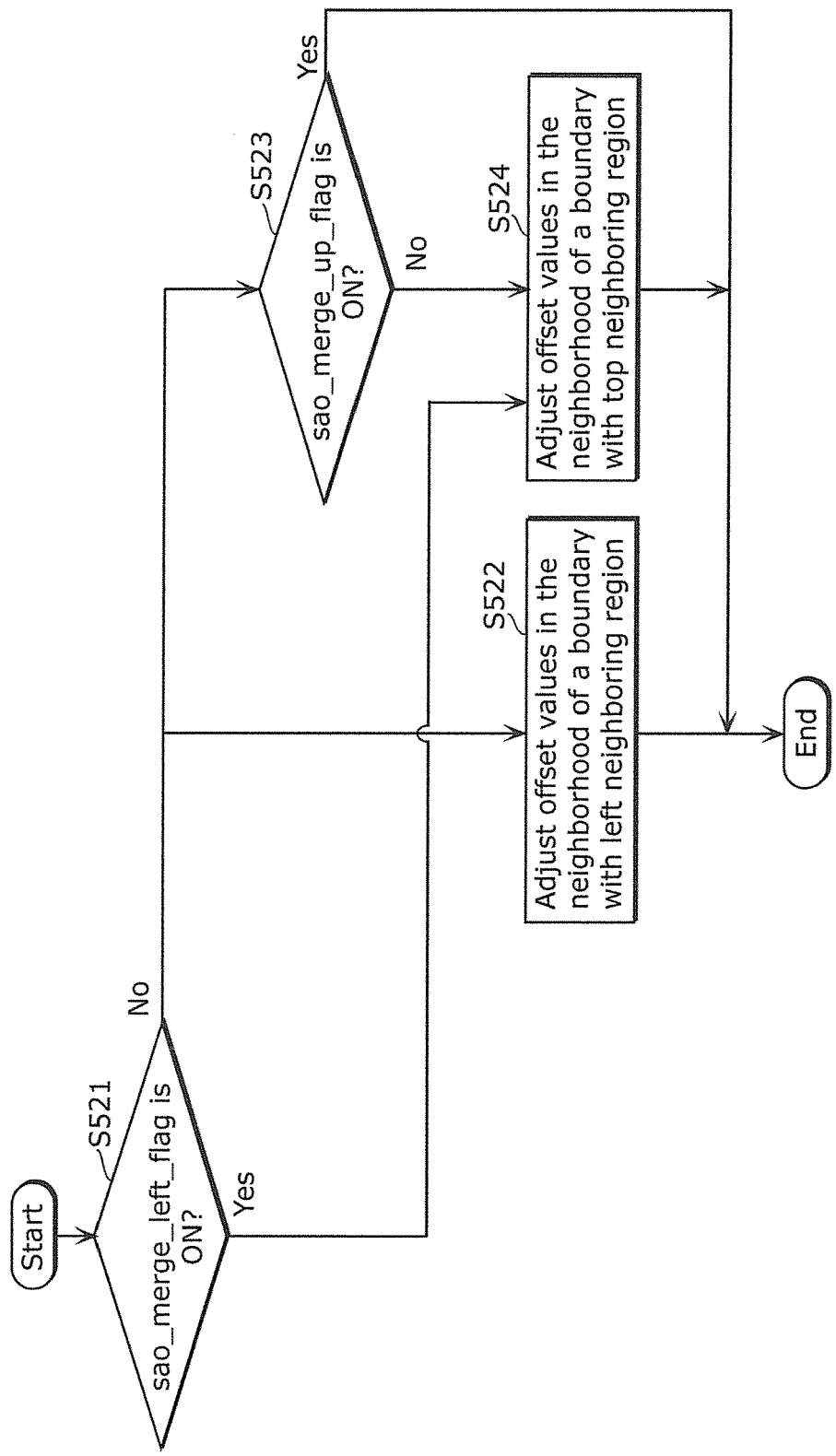
FIG. 36 is a flowchart of a determination process according to Embodiment 2 of the present invention.

FIG. 36 is a flowchart of a process of determination using the above flags.

First, the control unit determines whether or not sao_merge_left_flag is ON (S521).

When S521 is No, the control unit adjusts the offset values in the neighborhood of a boundary with the left neighboring region (S522). Here, the control unit further determines whether or not sao_merge_up_flag is ON (S523).

When S521 is Yes, or S523 is No, the control unit adjusts offset values in the neighborhood of a boundary with the top neighboring region (S524).

In this example, a top flag does not exist when the left flag is ON. This is because one neighboring region which shares the offset information is sufficient to reduce bit quantity of the flag itself. However, the present invention is not limited to this example. Both of the left flag and the top flag may always be used.

Here, when sao_merge_left_flag is ON, the offset values are always adjusted in the neighborhood of a boundary with the top neighboring region; however, it may be that the offset values are not adjusted in the neighborhood of a boundary with the top neighboring region.

Next, a description is given of a method of adjusting offset values.

A description is given below of a specific method of adjusting offset values, with FIG. 37A as an example. In the adjustment of the offset values, it is necessary to determine information of (i) positions of pixels for which offset values are to be adjusted, and (ii) weighting factors for the offset values.

Figure 38:
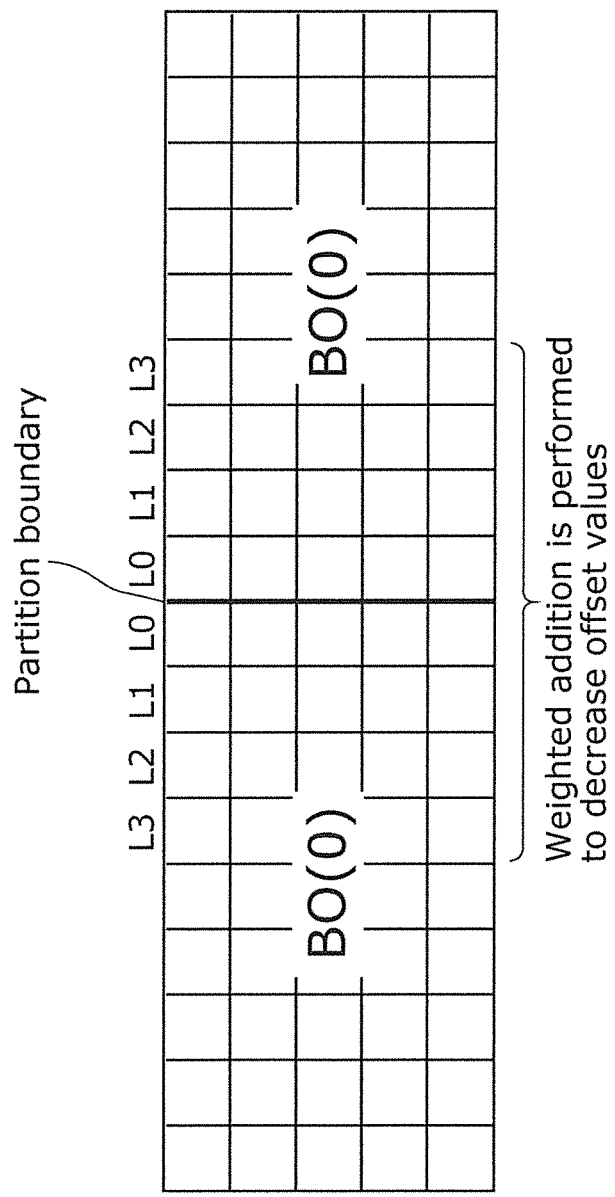
FIG. 38 schematically shows an example of adjustment of offset values according to Embodiment 2 of the present invention.

First, the control unit determines positions of pixels for which offset values are to be adjusted. The position of each pixel is indicated using the total number of lines NumLine from a boundary. FIG. 38 shows an example where the NumLine=4. In the case where a deblocking filter is applied before sample adaptive offset is applied, NumLine may be determined by using the total number of lines from a boundary of blocks to which deblocking filter is applied, or may be arbitrarily designated.

Next, the control unit determines weighting factors WeightedOffset for the offset values. For example, to adjust offset values in the lines L3, L2, L1, and L0 in FIG. 38 by bit-shifting, the control unit determines weighting factors WeightedOffset as WeightedOffset[4]={1, 2, 3, 4} with the shift amounts of bits for the lines being an integer array. When the WeightedOffset is used, an offset value closer to the boundary is decreased more.

Alternatively, each of the weighting factors WeightedOffset may be determined as a factor having NumLine as a denominator and a distance from a boundary as a numerator as represented by Equation (6).

$$WeightedOffset(\text{Dist}) = \frac{\text{Dist}}{NumLine} \qquad (6)$$

In Equation (6), Dist denotes a distance from a boundary with respect to an origin which is a pixel on the boundary. When Equation (6) is used, the weighting factors for the L3, L2, L1, and L0 in FIG. 38 are 3/4, 2/4, 1/4, and 0/4, respectively.

Alternatively, each of the weighting factors WeightedOffset may be determined according to an absolute value of an offset value as represented by Equation (7).

$$WeightedOffset(\text{Offset}) = \frac{a}{|\text{Offset}|} \qquad (7)$$

In Equation (7), Offset indicates an offset value, and a denotes a coefficient. When this is applied, an offset value having a greater absolute value is decreased more in the neighborhood of a boundary, and thereby preventing an increase in difference between DC components on both sides of the boundary.

Optionally, weighting factors WeightedOffset may be set so that the amount of decrease non-linearly increases toward a boundary or may be adjusted manually.

The total number of lines from a boundary NumLine and the weighting factors WeightedOffset for offset values may be coded, and inserted into one of SPS, PPS, APS, SH, and slice data. FIG. 39 schematically shows an example of syntax of a coded stream according to Embodiment 3.

A description is given below of a specific method of adjusting offset values, with FIG. 37C as an example. Here, pixel values of a current block in the neighborhood of a boundary with the left neighboring block are calculated so as to be close to the pixel value of the right end pixel of the left neighboring block.

Figure 40:
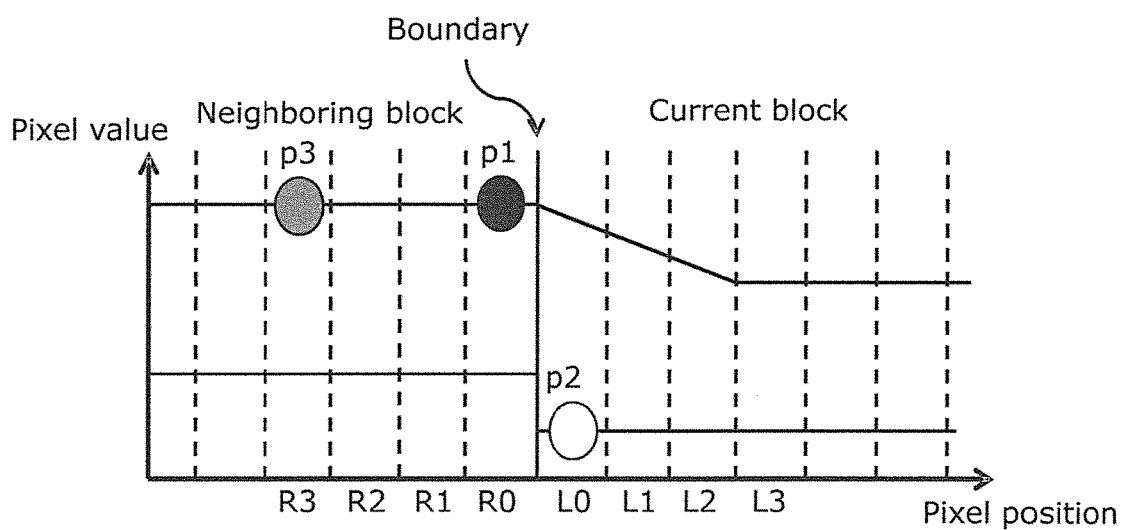
FIG. 40 schematically shows an example of adjustment of offset values according to Embodiment 2 of the present invention.

Here, a description is given of a calculation method, with reference to FIG. 40.

First, the control unit determines positions of pixels for which offset values are to be adjusted. The position of each pixel is indicated using the total number of lines NumLine from a boundary. FIG. 40 shows an example where the NumLine=3.

Here, L0, L1, and L2 are pixels for which offset values are to be adjusted. In the case where a deblocking filter is applied before offset is applied, NumLine may be determined by using the total number of lines from a boundary of blocks to which deblocking filter is applied, or may be arbitrarily designated.

Next, weighting factors Weight for calculating the offset values are determined. For example, to adjust offset values for pixels of L2, L1, and L0 in FIG. 40, the weighting factors Weight is determined as an integer array such as Weight[3]={3/4, 2/4, 1/4}. When the Weight is used, a pixel value closer to the boundary has a value closer to the pixel value of the right end pixel of the left neighboring block.

Hereinafter, a description is given of an example where the pixel position is L0.

In FIG. 40, a block circle indicates a pixel value of the right end pixel R0 of the left neighboring block obtained after applying offset, and the pixel value is p1. In FIG. 40, a white circle indicates a pixel value of L0 of a current block obtained before applying offset, and the pixel value is p2. L0 has an offset value $\alpha$ as a result of category classification performed according to a pixel classification method. Furthermore, it is assumed that an offset value to be added to match the pixel value of R0 and the pixel value of L0 is $\beta$. $\beta$ is obtained by Equation (8).

$$\beta = p1 - p2 \quad (8)$$

In the case where edges exist in R0 and L0, $\beta$ becomes excessively large, which leads to an error. Hence, as shown in Equation (9), clipping may be performed.

$$\beta = Th1 \text{ (where } p1-p2 \geq Th1\text{)}$$

$$\beta = Th2 \text{ (where } p1-p2 \leq Th2\text{)}$$

$$\beta = p1-p2 \text{ (other than above)} \quad (9)$$

Th1 indicates the upper limit of clipping, and Th2 indicates the lower limit of clipping. Th1 and Th2 may be determined in such a manner that the range of the offset values to be added and the range of possible values of $\beta$ are the same.

With the calculated offset values $\alpha$ and $\beta$, an offset value $\gamma$ to be added to L0 is calculated by weighting as shown in Equation (10).

$$\gamma = \alpha \times (1 - \text{Weight}[0]) + \beta \times \text{Weight}[0] \quad (10)$$

Clipping may be performed so that the possible range of the offset value $\gamma$ be the same as the offset value to be added.

The above processing is also performed on L1 and L2. Here, offset is basically applied in the order of L0, L1, and L2, but the order may be different.

Processing may be performed on only one of the left and top neighboring pixels, or both of the left and top neighboring pixels.

Descriptions have been given above of an example where offset values are adjusted at the boundaries with left and top neighboring regions, with reference to FIG. 36; however, similar processing may be performed at the boundary with right or bottom neighboring region.

Furthermore, in the example above, an offset value $\gamma$ is calculated so as to have a pixel value closer to the pixel value of the right end pixel R0 of the left neighboring block; however, the offset value $\gamma$ may be calculated so as to have a pixel value closer to the pixel value of the pixel R2 in the left neighboring block. In this case, in the Equations (8) and (9), the pixel value p3 is used instead of p1. The pixel value p3 is a pixel value of the pixel R3 which is obtained after applying offset and which is indicated by a gray circle in FIG. 30.

Figure 37A:
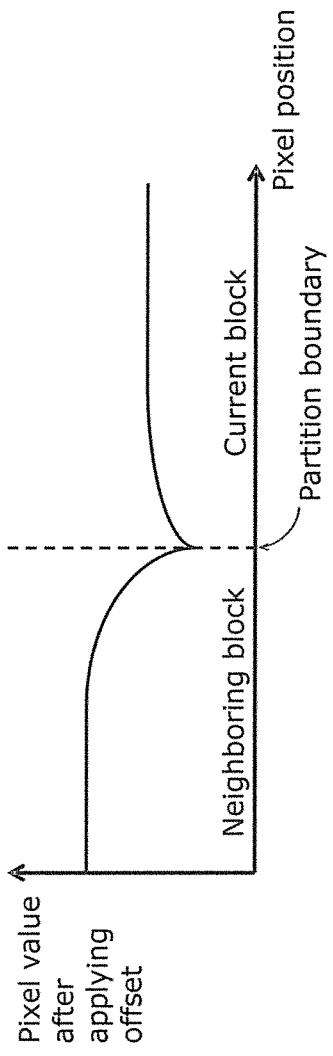
FIG. 37A schematically shows an example of adjustment of offset values according to Embodiment 2 of the present invention.
Figure 37B:
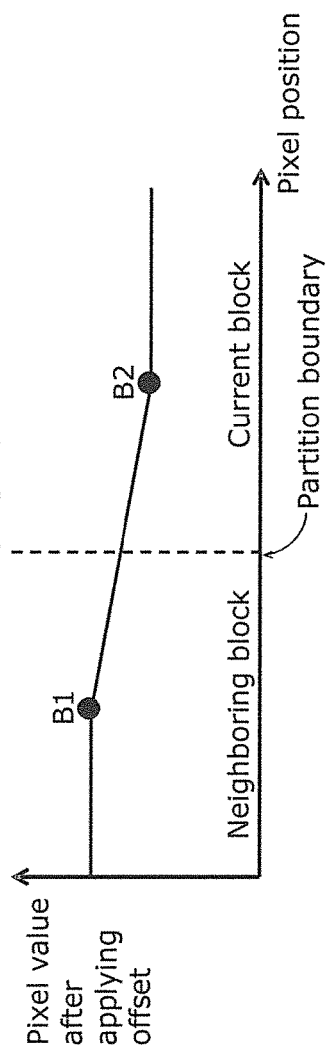
FIG. 37B schematically shows an example of adjustment of offset values according to Embodiment 2 of the present invention.
Figure 37C:
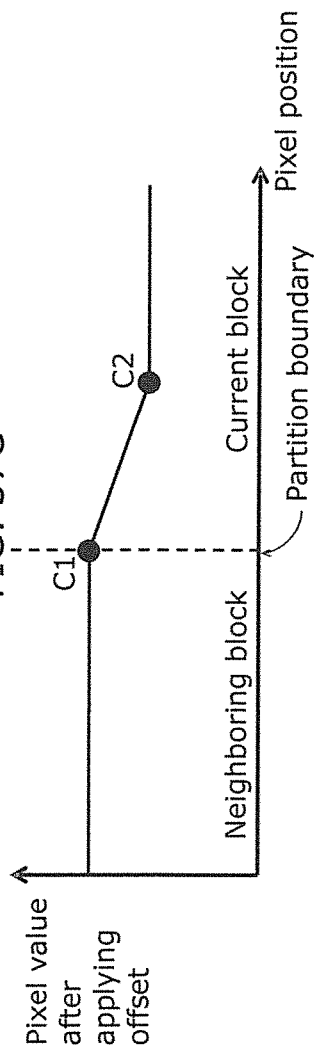
FIG. 37C schematically shows an example of adjustment of offset values according to Embodiment 2 of the present invention.

In the similar manner to the example in FIG. 37A, it may be that the total number of lines from a boundary NumLine, and weighting factors for the offset values Weight are coded and inserted to one of SPS, PPS, APS, SH, and slice data.

It may also be that a flag is coded which specifies whether or not the offset value is to be adjusted, and the coded flag is inserted to one of SPS, PPS, APS, SH, and slice data.

By adjusting offset values only at the boundary between a current region and a neighboring region having different offset information in such a manner, subjective image quality is increased while decreasing coding efficiency degradation.

Although the image coding apparatus and the image decoding apparatus according to the present invention have been described above, the present invention is not limited to the above embodiments. The present invention further includes various variations of the embodiments which will occur to those skilled in the art, and other embodiments in which constituent elements of different embodiments are combined.

For example, processing which is executed by a particular processing unit may be executed by another processing unit. Furthermore, the order of steps in a process may be changed, and a plurality of processes may be executed in parallel. Furthermore, an additional dedicated or shared memory unit for storing various information items may be included in the configurations.

Each of the constituent elements in each of the above-described embodiments may be configured in the form of an exclusive hardware product, or may be implemented by executing a software program suitable for the structural element. The constituent elements may be implemented by a program execution unit such as a CPU or a processor which reads and executes a software program recorded on a recording medium such as a hard disk or a semiconductor memory. Examples of the software program which implements the image coding apparatus or the like in the embodiments include a program as follows.

Specifically, the program causes a computer to execute an image coding method in which offset is applied when an image is coded, the offset being of at least two types including edge offset and band offset. The image coding method includes: obtaining a pixel signal of a current region to be processed; calculating offset information including at least one of a location from which the offset information for the current region is obtained, a total number of blocks which share the offset information, a pattern of partitioning the current region, a pixel classification method for classifying pixels into categories, a category index number of band offset, or an offset value; applying offset to the current region using the offset information, the offset being applied with adjustment to the offset value when a predetermined condition is satisfied; coding the offset information; outputting an offset-applied signal generated by the applying of offset; and controlling the applying of offset. Furthermore, the program causes a computer to execute an image decoding method in which offset is applied when an image is decoded, the offset being of at least two types including edge offset and band offset. The image decoding method includes: obtaining a pixel signal of a current region to be processed; obtaining offset information to be used for applying offset, from a coded stream; applying offset to the current region using the offset information, the offset being applied with adjustment to the offset value when a predetermined condition is satisfied; outputting an offset-applied signal generated by the applying of offset; and controlling the applying of offset.

Embodiment 4

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 41:
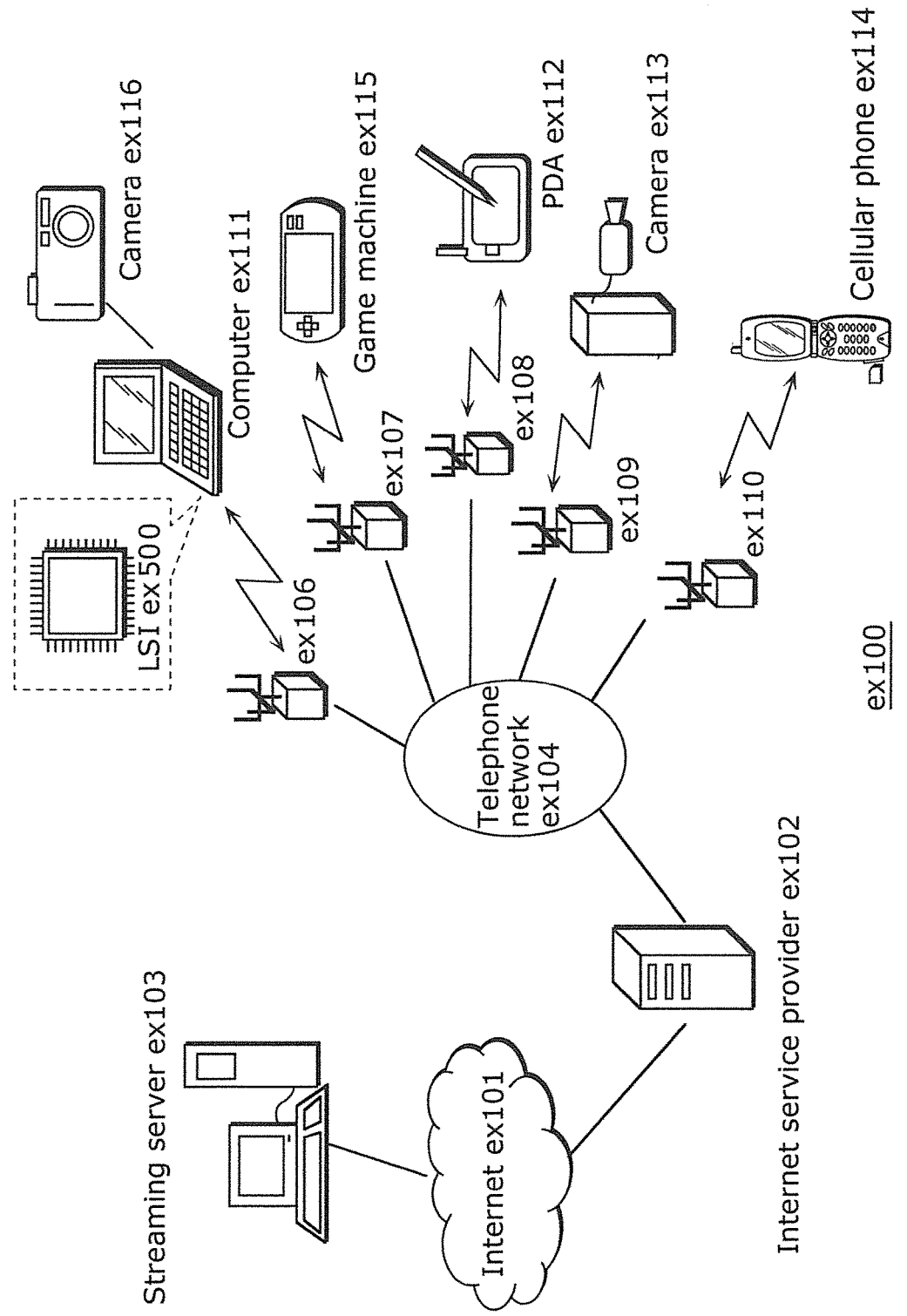
FIG. 41 shows an overall configuration of a content providing system for implementing content distribution services.

FIG. 41 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 41, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 42:
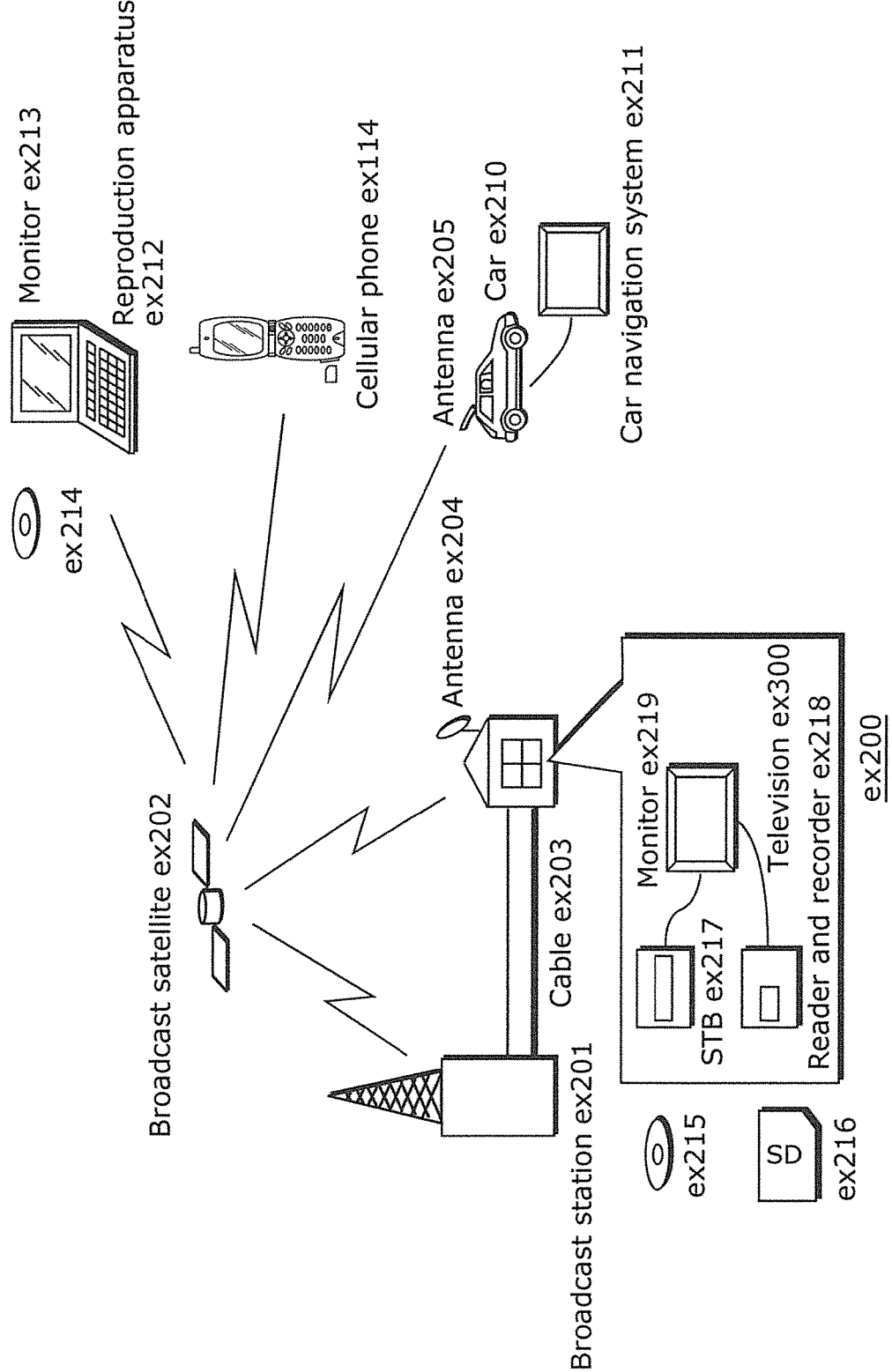
FIG. 42 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 42. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 43:
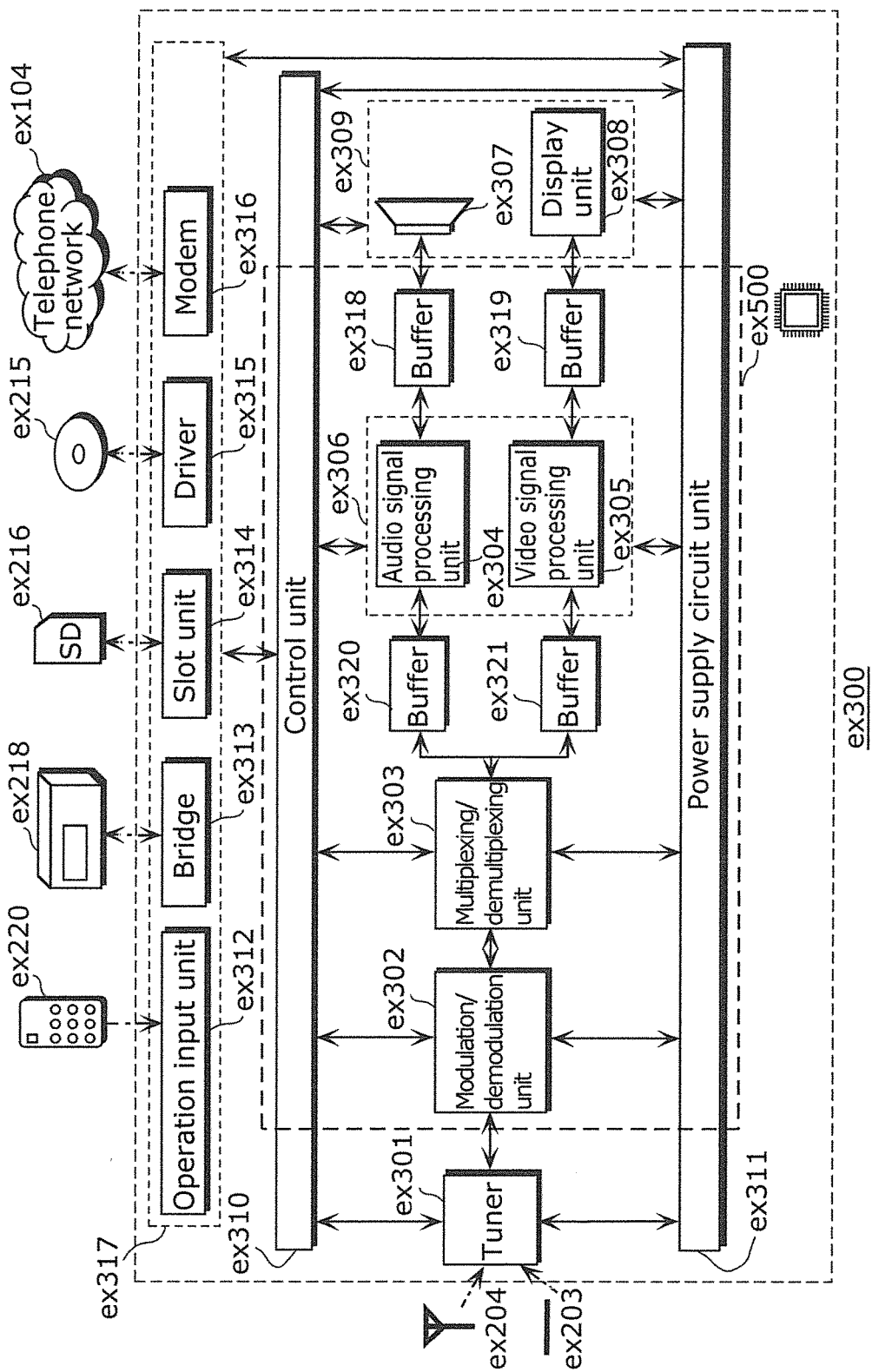
FIG. 43 shows a block diagram illustrating an example of a configuration of a television.

FIG. 43 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 44:
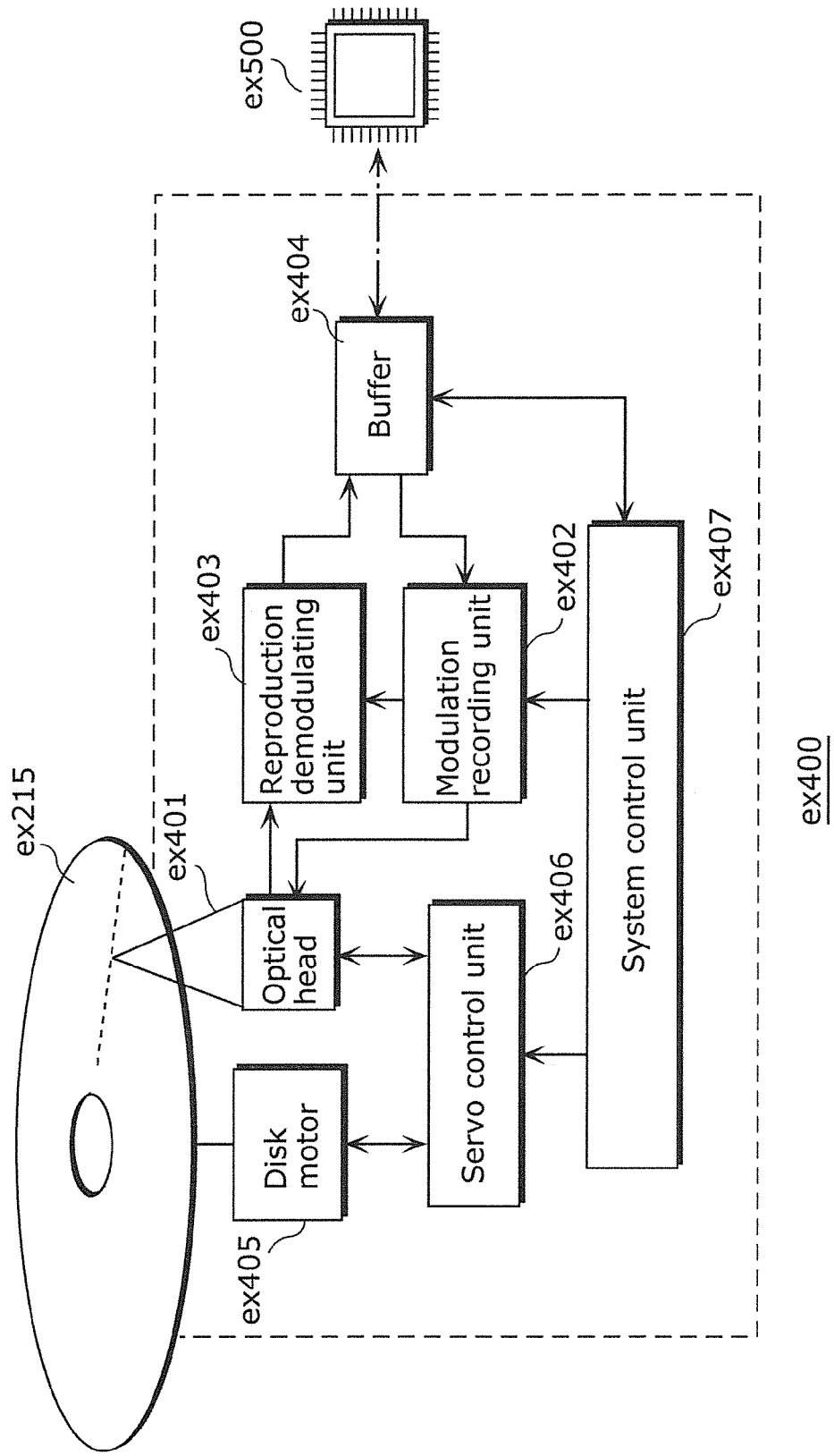
FIG. 44 shows a block diagram illustrating an example of a configuration of an information reproducing/recording unit that reads and writes information from and on a recording medium that is an optical disk.

As an example, FIG. 44 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 45:
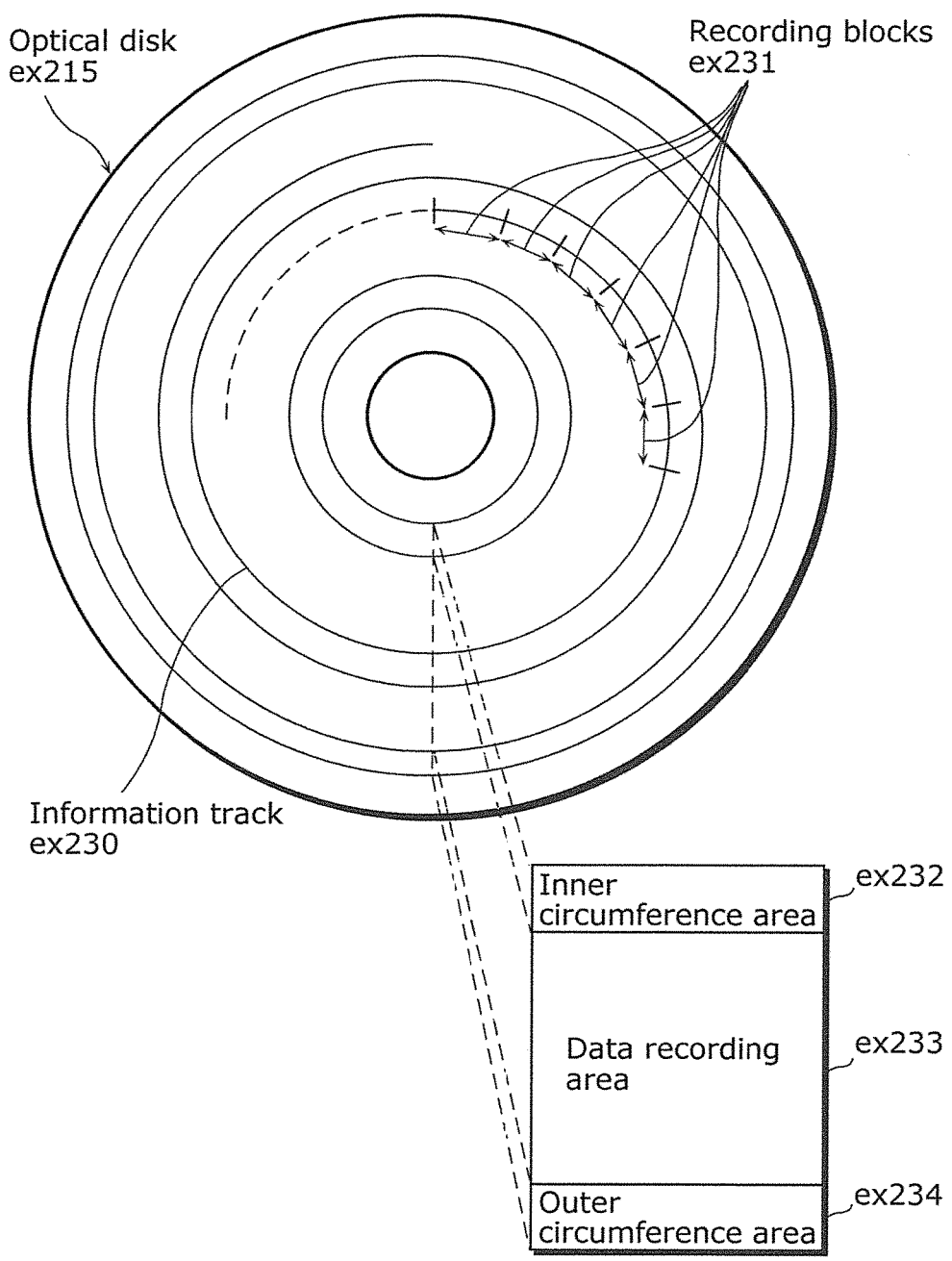
FIG. 45 shows an example of a configuration of a recording medium that is an optical disk.

FIG. 45 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 43. The same will be true for the configuration of the computer ex111, the cellular phone ex114, and others.

Figure 46A:
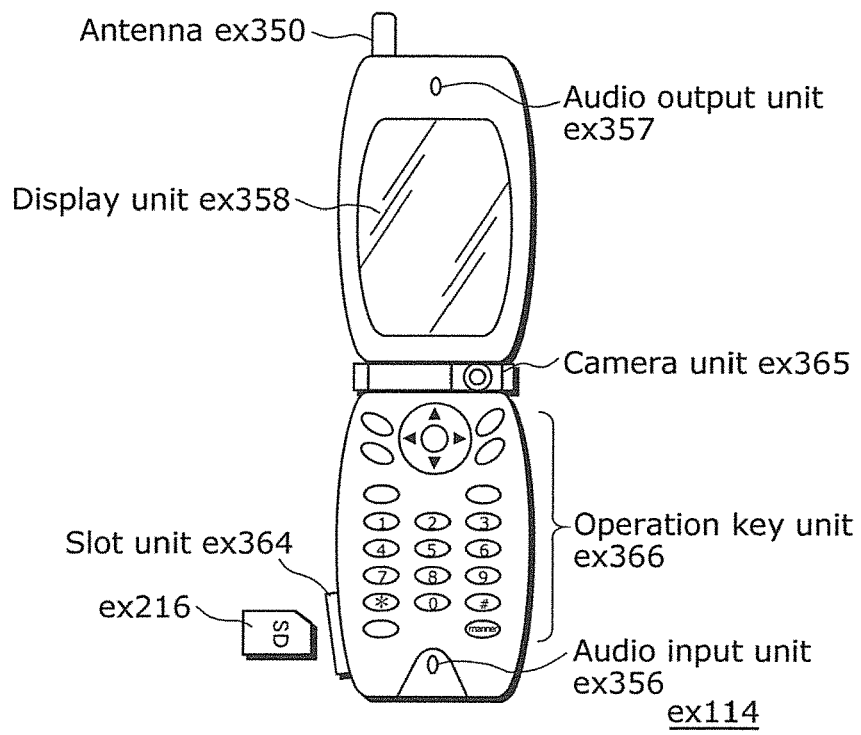
FIG. 46A shows an example of a cellular phone.

FIG. 46A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 46B:
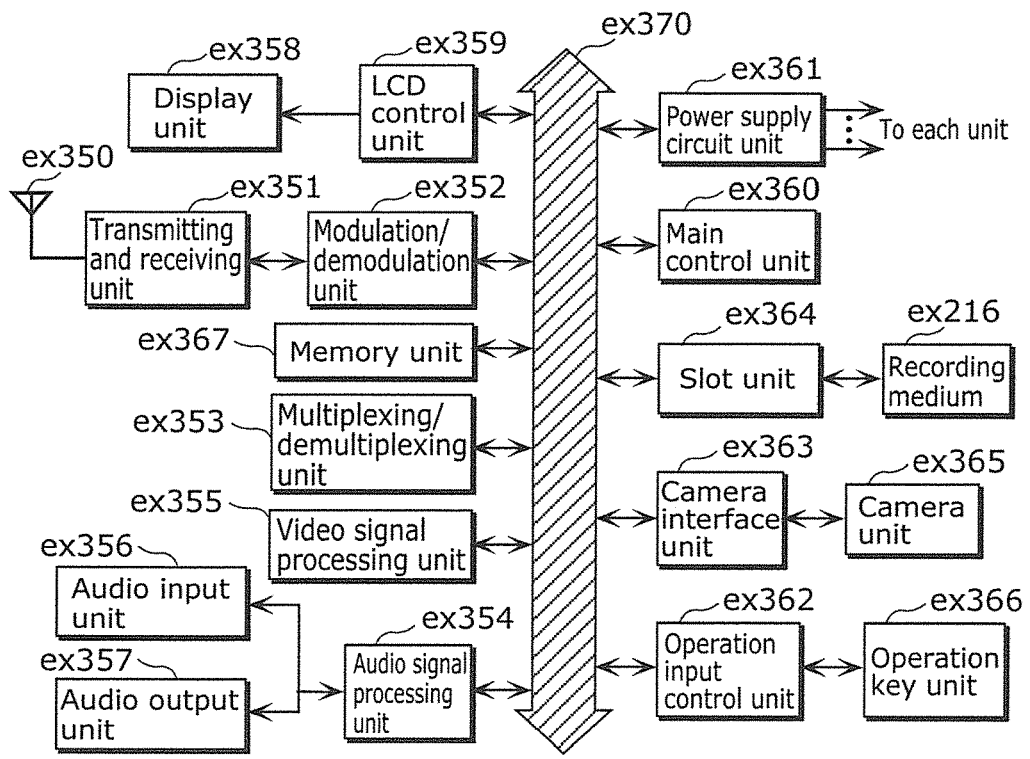
FIG. 46B is a block diagram showing an example of a configuration of a cellular phone.

Next, an example of a configuration of the cellular phone ex114 will be described with reference to FIG. 46B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 5

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 47 illustrates a structure of the multiplexed data. As illustrated in FIG. 47, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 48:
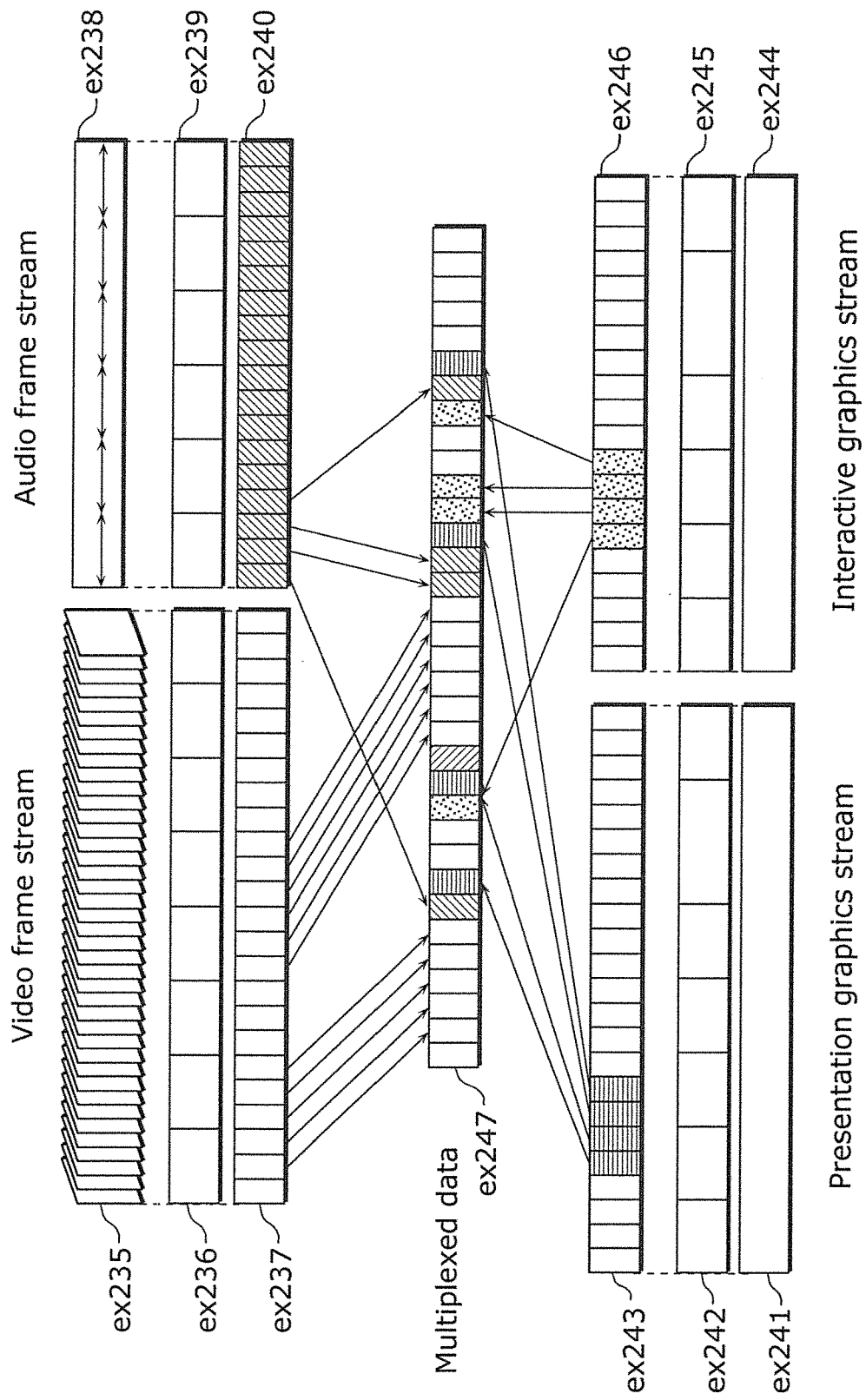
FIG. 48 schematically shows how each stream is multiplexed in multiplexed data.

FIG. 48 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 49:
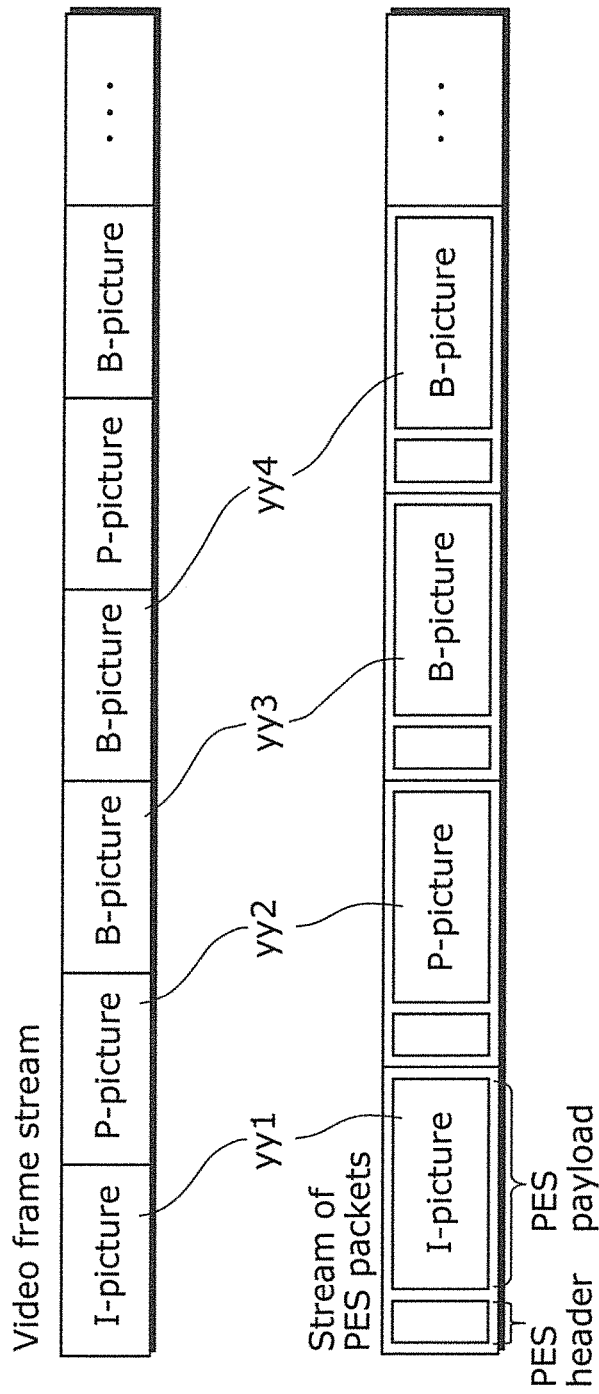
FIG. 49 shows how a video stream is stored in a stream of PES packets in more detail.

FIG. 49 illustrates how a video stream is stored in a stream of PES packets in more detail. The first bar in FIG. 49 shows a video frame stream in a video stream. The second bar shows the stream of PES packets. As indicated by arrows denoted as yy1, yy2, yy3, and yy4 in FIG. 49, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 50:
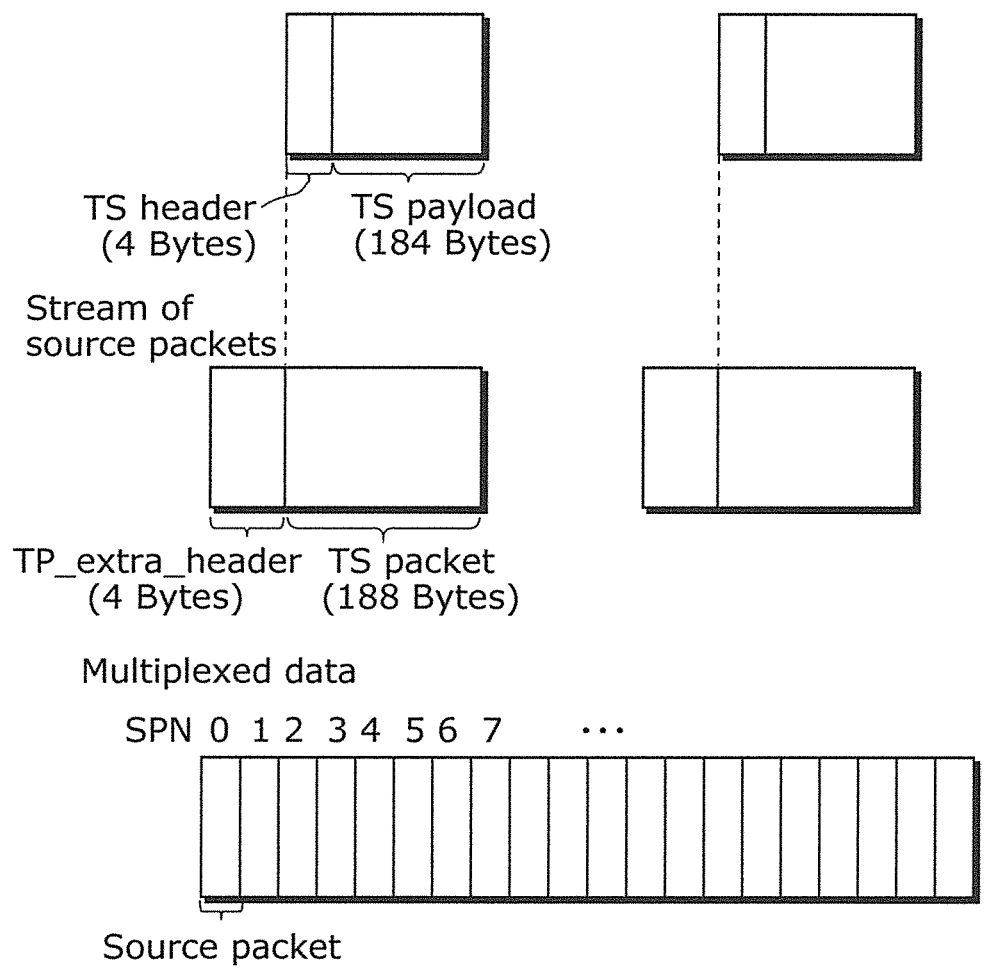
FIG. 50 shows a structure of TS packets and source packets in the multiplexed data.

FIG. 50 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 50. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 51:
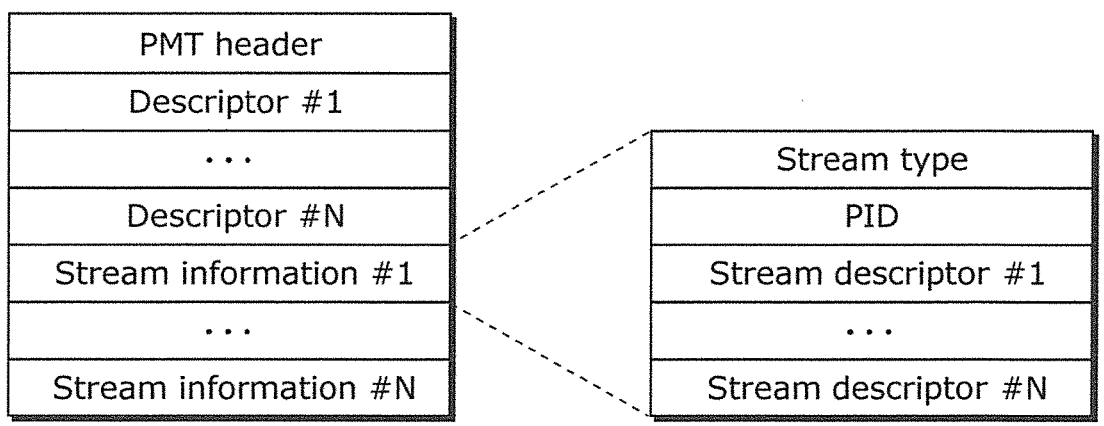
FIG. 51 shows a data structure of a PMT.

FIG. 51 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data. The stream descriptors are equal in number to the number of streams in the multiplexed data.

When the multiplexed data is recorded on a recording medium and others, it is recorded together with multiplexed data information files.

Figure 52:
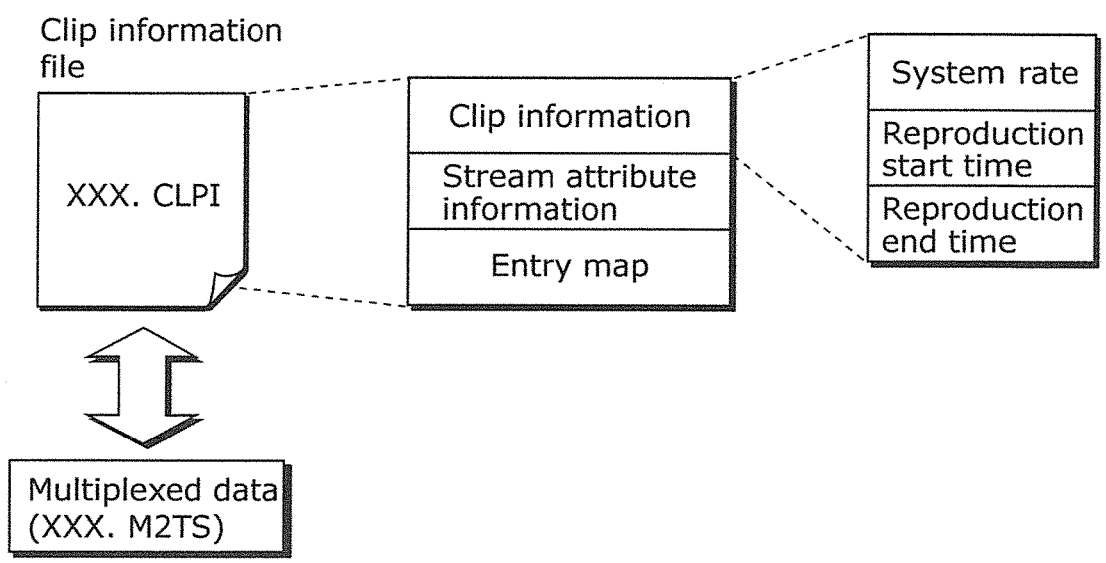
FIG. 52 shows an internal structure of multiplexed data information.

Each of the multiplexed data information files is management information of the multiplexed data as shown in FIG. 52. The multiplexed data information files are in one to one correspondence with the multiplexed data, and each of the files includes multiplexed data information, stream attribute information, and an entry map.

As illustrated in FIG. 52, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 53:
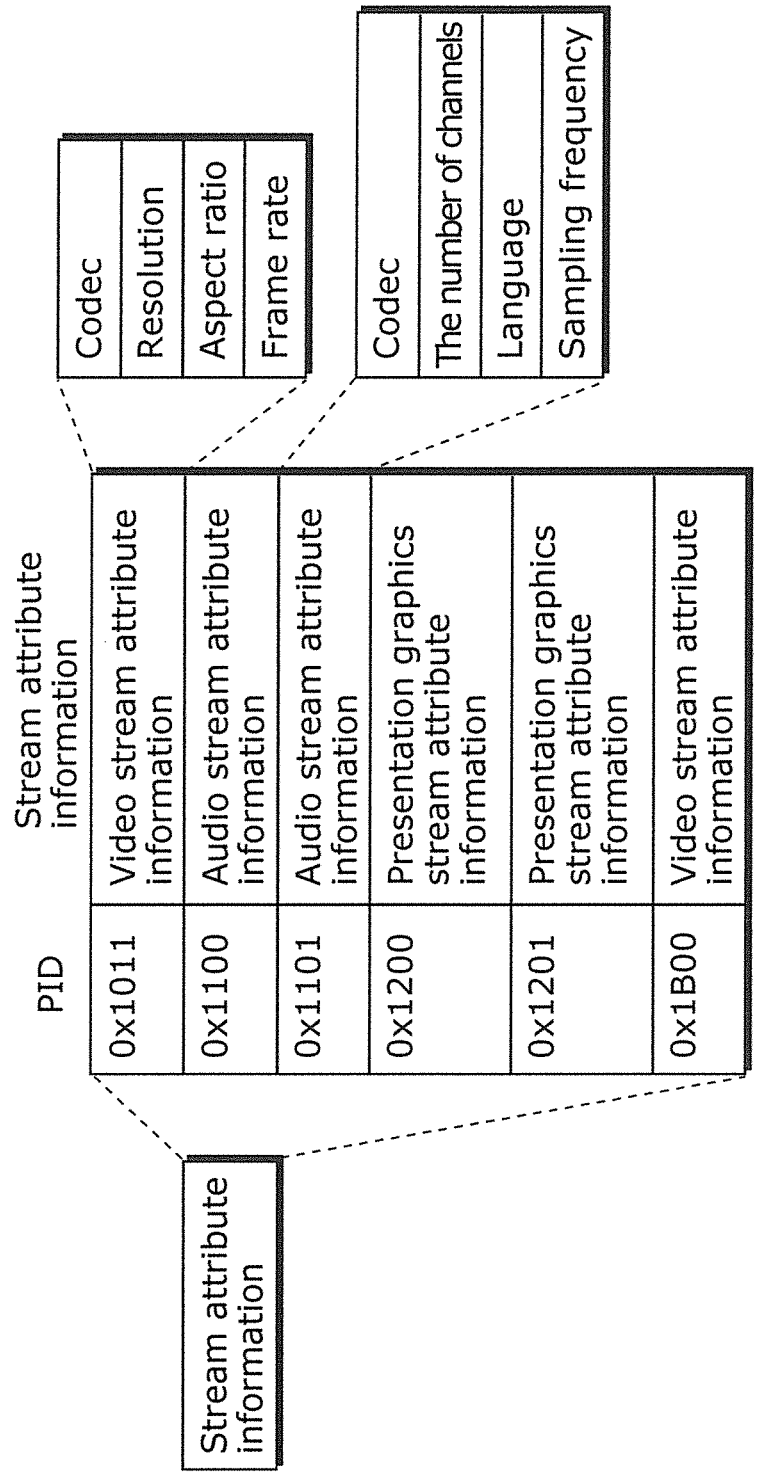
FIG. 53 shows an internal structure of stream attribute information.

As shown in FIG. 53, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 54:
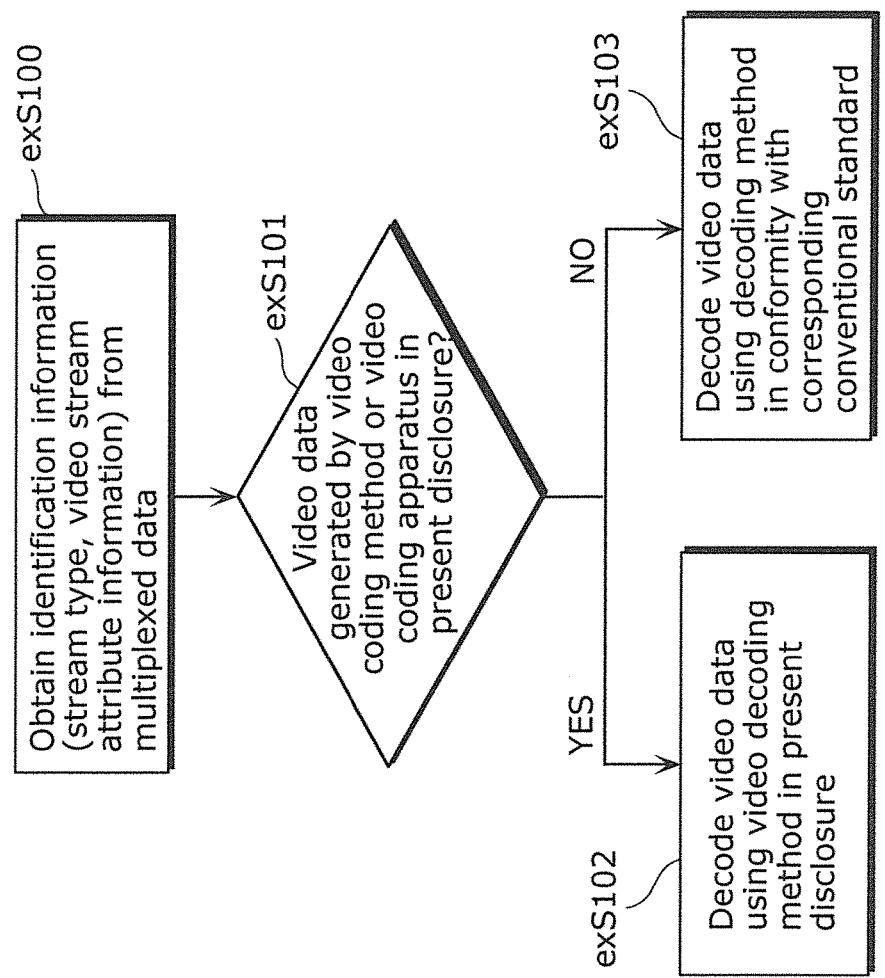
FIG. 54 shows steps for identifying video data.

Furthermore, FIG. 54 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by selecting a reference picture or a motion vector from candidates according to the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards. For example, when the attribute information shows that the stream conforms to the MPEG-4 AVC standard, the stream is decoded on a block-by-block basis using a motion vector not selected from the candidates but calculated from a motion vector of at least one block that is spatially or temporally adjacent to a current block.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 6

Figure 55:
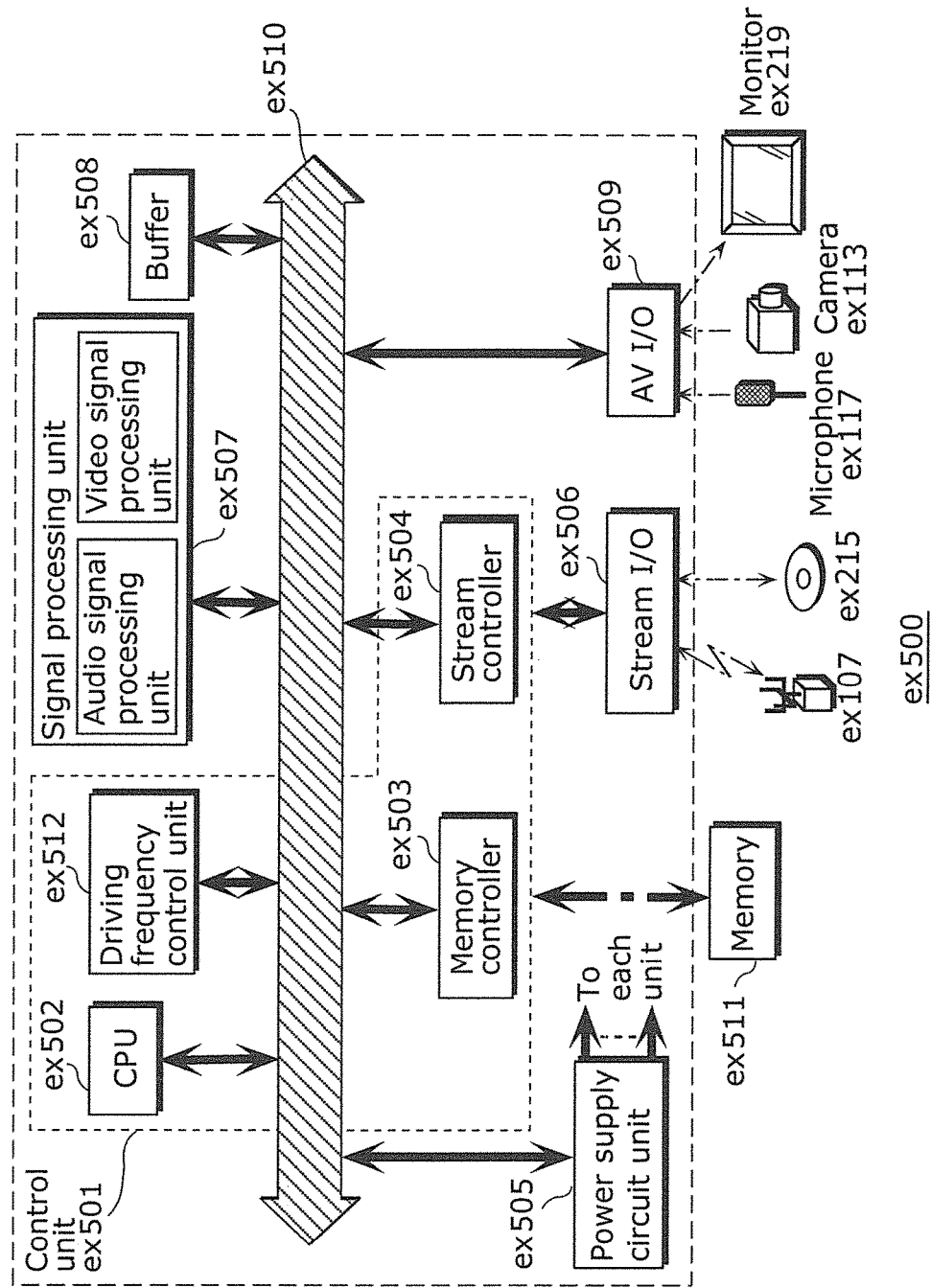
FIG. 55 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 55 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream JO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 7

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 56:
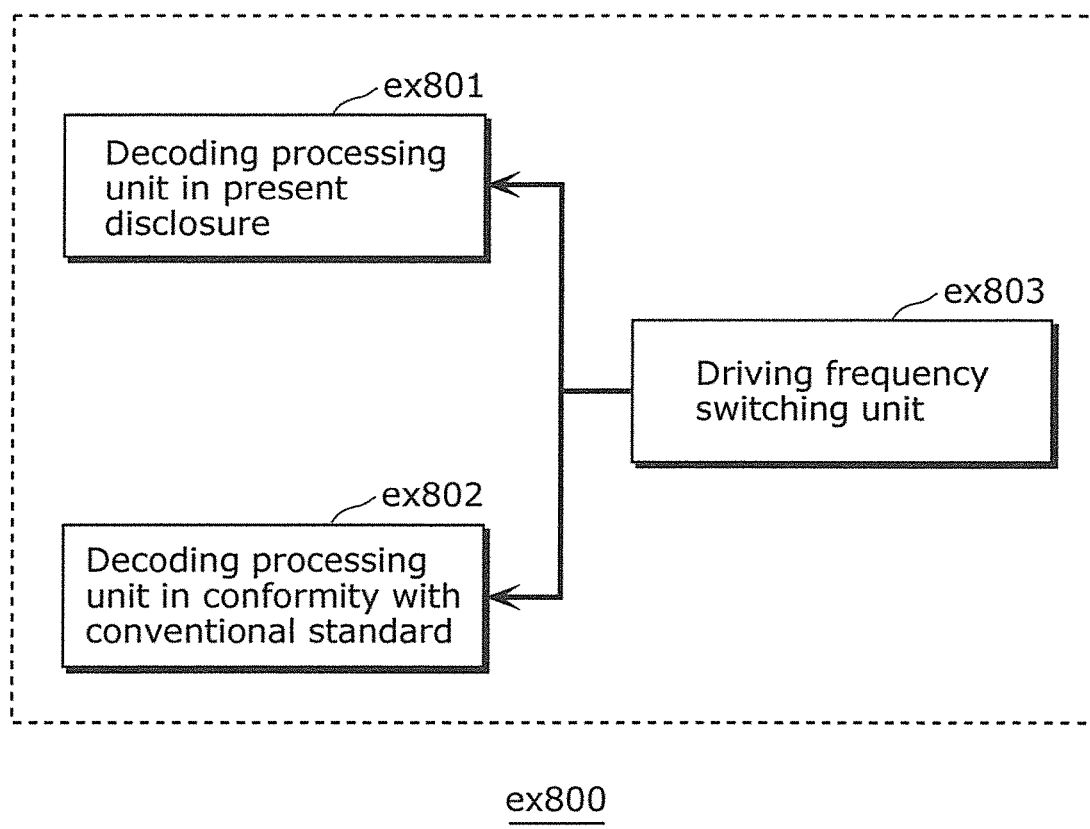
FIG. 56 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 56 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 55. Here, each of the decoding processing unit ex801 that executes the moving picture decoding method described in each of embodiments and the decoding processing unit ex802 that conforms to the conventional standard corresponds to the signal processing unit ex507 in FIG. 55. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 58. The driving frequency can be selected by storing the look-up table in the buffer ex508 and in an internal memory of an LSI, and with reference to the look-up table by the CPU ex502.

Figure 57:
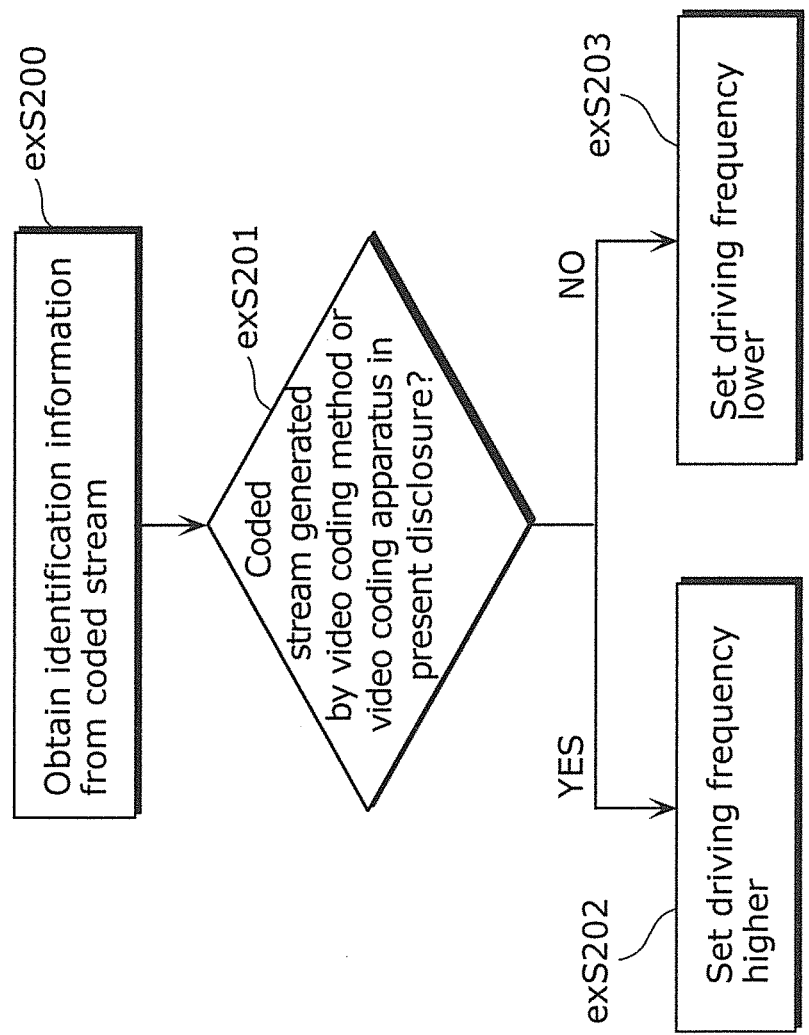
FIG. 57 shows steps for identifying video data and switching between driving frequencies.

FIG. 57 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 59A:
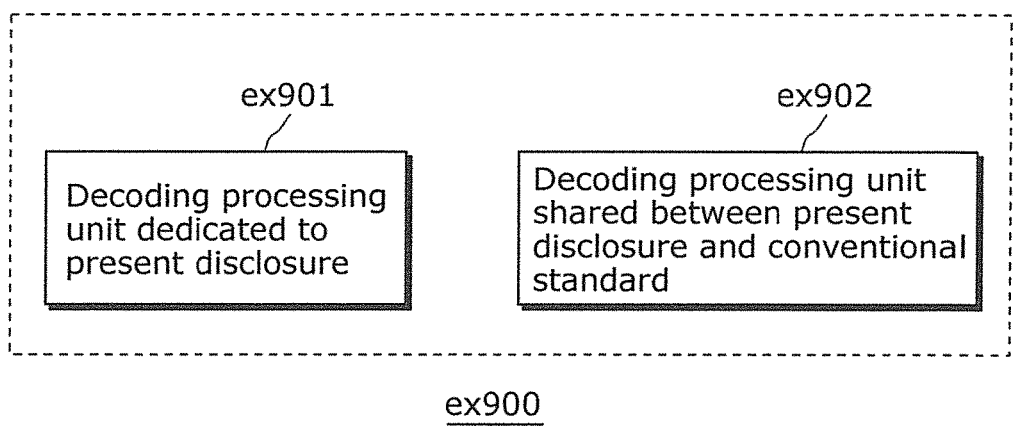
FIG. 59A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 59A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 that does not confirm to MPEG-4 AVC is probably used for other processing unique to an aspect of the present disclosure. The decoding processing unit for implementing the moving picture decoding method described in each of embodiments may be shared for the processing to be shared, and a dedicated decoding processing unit may be used for processing unique to that of MPEG-4 AVC.

Figure 59B:
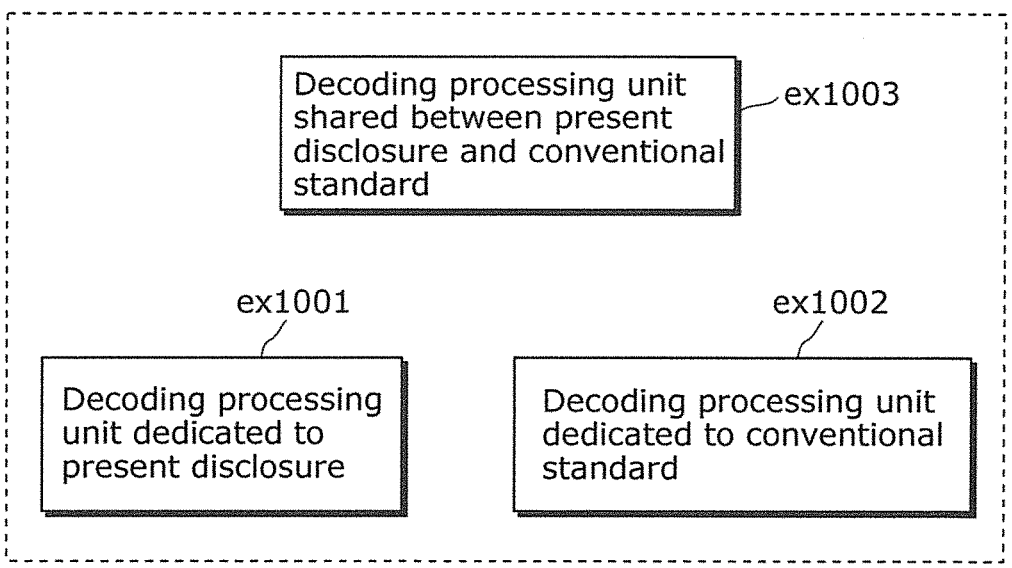
FIG. 59B is a diagram showing another example of a configuration for sharing a module of the signal processing unit.

Furthermore, ex1000 in FIG. 59B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

INDUSTRIAL APPLICABILITY

The image coding method and the like disclosed herein produces an effect of preventing image quality degradation and sufficiently increasing coding efficiency, and is applicable to various applications such as storage, transmission, and communication, for example. The present invention is of high use because it can be used, for example, for information display devices and imaging devices with high resolution which include televisions, digital video recorders, car navigation systems, cellular phones, digital cameras, and digital video cameras.

The invention claimed is:

1. An image coding method in which offset is applied when an image is coded, the offset being of at least two types including edge offset and band offset, the image coding method comprising:
    obtaining a pixel signal of a current region to be processed;
    calculating offset information including at least one of:
        a location from which the offset information for the current region is obtained,
        a total number of blocks which share the offset information,
        a pattern of partitioning the current region,
        a pixel classification method for classifying pixels into categories,
        a category index number of band offset, or
        an offset value;
    determining an offset value for each pixel in the current region based on the offset information;
    adjusting, in each of the categories, which are used for band offset and are classified based on pixel-value ranges and each covering a different pixel-value range, an offset value for respective pixel values without comparing the offset value and offset values for pixel values in other categories, by decreasing by a relatively greater amount the offset value for respective pixel values that are relatively closer to a boundary of each category, and by decreasing by a relatively lesser amount the offset value for respective pixel values that are relatively farther from the boundary of each category;
    applying the offset values, including any adjusted offset values, to the pixels in the current region when a predetermined condition is satisfied;
    coding the offset information; and
    outputting an offset-applied signal generated by the applying of offset values.

2. The image coding method according to claim 1, wherein the predetermined condition is a condition that a pixel value to which the offset is to be applied is within a predetermined range from a boundary between categories which neighbors each other and which are used for classifying pixels in the band offset.

3. The image coding method according to claim 2, wherein the predetermined range from the boundary includes, within one of the categories, at least one pixel value closest to the boundary.

4. The image coding method according to claim 3, wherein the offset value is adjusted in one or both of the categories neighboring each other across the boundary.

5. The image coding method according to claim 1,
wherein in the adjustment of the offset value, a differential value is used which is between (i) a pixel value of an offset-applied pixel to which the offset has been applied and (ii) a pixel value of a current pixel to be processed, the offset-applied pixel belonging to a neighboring category of a category of the current pixel and being located in a neighborhood of a boundary between the neighboring category and the category of the current pixel.

6. The image coding method according to claim 1, further comprising
determining whether or not the offset information is the same between different regions, using a threshold, and inserting the threshold into a coded stream.

7. The image coding method according to claim 1,
wherein the predetermined condition is a condition that a flag indicates ON or OFF, the flag indicating whether or not the same offset information as offset information used for a neighboring region of the current region is to be used for the current region.

8. An image decoding method in which offset is applied when an image is decoded, the offset being of at least two types including edge offset and band offset, the image decoding method comprising:
obtaining a pixel signal of a current region to be processed;
obtaining offset information to be used for applying offset, from a coded stream, the offset information including offset values for respective pixels in the current region, in which an offset value for respective pixel values in a respective category have been adjusted without comparing the offset value and offset values for pixel values in other categories, and in which the offset value for the respective pixel values are adjusted, wherein each of a plurality of pixel adjustment categories are used for band offset and are classified based on pixel-value ranges and each covering a different pixel-value range, the offset information being used for applying the offset by decreasing by a relatively greater amount the offset value for respective pixel value that are relatively closer to a boundary of each category, and by decreasing by a relatively lesser amount the offset value for respective pixel values that are relatively farther from the boundary of each category;
applying the offset values, including any adjusted offset values, to the current region using the offset information, the offset being applied with adjustment to the offset value when a predetermined condition is satisfied;
outputting an offset-applied signal generated by the applying of the offset values; and
controlling the applying of the offset values.

9. The image decoding method according to claim 8,
wherein the predetermined condition is a condition that a pixel value to which the offset is to be applied is within a predetermined range from a boundary between categories which are neighboring to each other and which are used for classifying pixels in the band offset.

10. The image decoding method according to claim 9,
wherein the predetermined range from the boundary includes, within one of the categories, at least one pixel value closest to the boundary.

11. The image decoding method according to claim 10,
wherein the offset value is adjusted in one or both of the categories neighboring each other across the boundary.

12. The image decoding method according to claim 8,
wherein in the adjustment of the offset value, a differential value is used which is between (i) a pixel value of an offset-applied pixel to which the offset has been applied and (ii) a pixel value of a current pixel to be processed, the offset-applied pixel belonging to a neighboring category of a category of the current pixel and being located in a neighborhood of a boundary between the neighboring category and the category of the current pixel.

13. The image decoding method according to claim 8, further comprising
determining whether or not the offset information is the same between different regions, using a threshold inserted to the coded stream.

14. The image decoding method according to claim 8,
wherein the predetermined condition is a condition that a flag indicates ON or OFF, the flag indicating whether or not the same offset information as offset information used for a neighboring region of the current region is to be used for the current region.

15. A non-transitory recording medium having a computer program recorded thereon for causing a computer to code an image according to the image coding method according to claim 1.

16. A non-transitory recording medium having a computer program recorded thereon for causing a computer to decode an image according to the image decoding method according to claim 8.

* * * * *